US011832296B2

(12) United States Patent
Shrestha et al.

(10) Patent No.: US 11,832,296 B2
(45) Date of Patent: Nov. 28, 2023

(54) CONTENTION RESOLUTION IN NEW RADIO NON-TERRESTRIAL NETWORKS

(71) Applicant: QUALCOMM Incorporated, San Diego, CA (US)

(72) Inventors: Bharat Shrestha, San Diego, CA (US); Umesh Phuyal, San Diego, CA (US); Xiao Feng Wang, San Diego, CA (US); Alberto Rico Alvarino, San Diego, CA (US); Ayan Sengupta, San Diego, CA (US); Prasad Reddy Kadiri, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/179,019

(22) Filed: Feb. 18, 2021

(65) Prior Publication Data

US 2021/0266957 A1    Aug. 26, 2021

Related U.S. Application Data

(60) Provisional application No. 62/980,103, filed on Feb. 21, 2020.

(51) Int. Cl.
H04W 74/00 (2009.01)
H04W 74/08 (2009.01)
(Continued)

(52) U.S. Cl.
CPC ......... H04W 74/008 (2013.01); H04L 1/1819 (2013.01); H04L 1/1896 (2013.01);
(Continued)

(58) Field of Classification Search
CPC ........... H04W 74/008; H04W 72/1289; H04W 74/0841; H04W 80/02; H04W 74/0833;
(Continued)

(56) References Cited

U.S. PATENT DOCUMENTS

2012/0213089 A1    8/2012    Shi et al.
2017/0273056 A1*   9/2017    Papasakellariou .... H04L 1/1861
(Continued)

OTHER PUBLICATIONS

International Search Report and Written Opinion—PCT/US2021/018736—ISA/EPO—dated Jul. 23, 2021.
(Continued)

*Primary Examiner* — Mandish K Randhawa
(74) *Attorney, Agent, or Firm* — Holland & Hart LLP

(57) ABSTRACT

Methods, systems, and devices for wireless communications are described. A communication device, otherwise known as a user equipment (UE) may transmit a random access message (e.g., a message 3) associated with a random access procedure. A hybrid automatic repeat request (HARQ) feedback may be disabled for the random access procedure. The UE may initiate a contention resolution window associated with the random access procedure for a first downlink data channel transmission of a set of downlink data channel transmissions associated with the random access procedure. The UE may receive, during the contention resolution window, the first downlink data channel transmission carrying a contention resolution medium access control-control element (MAC-CE). The UE may transmit acknowledgment information for the first downlink data channel transmission carrying the contention resolution MAC-CE based on an indication to enable the HARQ feedback.

36 Claims, 24 Drawing Sheets

(51) Int. Cl.
*H04L 1/1867* (2023.01)
*H04W 80/02* (2009.01)
*H04L 1/1812* (2023.01)
*H04W 72/23* (2023.01)

(52) U.S. Cl.
CPC ....... *H04W 72/23* (2023.01); *H04W 74/0841* (2013.01); *H04W 80/02* (2013.01)

(58) Field of Classification Search
CPC .... H04W 72/23; H04L 1/1819; H04L 1/1896; H04L 1/1822; H04L 1/1825; H04L 1/1812; H04L 1/1854
See application file for complete search history.

(56) References Cited

U.S. PATENT DOCUMENTS

| | | | |
|---|---|---|---|
| 2018/0220288 A1 | 8/2018 | Agiwal et al. | |
| 2018/0227805 A1* | 8/2018 | Jang | H04W 72/1242 |
| 2022/0007455 A1* | 1/2022 | Hong | H04W 76/28 |
| 2022/0078856 A1* | 3/2022 | Jeon | H04W 56/005 |
| 2022/0124829 A1* | 4/2022 | Matsuda | H04L 27/26134 |
| 2022/0239415 A1* | 7/2022 | Narayanan Thangaraj | H04L 1/1812 |
| 2022/0247520 A1* | 8/2022 | Zhang | H04L 1/1812 |
| 2022/0322458 A1* | 10/2022 | Huang | H04W 74/0833 |
| 2022/0330298 A1* | 10/2022 | Cheng | H04W 72/23 |

OTHER PUBLICATIONS

Asia Pacific Telecom: "Discussion on Delay-Tolerant Re-Transmission Mechanisms for NTN", 3GPP Draft, R1-1910844, 3GPP TSG-RAN WG1 Meeting #98-Bis, Discussion on Delay-Tolerant Re-Transmission Mechanisms for NTN, 3rd Generation Partnership Project (3GPP), Mobile Competence Centre, 650, Route Des Lucioles, F-06921 Sophia—A, vol. RAN WG1, No. Chongqing, China, Oct. 14, 2019-Oct. 20, 2019, Oct. 5, 2019 (Oct. 5, 2019), XP051808725, 2 Pages, Retrieved from the Internet: URL:https://ftp.3gpp.org/tsg_ran/WG1_RL1/TSGR1_98b/Docs/R1-1910844.zip R1-1910844 Discussion on Delay-Tolerant Re-Transmission Mechanisms for NTN.docx [retrieved on Oct. 5, 2019] p. 1.
Partial International Search Report—PCT/US2021/018736—ISA/EPO—dated May 25, 2021.
Qualcomm Incorporated: "Discussion on HARQ Feedback for msgB and RNTI Design for msgB", 3GPP Draft, 3GPP TSG-RAN WG2 Meeting #107bis , R2-1913401_Discussion on HARQ Feedback for msgB and RNTI Design for msgB, 3rd Generation Partnership Project (3GPP), Mobile Competence Centre, 650, Route Des Lucioles, F-06921 Sophia-Ant, vol. RAN WG2. No. Chongqing, China, Oct. 14, 2019-Oct. 18, 2019, Oct. 4, 2019 (Oct. 4, 2019), XP051804979, 6 Pages, Retrieved from the Internet: URL:https://ftp.3gpp.org/tsg_ran/WG2_RL2/TSGR2_107bis/Docs/R2-1913401.zip R2-1913401_Discussion on HARQ feedback for msgB and RNTI design for msgB.docx [retrieved on Oct. 4, 2019] pp. 1-3.
Samsung: "Remaining Issues for Msg3 Based SI Request", 3GPP Draft, 3GPP TSG-RAN2 102, R2-1806832_Remaining Issues for Msg3 Based SI Request, 3rd Generation Partnership Project (3GPP), Mobile Competence Centre, 650, Route Des Lucioles, F-06921 Sophia-Antipolis Cedex, Fran, vol. RAN WG2. No. Busan, South Korea, May 21, 2018-May 25, 2018, May 20, 2018 (May 20, 2018), XP051443281,4 Pages, Retrieved from the Internet: URL:http://www.3gpp.org/ftp/Meetings%5F3GPP%5FSYNC/RAN2/Docs/ [retrieved on May 20, 2018] Figure 1 p. 1.

* cited by examiner

CONTENTION RESOLUTION IN NEW RADIO NON-TERRESTRIAL NETWORKS

CROSS REFERENCE

The present application for Patent claims the benefit of U.S. Provisional Patent Application No. 62/980,103 by SHRESTHA et al., entitled "CONTENTION RESOLUTION IN NEW RADIO NON-TERRESTRIAL NETWORKS," filed Feb. 21, 2020, assigned to the assignee hereof, and expressly incorporated by reference herein.

INTRODUCTION

The following relates to wireless communications and more specifically to contention resolution for contention-based random access procedures.

Communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A communications system may include one or more base stations or one or more network access nodes, each simultaneously supporting communication for multiple communication devices, which may be otherwise known as user equipment (UE).

SUMMARY

A method for wireless communication at a UE is described. The method may include determining that hybrid automatic repeat request (HARQ) feedback is disabled and transmitting, to a base station, a random access message associated with a random access procedure based on determining that the HARQ feedback is disabled. The method may further include initiating a contention resolution window associated with the random access procedure for a downlink data channel transmission of a set of multiple downlink data channel transmissions associated with the random access procedure. The method may further include receiving, during the contention resolution window, the downlink data channel transmission, the downlink data channel transmission carrying a contention resolution medium access control-control element (MAC-CE).

An apparatus for wireless communication at a UE is described. The apparatus may include a processor; and memory coupled to the processor, the processor and memory configured to determine that HARQ feedback is disabled and transmit, to a base station, a random access message associated with a random access procedure based on determining that the HARQ feedback is disabled. The processor and memory may be further configured to initiate a contention resolution window associated with the random access procedure for a downlink data channel transmission of a set of multiple downlink data channel transmissions associated with the random access procedure. The processor and memory may be further configured to receive, during the contention resolution window, the downlink data channel transmission, the downlink data channel transmission carrying a contention resolution MAC-CE.

Another apparatus for wireless communication at a UE is described. The apparatus may include means for determining that HARQ feedback is disabled and means for transmitting, to a base station, a random access message associated with a random access procedure based on determining that the HARQ feedback is disabled. The apparatus may further include means for initiating a contention resolution window associated with the random access procedure for a downlink data channel transmission of a set of multiple downlink data channel transmissions associated with the random access procedure. The apparatus may further include means for receiving, during the contention resolution window, the downlink data channel transmission, the downlink data channel transmission carrying a contention resolution MAC-CE.

A non-transitory computer-readable medium storing code for wireless communication at a UE is described. The code may include instructions executable by a processor to determine that HARQ feedback is disabled and transmit, to a base station, a random access message associated with a random access procedure based on determining that the HARQ feedback is disabled. The code may further include instructions executable by the processor to initiate a contention resolution window associated with the random access procedure for a downlink data channel transmission of a set of multiple downlink data channel transmissions associated with the random access procedure. The code may further include instructions executable by the processor to receive, during the contention resolution window, the downlink data channel transmission, the downlink data channel transmission carrying a contention resolution MAC-CE.

In some examples of the method, apparatuses, and non-transitory computer-readable medium described herein, the random access message includes a random access message 3 (msg3). Some examples of the method, apparatuses, and non-transitory computer-readable medium described herein may further include operations, features, means, or instructions for transmitting acknowledgment information for the downlink data channel transmission carrying the contention resolution MAC-CE based on an indication to enable the HARQ feedback for the random access procedure.

Some examples of the method, apparatuses, and non-transitory computer-readable medium described herein may further include operations, features, means, or instructions for identifying the indication to enable the HARQ feedback based on UE context information, a network configuration to enable the HARQ feedback, a default configuration to enable the HARQ feedback, or a combination thereof and enabling the HARQ feedback based on the identifying.

Some examples of the method, apparatuses, and non-transitory computer-readable medium described herein may further include operations, features, means, or instructions for transmitting in the random access message a request to enable the HARQ feedback for the downlink data channel transmission carrying the contention resolution MAC-CE. Some examples of the method, apparatuses, and non-transitory computer-readable medium described herein may further include operations, features, means, or instructions for receiving the indication in the contention resolution MAC-CE and enabling the HARQ feedback based on the indication in the contention resolution MAC-CE.

Some examples of the method, apparatuses, and non-transitory computer-readable medium described herein may further include operations, features, means, or instructions for receiving a downlink control information (DCI) message scheduling the downlink data channel transmission carrying the contention resolution MAC-CE. In some examples of the method, apparatuses, and non-transitory computer-readable medium described herein, the DCI message includes the indication to enable the HARQ feedback.

Some examples of the method, apparatuses, and non-transitory computer-readable medium described herein may further include operations, features, means, or instructions for determining resources associated with an uplink control channel based on a second indication in the contention resolution MAC-CE. In some examples of the method, apparatuses, and non-transitory computer-readable medium described herein transmitting the acknowledgment information may include operations, features, means, or instructions for transmitting the acknowledgment information on the uplink control channel using the determined resources.

In some examples of the method, apparatuses, and non-transitory computer-readable medium described herein, the second indication includes a new MAC-CE providing uplink control channel resources. In some examples of the method, apparatuses, and non-transitory computer-readable medium described herein, a logical channel identifier of the new MAC-CE may be the same as or different from the contention resolution MAC-CE.

Some examples of the method, apparatuses, and non-transitory computer-readable medium described herein may further include operations, features, means, or instructions for determining a failure to receive the downlink data channel transmission carrying the contention resolution MAC-CE. In some examples of the method, apparatuses, and non-transitory computer-readable medium described herein, the HARQ feedback may be enabled for the random access procedure and the acknowledgment information may include a negative acknowledgment.

In some examples of the method, apparatuses, and non-transitory computer-readable medium described herein, transmitting the acknowledgment information may include operations, features, means, or instructions for transmitting the acknowledgment information based on the contention resolution window lapsing. In some examples of the method, apparatuses, and non-transitory computer-readable medium described herein, the HARQ feedback may be enabled for the random access procedure and the acknowledgment information may include a negative acknowledgment.

Some examples of the method, apparatuses, and non-transitory computer-readable medium described herein may further include operations, features, means, or instructions for receiving a radio resource control (RRC) message including an indication to disable the HARQ feedback for the random access procedure. In some examples of the method, apparatuses, and non-transitory computer-readable medium described herein, determining that the HARQ feedback may be disabled may be based on receiving the RRC message.

Some examples of the method, apparatuses, and non-transitory computer-readable medium described herein may further include operations, features, means, or instructions for receiving a random access response message associated with the random access procedure, the random access response message including a timing advance and controlling an uplink alignment timer based on the timing advance or the disabled HARQ feedback for the random access procedure, or both.

In some examples of the method, apparatuses, and non-transitory computer-readable medium described herein, the base station is a non-terrestrial base station including a satellite or a high altitude platform station in a non-terrestrial network.

A method for wireless communication at a base station is described. The method may include receiving, from a UE, a random access message associated with a random access procedure, where a HARQ feedback is disabled, and where a contention resolution window is associated with the random access procedure for a downlink data channel transmission of a set of multiple downlink data channel transmissions associated with the random access procedure. The method may further include transmitting, during the contention resolution window, the downlink data channel transmission, the downlink data channel transmission carrying a contention resolution MAC-CE.

An apparatus for wireless communication at a base station is described. The apparatus may include a processor; and memory coupled to the processor, the processor and memory configured to receive, from a UE, a random access message associated with a random access procedure, where a HARQ feedback is disabled, and where a contention resolution window is associated with the random access procedure for a downlink data channel transmission of a set of multiple downlink data channel transmissions associated with the random access procedure. The processor and memory may be further configured to transmit, during the contention resolution window, the downlink data channel transmission, the downlink data channel transmission carrying a contention resolution MAC-CE.

Another apparatus for wireless communication at a base station is described. The apparatus may include means for receiving, from a UE, a random access message associated with a random access procedure, where a HARQ feedback is disabled, and where a contention resolution window is associated with the random access procedure for a downlink data channel transmission of a set of multiple downlink data channel transmissions associated with the random access procedure. The apparatus may further include means for transmitting, during the contention resolution window, the downlink data channel transmission, the downlink data channel transmission carrying a contention resolution MAC-CE.

A non-transitory computer-readable medium storing code for wireless communication at a base station is described. The code may include instructions executable by a processor to receive, from a UE, a random access message associated with a random access procedure, where a HARQ feedback is disabled, and where a contention resolution window is associated with the random access procedure for a downlink data channel transmission of a set of multiple downlink data channel transmissions associated with the random access procedure. The code may further include instructions executable by the processor to transmit, during the contention resolution window, the downlink data channel transmission, the downlink data channel transmission carrying a contention resolution MAC-CE.

Some examples of the method, apparatuses, and non-transitory computer-readable medium described herein may further include operations, features, means, or instructions for receiving acknowledgment information for the downlink data channel transmission carrying the contention resolution MAC-CE based on transmitting, to the UE, an indication to enable the HARQ feedback. Some examples of the method, apparatuses, and non-transitory computer-readable medium described herein may further include operations, features, means, or instructions for transmitting the indication in the contention resolution MAC-CE.

A method for wireless communication at a UE is described. The method may include determining that HARQ feedback is disabled for a random access procedure and transmitting, to a base station, a random access message associated with the random access procedure based on determining that the HARQ feedback is disabled for the random access procedure. The method may further include refraining from transmitting, based on the disabled HARQ feedback, acknowledgment information for a downlink data channel transmission carrying a random access response message including a contention resolution MAC-CE.

An apparatus for wireless communication at a UE is described. The apparatus may include a processor; and memory coupled to the processor, the processor and memory configured to determine that HARQ feedback is disabled for a random access procedure and transmit, to a base station, a random access message associated with the random access procedure based on determining that the HARQ feedback is disabled for the random access procedure. The processor and memory may be further configured to refrain from transmitting, based on the disabled HARQ feedback, acknowledgment information for a downlink data channel transmission carrying a random access response message including a contention resolution MAC-CE.

Another apparatus for wireless communication at a UE is described. The apparatus may include means for determining that HARQ feedback is disabled for a random access procedure and means for transmitting, to a base station, a random access message associated with the random access procedure based on determining that the HARQ feedback is disabled for the random access procedure. The apparatus may further include means for refraining from transmitting, based on the disabled HARQ feedback, acknowledgment information for a downlink data channel transmission carrying a random access response message including a contention resolution MAC-CE.

A non-transitory computer-readable medium storing code for wireless communication at a UE is described. The code may include instructions executable by a processor to determine that HARQ feedback is disabled for a random access procedure and transmit, to a base station, a random access message associated with the random access procedure based on determining that the HARQ feedback is disabled for the random access procedure. The code may further include instructions executable by the processor to refrain from transmitting, based on the disabled HARQ feedback, acknowledgment information for a downlink data channel transmission carrying a random access response message including a contention resolution MAC-CE.

In some examples of the method, apparatuses, and non-transitory computer-readable medium described herein, the random access message includes a msg3. Some examples of the method, apparatuses, and non-transitory computer-readable medium described herein may further include operations, features, means, or instructions for monitoring a contention resolution window associated with the random access procedure for a number of repetitions associated with the downlink data channel transmission carrying the contention resolution MAC-CE. Some examples of the method, apparatuses, and non-transitory computer-readable medium described herein may further include operations, features, means, or instructions for receiving a configuration including an indication of the number of repetitions associated with the downlink data channel transmission carrying the contention resolution MAC-CE.

Some examples of the method, apparatuses, and non-transitory computer-readable medium described herein may further include operations, features, means, or instructions for receiving a downlink control channel carrying a DCI message scheduling one or multiple transport blocks associated with the number of repetitions associated with the downlink data channel transmission carrying the contention resolution MAC-CE.

Some examples of the method, apparatuses, and non-transitory computer-readable medium described herein may further include operations, features, means, or instructions for initiating a contention resolution timer associated with the contention resolution window. In some examples of the method, apparatuses, and non-transitory computer-readable medium described herein, monitoring the contention resolution window may be based on the contention resolution timer. In some examples of the method, apparatuses, and non-transitory computer-readable medium described herein, the random access response message further includes a service data unit (SDU) associated with a downlink common control channel.

A method for wireless communication at a UE is described. The method may include transmitting, to a base station, a random access message associated with a random access procedure. The method may further include receiving a configuration for a contention resolution timer and setting, based on the configuration, a value for the contention resolution timer. The method may further include monitoring a contention resolution window associated with the random access procedure for a first downlink data channel transmission of a set of multiple downlink data channel transmissions associated with the random access procedure based on setting the value for the contention resolution timer, the first downlink data channel transmission carrying a contention resolution MAC-CE. The method may further include transmitting acknowledgment information for the first downlink data channel transmission carrying the contention resolution MAC-CE.

An apparatus for wireless communication at a UE is described. The apparatus may include a processor; and memory coupled to the processor, the processor and memory configured to transmit, to a base station, a random access message associated with a random access procedure. The processor and memory may be further configured to receive a configuration for a contention resolution timer and set, based on the configuration, a value for the contention resolution timer. The processor and memory may be further configured to monitor a contention resolution window associated with the random access procedure for a first downlink data channel transmission of a set of multiple downlink data channel transmissions associated with the random access procedure based on setting the value for the contention resolution timer, the first downlink data channel transmission carrying a contention resolution MAC-CE. The processor and memory may be further configured to transmit acknowledgment information for the first downlink data channel transmission carrying the contention resolution MAC-CE.

Another apparatus for wireless communication at a UE is described. The apparatus may include means for transmitting, to a base station, a random access message associated with a random access procedure. The apparatus may further include means for receiving a configuration for a contention resolution timer and means for setting, based on the configuration, a value for the contention resolution timer. The apparatus may further include means for monitoring a contention resolution window associated with the random access procedure for a first downlink data channel transmission of a set of multiple downlink data channel transmissions associated with the random access procedure based on setting the value for the contention resolution timer, the first downlink data channel transmission carrying a contention resolution MAC-CE. The apparatus may further include means for transmitting acknowledgment information for the first downlink data channel transmission carrying the contention resolution MAC-CE.

A non-transitory computer-readable medium storing code for wireless communication at a UE is described. The code may include instructions executable by a processor to transmit, to a base station, a random access message associated with a random access procedure. The code may further include instructions executable by the processor to receive a configuration for a contention resolution timer and set, based on the configuration, a value for the contention resolution timer. The code may further include instructions executable by the processor to monitor a contention resolution window associated with the random access procedure for a first downlink data channel transmission of a set of multiple downlink data channel transmissions associated with the random access procedure based on setting the value for the contention resolution timer, the first downlink data channel transmission carrying a contention resolution MAC-CE. The code may further include instructions executable by the processor to transmit acknowledgment information for the first downlink data channel transmission carrying the contention resolution MAC-CE.

Some examples of the method, apparatuses, and non-transitory computer-readable medium described herein may further include operations, features, means, or instructions for receiving a DCI message scheduling a second downlink data channel transmission of the set of multiple downlink data channel transmissions that carries a second contention resolution MAC-CE. In some examples of the method, apparatuses, and non-transitory computer-readable medium described herein, the DCI message includes an indication to disable HARQ feedback for the second downlink data channel transmission.

In some examples of the method, apparatuses, and non-transitory computer-readable medium described herein, the value for the contention resolution timer may be based on one or more of a maximum propagation delay between the UE and the base station, a duration of a transmission time interval associated with a transmission of a contention resolution identifier, or a gap between a downlink data channel reception and an uplink control channel transmission, or a combination thereof. In some examples of the method, apparatuses, and non-transitory computer-readable medium described herein, transmitting the acknowledgment information may include operations, features, means, or instructions for transmitting the acknowledgment information based on the contention resolution window lapsing, the acknowledgment information including a negative acknowledgment.

A method for wireless communication at a base station is described. The method may include receiving, from a UE, a random access message associated with a random access procedure and transmitting a configuration for a contention resolution timer. The method may further include transmitting, during a contention resolution window associated with the random access procedure, a first downlink data channel transmission of a set of multiple downlink data channel transmissions associated with the random access procedure based on transmitting the configuration for the contention resolution timer, the first downlink data channel transmission carrying a contention resolution MAC-CE. The method may further include receiving acknowledgment information for the first downlink data channel transmission carrying the contention resolution MAC-CE.

An apparatus for wireless communication at a base station is described. The apparatus may include a processor; and memory coupled to the processor, the processor and memory configured to receive, from a UE, a random access message associated with a random access procedure and transmit a configuration for a contention resolution timer. The processor and memory may be further configured to transmit, during a contention resolution window associated with the random access procedure, a first downlink data channel transmission of a set of multiple downlink data channel transmissions associated with the random access procedure based on transmitting the configuration for the contention resolution timer, the first downlink data channel transmission carrying a contention resolution MAC-CE. The processor and memory may be further configured to receive acknowledgment information for the first downlink data channel transmission carrying the contention resolution MAC-CE.

Another apparatus for wireless communication at a base station is described. The apparatus may include means for receiving, from a UE, a random access message associated with a random access procedure and means for transmitting a configuration for a contention resolution timer. The apparatus may further include means for transmitting, during a contention resolution window associated with the random access procedure, a first downlink data channel transmission of a set of multiple downlink data channel transmissions associated with the random access procedure based on transmitting the configuration for the contention resolution timer, the first downlink data channel transmission carrying a contention resolution MAC-CE. The apparatus may further include means for receiving acknowledgment information for the first downlink data channel transmission carrying the contention resolution MAC-CE.

A non-transitory computer-readable medium storing code for wireless communication at a base station is described. The code may include instructions executable by a processor to receive, from a UE, a random access message associated with a random access procedure and transmit a configuration for a contention resolution timer. The code may further include instructions executable by the processor to transmit, during a contention resolution window associated with the random access procedure, a first downlink data channel transmission of a set of multiple downlink data channel transmissions associated with the random access procedure based on transmitting the configuration for the contention resolution timer, the first downlink data channel transmission carrying a contention resolution MAC-CE. The code may further include instructions executable by the processor to receive acknowledgment information for the first downlink data channel transmission carrying the contention resolution MAC-CE.

Some examples of the method, apparatuses, and non-transitory computer-readable medium described herein may further include operations, features, means, or instructions for transmitting a DCI message scheduling a second downlink data channel transmission of the set of multiple downlink data channel transmissions that carries a second contention resolution MAC-CE. In some examples of the method, apparatuses, and non-transitory computer-readable medium described herein, the DCI message includes an indication to disable HARQ feedback for the second downlink data channel transmission.

A method of wireless communication at a UE is described. The method may include transmitting, to a base station, a random access message associated with a random access procedure, where a HARQ feedback is disabled for the random access procedure. The method may further include monitoring a contention resolution window associated with the random access procedure for a first downlink data channel transmission of a set of downlink data channel transmissions associated with the random access procedure, the first downlink data channel transmission carrying a contention resolution MAC-CE. The method may further include transmitting acknowledgment information for the first downlink data channel transmission carrying the contention resolution MAC-CE based on an indication to enable the HARQ feedback.

An apparatus for wireless communication is described. The apparatus may include a processor; and memory coupled to the processor, the processor and memory configured to transmit, to a base station, a random access message associated with a random access procedure, where a HARQ feedback is disabled for the random access procedure. The processor and memory may be further configured to monitor a contention resolution window associated with the random access procedure for a first downlink data channel transmission of a set of downlink data channel transmissions associated with the random access procedure, the first downlink data channel transmission carrying a contention resolution MAC-CE. The processor and memory may be further configured to transmit acknowledgment information for the first downlink data channel transmission carrying the contention resolution MAC-CE based on an indication to enable the HARQ feedback.

Another apparatus for wireless communication is described. The apparatus may include means for transmitting, to a base station, a random access message associated with a random access procedure, where a HARQ feedback is disabled for the random access procedure. The apparatus may further include means for monitoring a contention resolution window associated with the random access procedure for a first downlink data channel transmission of a set of downlink data channel transmissions associated with the random access procedure, the first downlink data channel transmission carrying a contention resolution MAC-CE. The apparatus may further include means for transmitting acknowledgment information for the first downlink data channel transmission carrying the contention resolution MAC-CE based on an indication to enable the HARQ feedback.

A non-transitory computer-readable medium storing code for wireless communication at a UE is described. The code may include instructions executable by a processor to transmit, to a base station, a random access message associated with a random access procedure, where a HARQ feedback is disabled for the random access procedure. The code may further include instructions executable by the processor to monitor a contention resolution window associated with the random access procedure for a first downlink data channel transmission of a set of downlink data channel transmissions associated with the random access procedure, the first downlink data channel transmission carrying a contention resolution MAC-CE. The code may further include instructions executable by the processor to transmit acknowledgment information for the first downlink data channel transmission carrying the contention resolution MAC-CE based on an indication to enable the HARQ feedback.

In some examples of the method, apparatuses, and non-transitory computer-readable medium described herein, the random access message includes a msg3. Some examples of the method, apparatuses, and non-transitory computer-readable medium described herein may further include operations, features, means, or instructions for identifying the indication to enable the HARQ feedback in UE context information and enabling the HARQ feedback based on the identifying.

Some examples of the method, apparatuses, and non-transitory computer-readable medium described herein may further include operations, features, means, or instructions for transmitting in the random access message a request to enable the HARQ feedback for the first downlink data channel transmission carrying the contention resolution MAC-CE. Some examples of the method, apparatuses, and non-transitory computer-readable medium described herein may further include operations, features, means, or instructions for receiving the indication in the contention resolution MAC-CE, and enabling the HARQ feedback based on the indication in the contention resolution MAC-CE.

In some examples of the method, apparatuses, and non-transitory computer-readable medium described herein, the indication includes a bit indication. In some examples of the method, apparatuses, and non-transitory computer-readable medium described herein, the bit indication includes a reserved bit in a MAC subheader of the contention resolution MAC-CE.

Some examples of the method, apparatuses, and non-transitory computer-readable medium described herein may further include operations, features, means, or instructions for receiving a downlink control information (DCI) message scheduling the first downlink data channel transmission carrying the contention resolution MAC-CE. The DCI message includes the indication to enable the HARQ feedback.

Some examples of the method, apparatuses, and non-transitory computer-readable medium described herein may further include operations, features, means, or instructions for determining resources associated with an uplink control channel based on a second indication in the contention resolution MAC-CE. In some examples of the method, apparatuses, and non-transitory computer-readable medium described herein, transmitting the acknowledgment information includes transmitting the acknowledgment information on the uplink control channel using the determined resources. In some examples of the method, apparatuses, and non-transitory computer-readable medium described herein, the second indication includes a new the MAC-CE providing uplink control channel resource. In some examples of the method, apparatuses, and non-transitory computer-readable medium described herein, a logical channel identifier of the MAC-CE may be same as or different from the contention resolution MAC-CE. In some examples of the method, apparatuses, and non-transitory computer-readable medium described herein, the resources may be adjacent to an ending of the contention resolution window.

Some examples of the method, apparatuses, and non-transitory computer-readable medium described herein may further include operations, features, means, or instructions for receiving a DCI message scheduling resources associated with an uplink control channel. In some examples of the method, apparatuses, and non-transitory computer-readable medium described herein, transmitting the acknowledgment information includes transmitting the acknowledgment information on the uplink control channel using the scheduled resources.

Some examples of the method, apparatuses, and non-transitory computer-readable medium described herein may further include operations, features, means, or instructions for determining the scheduled resources based on one or more resource indices in the DCI message. In some examples of the method, apparatuses, and non-transitory computer-readable medium described herein, the one or more resource indices corresponding to the scheduled resources.

Some examples of the method, apparatuses, and non-transitory computer-readable medium described herein may further include operations, features, means, or instructions for determining a failure to receive the first downlink data channel transmission carrying the contention resolution MAC-CE. In some examples of the method, apparatuses, and non-transitory computer-readable medium described herein, the HARQ feedback may be enabled for the random access procedure. In some examples of the method, apparatuses, and non-transitory computer-readable medium described herein, the acknowledgment information includes a negative acknowledgment.

In some examples of the method, apparatuses, and non-transitory computer-readable medium described herein, transmitting the acknowledgment information may include operations, features, means, or instructions for transmitting the acknowledgment information based on the contention resolution window lapsing. In some examples of the method, apparatuses, and non-transitory computer-readable medium described herein, the HARQ feedback may be enabled for the random access procedure and the acknowledgment information includes a negative acknowledgment.

Some examples of the method, apparatuses, and non-transitory computer-readable medium described herein may further include operations, features, means, or instructions for receiving a configuration for a contention resolution timer, and setting, based on the configuration, a value for the contention resolution timer.

In some examples of the method, apparatuses, and non-transitory computer-readable medium described herein, the value for the contention resolution timer may be based on one or more of a maximum propagation delay between the UE and the base station, a duration of a transmission time interval associated with a transmission of a contention resolution identifier, or a gap between a downlink data channel reception and an uplink control channel transmission, or a combination thereof.

In some examples of the method, apparatuses, and non-transitory computer-readable medium described herein, the contention resolution window includes one or more discontinuous reception (DRX) cycles. In some examples of the method, apparatuses, and non-transitory computer-readable medium described herein, monitoring the contention resolution window may include operations, features, means, or instructions for monitoring the contention resolution window during one or more active durations associated with the one or more DRX cycles.

In some examples of the method, apparatuses, and non-transitory computer-readable medium described herein, the base station may be a non-terrestrial base station including a satellite or a high altitude platform station in a non-terrestrial network.

In some examples of the method, apparatuses, and non-transitory computer-readable medium described herein, the acknowledgment information includes a positive acknowledgment or a negative acknowledgment. In some examples of the method, apparatuses, and non-transitory computer-readable medium described herein, the contention resolution MAC-CE includes a contention resolution identifier. In some examples of the method, apparatuses, and non-transitory computer-readable medium described herein, a length of the contention resolution identifier in the contention resolution MAC-CE may be lesser than or equal to a default length of a default contention resolution identifier.

Some examples of the method, apparatuses, and non-transitory computer-readable medium described herein may further include operations, features, means, or instructions for transmitting an RRC message indicating a failure for a contention resolution associated with the random access procedure.

A method of wireless communication at a base station is described. The method may include receiving, from a UE, a random access message associated with a random access procedure, where a HARQ feedback is disabled for the random access procedure. The method may further include determining a contention resolution window associated with the random access procedure for a first downlink data channel transmission of a set of downlink data channel transmissions associated with the random access procedure, the first downlink data channel transmission carrying a contention resolution MAC-CE. The method may further include receiving acknowledgment information for the first downlink data channel transmission carrying the contention resolution MAC-CE based on transmitting, to the UE, an indication to enable the HARQ feedback.

An apparatus for wireless communication is described. The apparatus may include a processor; and memory coupled to the processor, the processor and memory configured to receive, from a UE, a random access message associated with a random access procedure, where a HARQ feedback is disabled for the random access procedure. The processor and memory may be further configured to determine a contention resolution window associated with the random access procedure for a first downlink data channel transmission of a set of downlink data channel transmissions associated with the random access procedure, the first downlink data channel transmission carrying a contention resolution MAC-CE. The processor and memory may be further configured to receive acknowledgment information for the first downlink data channel transmission carrying the contention resolution MAC-CE based on transmitting, to the UE, an indication to enable the HARQ feedback.

Another apparatus for wireless communication is described. The apparatus may include means for receiving, from a UE, a random access message associated with a random access procedure, where a HARQ feedback is disabled for the random access procedure. The apparatus may further include means for determining a contention resolution window associated with the random access procedure for a first downlink data channel transmission of a set of downlink data channel transmissions associated with the random access procedure, the first downlink data channel transmission carrying a contention resolution MAC-CE. The apparatus may further include means for receiving acknowledgment information for the first downlink data channel transmission carrying the contention resolution MAC-CE based on transmitting, to the UE, an indication to enable the HARQ feedback.

A non-transitory computer-readable medium storing code for wireless communication at a base station is described. The code may include instructions executable by a processor to receive, from a UE, a random access message associated with a random access procedure, where a HARQ feedback is disabled for the random access procedure. The code may further include instructions executable by the processor to determine a contention resolution window associated with the random access procedure for a first downlink data channel transmission of a set of downlink data channel transmissions associated with the random access procedure, the first downlink data channel transmission carrying a contention resolution MAC-CE. The code may further include instructions executable by the processor to receive acknowledgment information for the first downlink data channel transmission carrying the contention resolution MAC-CE based on transmitting, to the UE, an indication to enable the HARQ feedback.

In some examples of the method, apparatuses, and non-transitory computer-readable medium described herein, the random access message includes a msg3. Some examples of the method, apparatuses, and non-transitory computer-readable medium described herein may further include operations, features, means, or instructions for including the indication in UE context information.

Some examples of the method, apparatuses, and non-transitory computer-readable medium described herein may further include operations, features, means, or instructions for receiving in the random access message a request to enable the HARQ feedback for the first downlink data channel transmission carrying the contention resolution MAC-CE. Some examples of the method, apparatuses, and non-transitory computer-readable medium described herein may further include operations, features, means, or instructions for transmitting the indication in the contention resolution MAC-CE.

In some examples of the method, apparatuses, and non-transitory computer-readable medium described herein, the indication includes a bit indication. In some examples of the method, apparatuses, and non-transitory computer-readable medium described herein, the bit indication includes a reserved bit in a MAC-CE of the contention resolution MAC-CE.

Some examples of the method, apparatuses, and non-transitory computer-readable medium described herein may further include operations, features, means, or instructions for transmitting DCI message scheduling the first downlink data channel transmission carrying the contention resolution MAC-CE. In some examples of the method, apparatuses, and non-transitory computer-readable medium described herein, the DCI message includes the indication to enable the HARQ feedback.

Some examples of the method, apparatuses, and non-transitory computer-readable medium described herein may further include operations, features, means, or instructions for transmitting a DCI message scheduling resources associated with an uplink control channel. In some examples of the method, apparatuses, and non-transitory computer-readable medium described herein, receiving the acknowledgment information includes receiving the acknowledgment information on the uplink control channel using the scheduled resources.

In some examples of the method, apparatuses, and non-transitory computer-readable medium described herein, receiving the acknowledgment information may include operations, features, means, or instructions for receiving the acknowledgment information based on the contention resolution window lapsing. In some examples of the method, apparatuses, and non-transitory computer-readable medium described herein, the acknowledgment information including a negative acknowledgment.

In some examples of the method, apparatuses, and non-transitory computer-readable medium described herein, the contention resolution window includes one or more DRX cycles. In some examples of the method, apparatuses, and non-transitory computer-readable medium described herein, the base station may be a non-terrestrial base station including a satellite or a high altitude platform station in a non-terrestrial network.

In some examples of the method, apparatuses, and non-transitory computer-readable medium described herein, the acknowledgment information includes a positive acknowledgment or a negative acknowledgment. In some examples of the method, apparatuses, and non-transitory computer-readable medium described herein, the contention resolution MAC-CE includes a contention resolution identifier. Some examples of the method, apparatuses, and non-transitory computer-readable medium described herein may further include operations, features, means, or instructions for receiving an RRC message indicating a failure for a contention resolution associated with the random access procedure.

A method of wireless communication at a UE is described. The method may include transmitting, to a base station, a random access message associated with a random access procedure, where a HARQ feedback is disabled for the random access procedure. The method may further include monitoring a contention resolution window associated with the random access procedure for a downlink data channel transmission carrying a contention resolution MAC-CE. The method may further include refraining from transmitting, based on the disabled HARQ feedback, acknowledgment information for the downlink data channel transmission carrying the random access response message including the contention resolution MAC-CE.

An apparatus for wireless communication is described. The apparatus may include a processor; and memory coupled to the processor, the processor and memory configured to transmit, to a base station, a random access message associated with a random access procedure, where a HARQ feedback is disabled for the random access procedure. The processor and memory may be further configured to monitor a contention resolution window associated with the random access procedure for a downlink data channel transmission carrying a contention resolution MAC-CE. The processor and memory may be further configured to refrain from transmitting, based on the disabled HARQ feedback, acknowledgment information for the downlink data channel transmission carrying the random access response message including the contention resolution MAC-CE.

Another apparatus for wireless communication is described. The apparatus may include means for transmitting, to a base station, a random access message associated with a random access procedure, where a HARQ feedback is disabled for the random access procedure. The apparatus may further include means for monitoring a contention resolution window associated with the random access procedure for a downlink data channel transmission carrying a contention resolution MAC-CE. The apparatus may further include means for refraining from transmitting, based on the disabled HARQ feedback, acknowledgment information for the downlink data channel transmission carrying the random access response message including the contention resolution MAC-CE.

A non-transitory computer-readable medium storing code for wireless communication at a UE is described. The code may include instructions executable by a processor to transmit, to a base station, a random access message associated with a random access procedure, where a HARQ feedback is disabled for the random access procedure. The code may further include instructions executable by the processor to monitor a contention resolution window associated with the random access procedure for a downlink data channel transmission carrying a contention resolution MAC-CE. The code may further include instructions executable by the processor to refrain from transmitting, based on the disabled HARQ feedback, acknowledgment information for the downlink data channel transmission carrying the random access response message including the contention resolution MAC-CE.

In some examples of the method, apparatuses, and non-transitory computer-readable medium described herein, the random access message includes a msg3. In some examples of the method, apparatuses, and non-transitory computer-readable medium described herein, monitoring the contention resolution window associated with the random access procedure may include operations, features, means, or instructions for monitoring the contention resolution window for a number of repetitions associated with the downlink data channel transmission carrying the contention resolution MAC-CE.

Some examples of the method, apparatuses, and non-transitory computer-readable medium described herein may further include operations, features, means, or instructions for receiving a configuration including an indication of the number of repetitions associated with the downlink data channel transmission carrying the contention resolution MAC-CE. Some examples of the method, apparatuses, and non-transitory computer-readable medium described herein may further include operations, features, means, or instructions for receiving a downlink control channel carrying a DCI message scheduling one or multiple transport blocks associated with the number of repetitions associated with the downlink data channel transmission carrying the contention resolution MAC-CE.

Some examples of the method, apparatuses, and non-transitory computer-readable medium described herein may further include operations, features, means, or instructions for receiving a configuration for a contention resolution timer, and setting, based on the configuration, a value for the contention resolution timer. In some examples of the method, apparatuses, and non-transitory computer-readable medium described herein, the value for the contention resolution timer may be based on one or more of a maximum propagation delay between the UE and the base station, a duration of a transmission time interval associated with a transmission of a contention resolution identifier, or a gap between a downlink data channel reception and an uplink control channel transmission, or a combination thereof.

Some examples of the method, apparatuses, and non-transitory computer-readable medium described herein may further include operations, features, means, or instructions for initiating a contention resolution timer associated with the contention resolution window, where monitoring the contention resolution window may be based on the contention resolution timer.

In some examples of the method, apparatuses, and non-transitory computer-readable medium described herein, the contention resolution window includes one or more DRX cycles. In some examples of the method, apparatuses, and non-transitory computer-readable medium described herein, monitoring the contention resolution window may include operations, features, means, or instructions for monitoring the contention resolution window during one or more active durations associated with the one or more DRX cycles.

In some examples of the method, apparatuses, and non-transitory computer-readable medium described herein, the base station may be a non-terrestrial base station including a satellite or a high altitude platform station in a non-terrestrial network.

A method of wireless communication at a base station is described. The method may include receiving, from a UE, a random access message associated with a random access procedure, where a HARQ feedback is disabled for the random access procedure and determining a contention resolution window associated with the random access procedure for a downlink data channel transmission carrying a contention resolution MAC-CE. The method may further include refraining from receiving, based on the disabled HARQ feedback, acknowledgment information for the downlink data channel transmission carrying the random access response message including the contention resolution MAC-CE.

An apparatus for wireless communication is described. The apparatus may include a processor; and memory coupled to the processor, the processor and memory configured to receive, from a UE, a random access message associated with a random access procedure, where a HARQ feedback is disabled for the random access procedure and determine a contention resolution window associated with the random access procedure for a downlink data channel transmission carrying a contention resolution MAC-CE. The processor and memory may further be configured to refrain from receiving, based on the disabled HARQ feedback, acknowledgment information for the downlink data channel transmission carrying the random access response message including the contention resolution MAC-CE.

Another apparatus for wireless communication is described. The apparatus may include means for receiving, from a UE, a random access message associated with a random access procedure, where a HARQ feedback is disabled for the random access procedure and determining a contention resolution window associated with the random access procedure for a downlink data channel transmission carrying a contention resolution MAC-CE. The apparatus may further include means for refraining from receiving, based on the disabled HARQ feedback, acknowledgment information for the downlink data channel transmission carrying the random access response message including the contention resolution MAC-CE.

A non-transitory computer-readable medium storing code for wireless communication at a base station is described. The code may include instructions executable by a processor to receive, from a UE, a random access message associated with a random access procedure, where a HARQ feedback is disabled for the random access procedure and determine a contention resolution window associated with the random access procedure for a downlink data channel transmission carrying a contention resolution MAC-CE. The code may further include instructions executable by a processor to refrain from receiving, based on the disabled HARQ feedback, acknowledgment information for the downlink data channel transmission carrying the random access response message including the contention resolution MAC-CE.

In some examples of the method, apparatuses, and non-transitory computer-readable medium described herein, the random access message includes a msg3. Some examples of the method, apparatuses, and non-transitory computer-readable medium described herein may further include operations, features, means, or instructions for transmitting a configuration including an indication of a number of repetitions associated with the downlink data channel transmission carrying the contention resolution MAC-CE.

Some examples of the method, apparatuses, and non-transitory computer-readable medium described herein may further include operations, features, means, or instructions for transmitting a downlink control channel carrying a DCI message scheduling one or multiple transport blocks associated with the number of repetitions associated with the downlink data channel transmission carrying the contention resolution MAC-CE. In some examples of the method, apparatuses, and non-transitory computer-readable medium described herein, the contention resolution window includes one or more DRX cycles.

In some examples of the method, apparatuses, and non-transitory computer-readable medium described herein, the base station may be a non-terrestrial base station including a satellite or a high altitude platform station in a non-terrestrial network.

A method of wireless communication at a UE is described. The method may include transmitting, to a base station, a random access message associated with a random access procedure and determining that HARQ feedback is disabled for the random access procedure. The method may further include refraining from transmitting, based on the disabled HARQ feedback, acknowledgment information for a downlink data channel transmission carrying a random access response message including one or more of a contention resolution MAC-CE or an SDU associated with a downlink common control channel, or both.

An apparatus for wireless communication is described. The apparatus may include a processor; and memory coupled to the processor, the processor and memory configured to transmit, to a base station, a random access message associated with a random access procedure and determine that HARQ feedback is disabled for the random access procedure. The processor and memory may further be configured to refrain from transmitting, based on the disabled HARQ feedback, acknowledgment information for a downlink data channel transmission carrying a random access response message including one or more of a contention resolution MAC-CE or an SDU associated with a downlink common control channel, or both.

Another apparatus for wireless communication is described. The apparatus may include means for transmitting, to a base station, a random access message associated with a random access procedure and determining that HARQ feedback is disabled for the random access procedure. The apparatus may further include means for refraining from transmitting, based on the disabled HARQ feedback, acknowledgment information for a downlink data channel transmission carrying a random access response message including one or more of a contention resolution MAC-CE or an SDU associated with a downlink common control channel, or both.

A non-transitory computer-readable medium storing code for wireless communication at a UE is described. The code may include instructions executable by a processor to transmit, to a base station, a random access message associated with a random access procedure and determine that HARQ feedback is disabled for the random access procedure. The code may further include instruction executable by a processor to refrain from transmitting, based on the disabled HARQ feedback, acknowledgment information for a downlink data channel transmission carrying a random access response message including one or more of a contention resolution MAC-CE or an SDU associated with a downlink common control channel, or both.

In some examples of the method, apparatuses, and non-transitory computer-readable medium described herein, the random access message includes a msg3. Some examples of the method, apparatuses, and non-transitory computer-readable medium described herein may further include operations, features, means, or instructions for monitoring a contention resolution window associated with the random access procedure for the downlink data channel transmission carrying the random access response message including one or more of the contention resolution MAC-CE or the SDU associated with the downlink common control channel, or both.

Some examples of the method, apparatuses, and non-transitory computer-readable medium described herein may further include operations, features, means, or instructions for receiving a configuration for a contention resolution timer, and setting, based on the configuration, a value for the contention resolution timer. In some examples of the method, apparatuses, and non-transitory computer-readable medium described herein, the value for the contention resolution timer may be based on one or more of a maximum propagation delay between the UE and the base station, a duration of a transmission time interval associated with a transmission of a contention resolution identifier, or a gap between a downlink data channel reception and an uplink control channel transmission, or a combination thereof. Some examples of the method, apparatuses, and non-transitory computer-readable medium described herein may further include operations, features, means, or instructions for initiating a contention resolution timer associated with a contention resolution window, where monitoring the contention resolution window may be based on the contention resolution timer.

In some examples of the method, apparatuses, and non-transitory computer-readable medium described herein, a contention resolution window includes one or more DRX cycles. In some examples of the method, apparatuses, and non-transitory computer-readable medium described herein, monitoring the contention resolution window may include operations, features, means, or instructions for monitoring the contention resolution window during one or more active durations associated with the one or more DRX cycles.

In some examples of the method, apparatuses, and non-transitory computer-readable medium described herein, the base station may be a non-terrestrial base station including a satellite or a high altitude platform station in a non-terrestrial network.

A method of wireless communication at a UE is described. The method may include transmitting, to a base station, a random access message associated with a random access procedure and receiving a random access response message associated with the random access procedure, the random access response message including a timing advance. The method may further include determining that HARQ feedback is disabled for the random access procedure and controlling an uplink alignment timer based on the timing advance or the disabled HARQ feedback, or both.

An apparatus for wireless communication is described. The apparatus may include a processor; and memory coupled to the processor, the processor and memory configured to transmit, to a base station, a random access message associated with a random access procedure and receive a random access response message associated with the random access procedure, the random access response message including a timing advance. The processor and memory may be further configured to determine that HARQ feedback is disabled for the random access procedure and control an uplink alignment timer based on the timing advance or the disabled HARQ feedback, or both.

Another apparatus for wireless communication is described. The apparatus may include means for transmitting, to a base station, a random access message associated with a random access procedure and receiving a random access response message associated with the random access procedure, the random access response message including a timing advance. The apparatus may further include means for determining that HARQ feedback is disabled for the random access procedure, and controlling an uplink alignment timer based on the timing advance or the disabled HARQ feedback, or both.

A non-transitory computer-readable medium storing code for wireless communication at a UE is described. The code may include instructions executable by a processor to transmit, to a base station, a random access message associated with a random access procedure and receive a random access response message associated with the random access procedure, the random access response message including a timing advance. The code may further include instructions executable by a processor to determine that HARQ feedback is disabled for the random access procedure and control an uplink alignment timer based on the timing advance or the disabled HARQ feedback, or both.

In some examples of the method, apparatuses, and non-transitory computer-readable medium described herein, the random access message includes a msg3. Some examples of the method, apparatuses, and non-transitory computer-readable medium described herein may further include operations, features, means, or instructions for setting an uplink alignment timer based on a configuration. Some examples of the method, apparatuses, and non-transitory computer-readable medium described herein may further include operations, features, means, or instructions for activating the uplink alignment timer based on receiving the random access response message including the timing advance.

Some examples of the method, apparatuses, and non-transitory computer-readable medium described herein may further include operations, features, means, or instructions for deactivating the uplink alignment timer based on receiving a contention resolution MAC-CE and before transmitting acknowledgment information for a downlink data channel transmission carrying the contention resolution MAC-CE, or both. In some examples of the method, apparatuses, and non-transitory computer-readable medium described herein, a value for the uplink alignment timer may be based on one or more of a maximum propagation delay between the UE and the base station, a duration of a transmission time interval, or a gap between a downlink data channel reception and an uplink control channel transmission, or a combination thereof.

A method of wireless communication at a UE is described. The method may include transmitting, to a base station, a random access message associated with a random access procedure and monitoring a contention resolution window associated with the random access procedure for a first downlink data channel transmission of a set of downlink data channel transmissions associated with the random access procedure, the first downlink data channel transmission carrying a contention resolution MAC-CE. The method may further include transmitting acknowledgment information for the first downlink data channel transmission carrying the contention resolution MAC-CE.

An apparatus for wireless communication is described. The apparatus may include a processor; and memory coupled to the processor, the processor and memory configured to transmit, to a base station, a random access message associated with a random access procedure and monitor a contention resolution window associated with the random access procedure for a first downlink data channel transmission of a set of downlink data channel transmissions associated with the random access procedure, the first downlink data channel transmission carrying a contention resolution MAC-CE. The processor and memory may be further configured to transmit acknowledgment information for the first downlink data channel transmission carrying the contention resolution MAC-CE.

Another apparatus for wireless communication is described. The apparatus may include means for transmitting, to a base station, a random access message associated with a random access procedure and means for monitoring a contention resolution window associated with the random access procedure for a first downlink data channel transmission of a set of downlink data channel transmissions associated with the random access procedure, the first downlink data channel transmission carrying a contention resolution MAC-CE. The apparatus may further include means for transmitting acknowledgment information for the first downlink data channel transmission carrying the contention resolution MAC-CE.

A non-transitory computer-readable medium storing code for wireless communication at a UE is described. The code may include instructions executable by a processor to transmit, to a base station, a random access message associated with a random access procedure and monitor a contention resolution window associated with the random access procedure for a first downlink data channel transmission of a set of downlink data channel transmissions associated with the random access procedure, the first downlink data channel transmission carrying a contention resolution MAC-CE. The code may further include instructions executable by the processor to transmit acknowledgment information for the first downlink data channel transmission carrying the contention resolution MAC-CE.

In some examples of the method, apparatuses, and non-transitory computer-readable medium described herein, the random access message includes a msg3. Some examples of the method, apparatuses, and non-transitory computer-readable medium described herein may further include operations, features, means, or instructions for determining to transmit the acknowledgment information for the first downlink data channel transmission carrying the contention resolution MAC-CE. In some examples of the method, apparatuses, and non-transitory computer-readable medium described herein, transmitting the acknowledgment information for the first downlink data channel transmission carrying the contention resolution MAC-CE may be based on the determining.

In some examples of the method, apparatuses, and non-transitory computer-readable medium described herein, transmitting the acknowledgment information may include operations, features, means, or instructions for transmitting the acknowledgment information based on the contention resolution window lapsing, the acknowledgment information including a negative acknowledgment. Some examples of the method, apparatuses, and non-transitory computer-readable medium described herein may further include operations, features, means, or instructions for receiving a configuration for a contention resolution timer, and setting, based on the configuration, a value for the contention resolution timer.

In some examples of the method, apparatuses, and non-transitory computer-readable medium described herein, the contention resolution window includes one or more DRX cycles. In some examples of the method, apparatuses, and non-transitory computer-readable medium described herein, monitoring the contention resolution window may include operations, features, means, or instructions for monitoring the contention resolution window during one or more active durations associated with the one or more DRX cycles.

DETAILED DESCRIPTION

Figure 1:
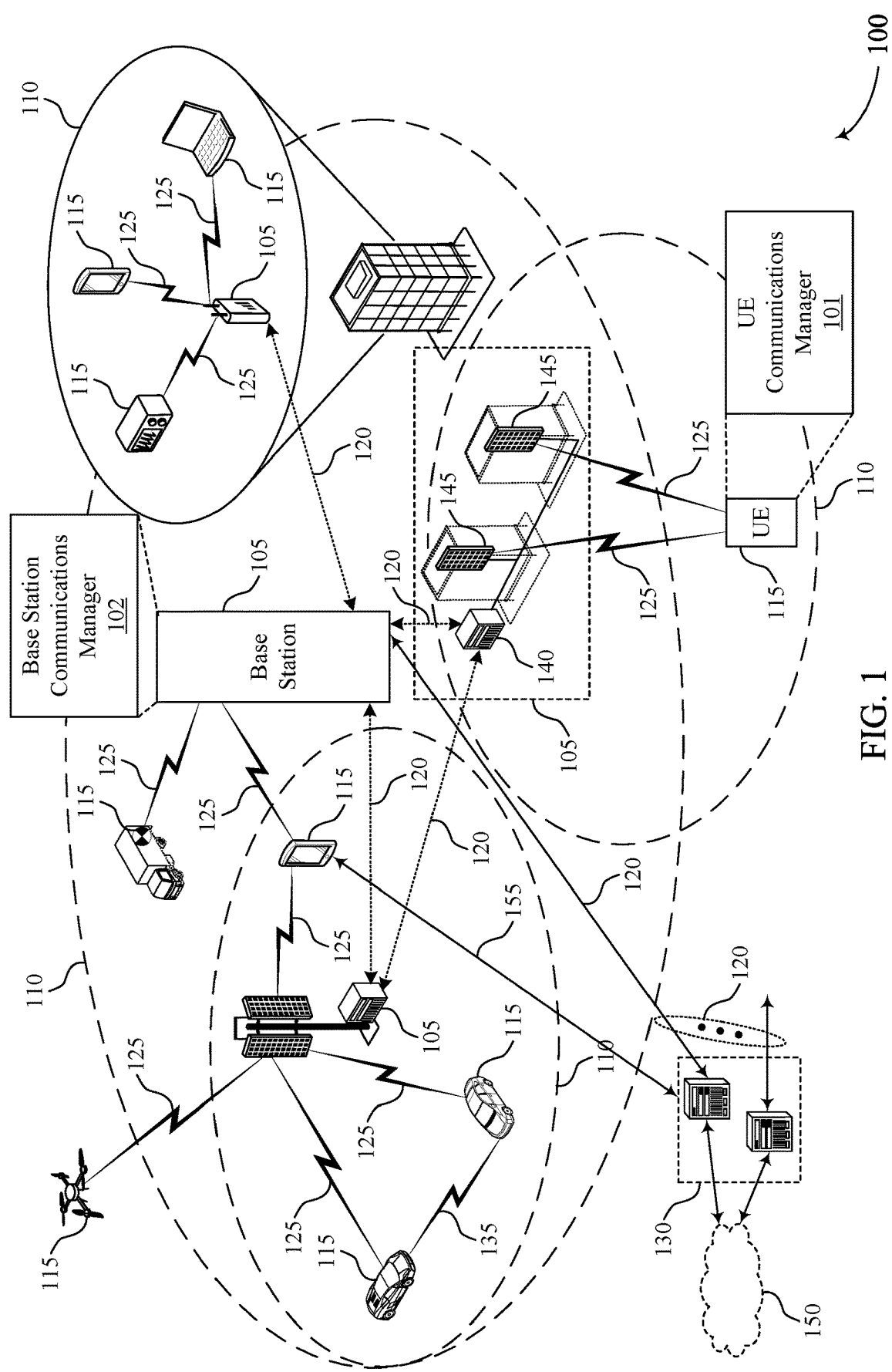
FIGS. 1 and 2 illustrate examples of wireless communication systems in accordance with one or more aspects of the present disclosure.

Communications systems may include multiple communication devices such as UEs and base stations, which may provide communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. Some communications systems, such as 4G and 5G systems, may support various random access procedures, such as a two-step or a four-step random access procedure. These random access procedures may also be contention-based or contention-free. Some communications systems, such as 4G and 5G systems, may support efficient contention resolution operations for contention-based random access procedures by reducing latencies associated with the contention resolution operations, among other examples. For example, some communications systems, such as non-terrestrial communications system (e.g., a low-earth orbit (LEO) communications system, a medium-earth orbit (MEO) communications system, a geosynchronous equatorial orbit (GEO) communications system) may experience improvements to random access procedures by supporting early contention resolution operations, as described herein.

By way of example, as part of a four-step random access procedure, a base station and a UE may exchange one or more random access messages (e.g., handshake messages), such as a random access message 1 (msg1), a random access message 2 (msg2), a msg3, and a random access message 4 (msg4). In this example, the random access procedure may be contention-based. To reduce latencies associated with the contention-based part of the random access procedure, the base station may perform an early contention resolution operation. The base station may perform the early contention resolution operation with the UE after reception of the msg3 during the random access procedure. In some examples, the contention resolution operation may correspond to a contention resolution window, which may be related to a contention resolution timer. For example, the contention resolution window may correspond to a time in which the UE may perform the contention resolution operation and may end at the expiration of the contention resolution timer.

Thus, the base station may perform the early contention resolution operation (i.e., attempt to resolve a contention) while pending transmission of the msg4 to the UE. As part of the early contention resolution operation, the base station may transmit a contention resolution MAC-CE without transmission of the msg4. The contention resolution MAC-CE may include a contention resolution identifier, which the UE may use to declare the random access procedure successful or unsuccessful. For example, the UE may receive the contention resolution identifier and compare it to an identifier specific to the UE (e.g., a cell-specific radio network temporary identifier (C-RNTI). When the identifiers match, the UE may declare the random access procedure successful. Otherwise, if there is no match between the identifiers, the UE considers having failed the random access procedure and may repeat the random access procedure with the base station.

By supporting early contention resolution operations, as described above, some communications systems, such as non-terrestrial communications system (e.g., a LEO, an MEO communications system, communications system, a GEO communications system) may experience improvements to random access procedures by supporting early contention resolution operations. For example, the base station may be a non-terrestrial base station (e.g., a satellite, a high-altitude platform station, etc.), and as a result of the early contention resolution operations may have additional time to prepare an RRC configuration to transmit in the msg4. In some examples, the base station may consist of a control unit (CU) (e.g., gNB-CU) and a distributed unit (DU) (e.g., a gNB-DU). The gNB-CU may be non-terrestrial, while the gNB-DU may be terrestrial (i.e., located on the ground). Alternatively, in some examples, the gNB-CU may be terrestrial, while the gNB-DU may be non-terrestrial. As such, there may be latency between the gNB-DU and the gNB-CU. For example, the gNB-DU may have to wait for the RRC configuration from the gNB-CU. The gNB-DU may transmit a contention resolution MAC-CE to the UE, while waiting to receive the RRC configuration from the gNB-CU.

The UE may, in some examples, be configured to disable HARQ feedback for random access procedures. As a result, in such an example, the base station may be unaware of whether the UE has received the contention resolution MAC-CE (including the contention resolution identifier) and whether it has determined that the random access procedure was a success or a failure. In some cases, HARQ feedback may be enabled only for a first physical downlink shared channel (PDSCH) carrying contention resolution MAC-CE. Otherwise, the HARQ feedback may be disabled for all other PDSCH. This may be hardcoded (e.g., by default) or may be indicated via an indication, as described herein. Various aspects of the described techniques relate to configuring the base station and the UE, to support flexible HARQ feedback to provide efficient contention resolution operations for contention-based random access procedures. For example, the base station and the UE may be configured to support reduced latencies associated with contention resolution operations when HARQ feedback is disabled or enabled based in part on a trigger (e.g., a transmitted or a received indication to enable HARQ feedback, etc.).

Operations performed by the UE may provide higher reliability and lower latency to communications when operating in 5G systems (including non-terrestrial communications systems). In some examples, configuring the UE to support flexible HARQ feedback for random access procedures, among other examples in 5G systems, may support reduced power consumption, coverage enhancements, and increased resource usage utilization, spectral efficiency, data rates, and capacity, among other benefits.

Aspects of the disclosure are initially described in the context of communications systems. Aspects of the disclosure are further illustrated by and described with reference to transmission timelines and process flows that relate to contention resolution for contention-based random access procedures. Aspects of the disclosure are further illustrated by and described with reference to apparatus diagrams, system diagrams, and flowcharts that relate to contention resolution for contention-based random access procedures.

FIG. 1 illustrates an example of a wireless communications system 100 in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A UE 115 may communicate with the core network 130 through a communication link 155.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support various random access procedures, such as a two-step or a four-step random access procedure. These random access procedures may also be contention-based or contention-free. As demand for communication efficiency increases, the wireless communications system 100 may support efficient contention resolution operations for contention-based random access procedures by reducing latencies associated with the contention resolution operations, among other examples. For example, the wireless communications system 100 may be a non-terrestrial communications system (e.g., a LEO communications system, a GEO communications system), and may experience improvements to random access procedures by supporting early contention resolution operations, as described herein.

UEs 115 may include a UE communications manager 101 that may support efficient contention resolution operations for contention-based random access procedures. The UE communications manager 101 may be an example of aspects of a UE communications manager as described in FIGS. 5 through 8. Similarly, base stations 105 may include a base station communications manager 102 that may support efficient contention resolution operations for contention-based random access procedures. The base station communications manager 102 may be an example of aspects of a base station communications manager as described in FIGS. 9 through 12.

By way of example, as part of a four-step random access procedure, a base station 105 and a UE 115 may exchange one or more random access messages (e.g., handshake messages), such as a msg1, a msg2, a msg3, and a msg4. In this example, the random access procedure may be contention-based. To reduce latencies associated with the contention-based part of the random access procedure, the base station 105 may perform an early contention resolution operation. The base station 105 may perform the early contention resolution operation with the UE 115 after reception of the msg3 during the random access procedure. In some examples, the contention resolution operation may correspond to a contention resolution window, which may be related to a contention resolution timer.

The base station 105 may perform the early contention resolution operation (i.e., attempt to resolve a contention) while pending transmission of the msg4 to the UE 115. As part of the early contention resolution operation, the base station 105 may transmit a contention resolution MAC-CE without transmission of the msg4. The contention resolution MAC-CE may include a contention resolution identifier, which the UE 115 may use to declare the random access procedure successful or unsuccessful. For example, the UE 115 may receive the contention resolution identifier and compare it to an identifier specific to the UE 115 (e.g., a C-RNTI). When the identifiers match, the UE 115 may declare the random access procedure successful. Otherwise, if there is no match between the identifiers, the UE 115 may determine that the random access procedure failed, and may repeat the random access procedure with the base station 105.

In some examples, the UE 115 may be configured to disable HARQ feedback for random access procedures. As a result, the base station 105 may be unaware of whether the UE 115 received the contention resolution MAC-CE (including the contention resolution identifier) and whether it determined that the random access procedure was a success or a failure. Various aspects of the described techniques relate to configuring the base station 105 and the UE 115, to support flexible HARQ feedback to provide efficient contention resolution operations for contention-based random access procedures. For example, the base station 105 and the UE 115 may be configured to support reduced latencies associated with contention resolution operations when HARQ feedback is disabled or enabled based in part on a trigger (e.g., an indication, a configuration).

Figure 2:
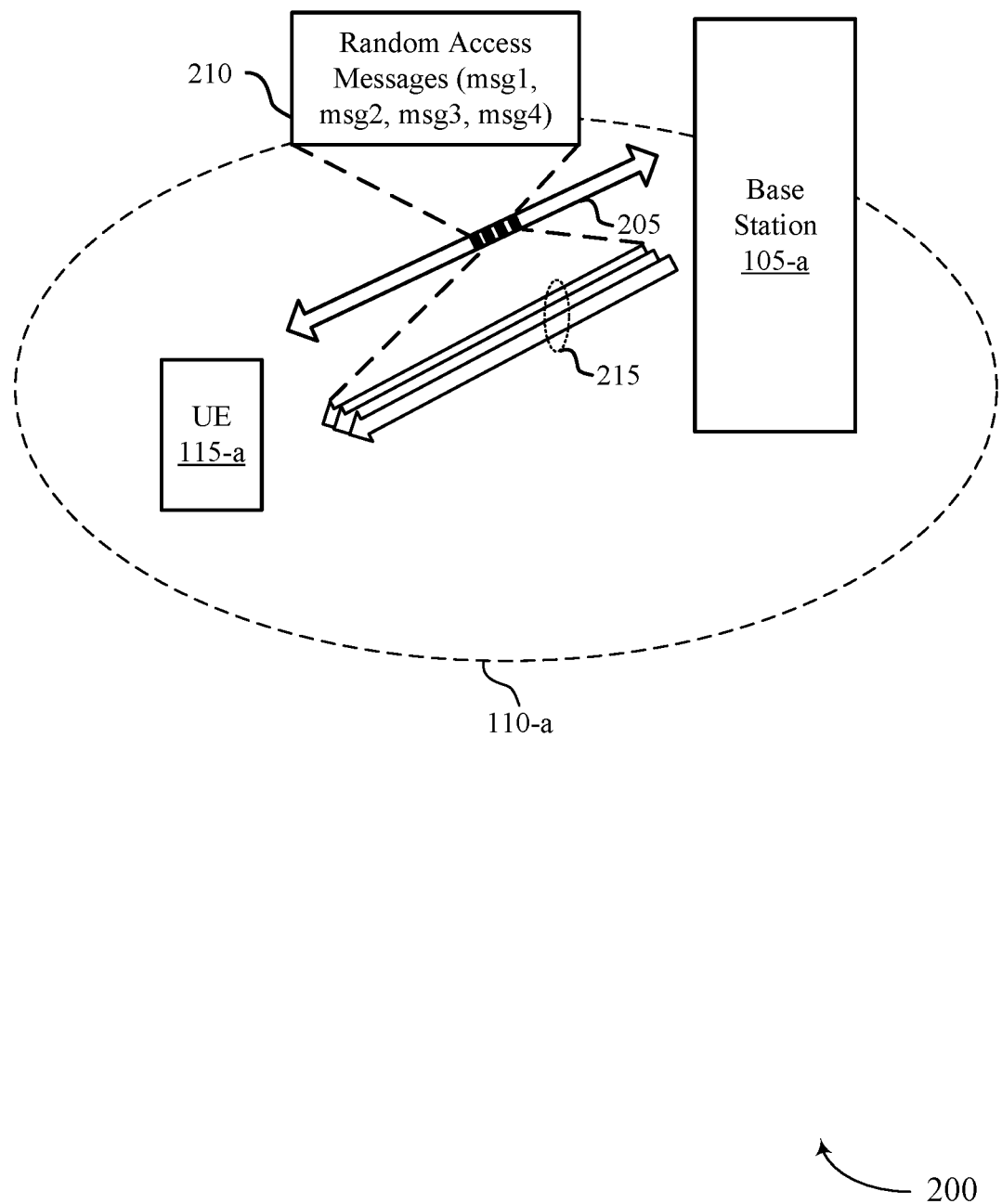

FIG. 2 illustrates an example of a wireless communications system 200 in accordance with one or more aspects of the present disclosure. In some examples, the wireless communications system 200 may implement aspects of the wireless communications system 100. For example, the wireless communications system 200 may include a UE 115-a and a base station 105-a within a geographic coverage area 110-a. The base station 105-a and the UE 115-a may be examples of the corresponding devices described with reference to FIG. 1. For example, the base station 105-a may be a terrestrial base station or a non-terrestrial base station, or a combination thereof (e.g., a gNB-CU plus a gNB-DU). In some examples, the wireless communications system 200 may support multiple radio access technologies including 4G systems such as LTE systems, LTE-A systems, or LTE-A Pro systems, 5G systems, which may be referred to as NR systems, and non-terrestrial systems (e.g., LEO systems, GEO systems). The wireless communications system 200 may also support improvements in power consumption and, in some examples, may promote enhanced efficiency for high reliability and low latency random access operations, among other benefits.

The base station 105-a and the UE 115-a may be configured with multiple antennas, which may be used to employ techniques such as transmit diversity, receive diversity, multiple-input multiple-output communications, or beamforming, or any combination thereof. The antennas of the base station 105-a and the UE 115-a may be located within one or more antenna arrays or antenna panels, which may support multiple-input multiple-output operations or transmit or receive beamforming. For example, the base station 105-a antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-*a* may use to support beamforming of communications with the UE 115-*a*. Likewise, the UE 115-*a* may have one or more antenna arrays that may support various multiple-input multiple-output or beamforming operations. Additionally or alternatively, an antenna panel may support radio frequency beamforming for a signal transmitted via one or more antenna ports. The base station 105-*a* and the UE 115-*a* may thus be configured to support directional communications via communication link 205 using the multiple antennas.

The UE 115-*a*, in the wireless communications system 200, may support operations to preserve resources (for example, time and frequency resources of the wireless communications system 200), a battery life of the UE 115-*a*, among other examples. In some examples, the UE 115-*a* may be configured to support operations to manage or improve the communication link 205 between the base station 105-*a* and the UE 115-*a*. For example, the base station 105-*a* may configure the UE 115-*a* to support a connection procedure (e.g., a random access procedure) with the UE 115-*a*. The base station 105-*a* and the UE 115-*a* may perform a random access procedure to establish a connection (e.g., the communication link 205). In other examples, the base station 105-*a* and the UE 115-*a* may perform a random access procedure to re-establish a connection (e.g., the communication link 205) after connection failure (e.g., radio-link failure) with the base station 105-*a*, or to establish a connection for handover to another base station, or the like.

The random access procedure may be a two-step or a four-step random access procedure. These random access procedures may also be contention-based or contention-free. As part of a four-step random access procedure, the base station 105-*a* and the UE 115-*a* may exchange one or more random access messages 210 (e.g., handshake messages), such as a msg1, a msg2, a msg3, and a msg4. In the example of FIG. 2, the base station 105-*a* may transmit and the UE 115-*a* may receive multiple downlink data channel transmissions 215 on the communication link 205. The downlink data channel transmissions 215 may be associated with the random access procedure. For example, the base station 105-*a* may transmit and the UE 115-*a* may receive the downlink data channel transmissions 215 during a contention resolution window associated with the random access procedure, as described herein. In some examples, one or more of the downlink data channel transmissions may carry one or more of the random access messages 210. The random access procedure may be contention-based. The msg1 may include a random access preamble or a sequence that may carry information, such as a UE identifier. The purpose of the preamble may be to provide an indication to the base station 105-*a* presence of a random access attempt, and to allow the base station 105-*a* to determine a delay (e.g., a timing delay) between the base station 105-*a* and the UE 115-*a*. The UE 115-*a* may transmit the msg1 to the base station 105-*a* on a physical random access channel (PRACH), for example.

The preamble of the msg1 may, in some examples, be defined by a preamble sequence and a cyclic prefix. A preamble sequence may be defined based in part on a Zadoff-Chu sequence. The UE 115-*a* may additionally, or alternatively, use a guard period to handle timing uncertainty of the msg1. For example, before beginning the random access procedure, the UE 115-*a* may obtain downlink synchronization with the base station 105-*a* based in part on a cell-search procedure. However, because the UE 115-*a* has not yet obtained uplink synchronization with the base station 105-*a*, there may be an uncertainty in uplink timing due to the location of the UE 115-*a* in the cell (e.g., geographic coverage area of base station 105-*a*) not being known. In some examples, the uncertainty in uplink timing may be based in part on a dimension (e.g., size, area) of the cell (e.g., the geographic coverage area 110-*a*). Therefore, including a cyclic prefix to the msg1 may be beneficial, in some examples, for handling the uncertainty in uplink timing.

Per cell, there may be a number of preamble sequences (e.g., 64 preamble sequences). The UE 115-*a* may select a preamble sequence from a set of sequences in a cell (e.g., geographic coverage area of base station 105-*a*) based in part on a randomness selection. In some examples, the UE 115-*a* may select a preamble sequence based in part on an amount of traffic that the UE 115-*a* has for transmission on an uplink shared channel (UL-SCH). From the preamble sequence that the UE 115-*a* selected, the base station 105-*a* may determine the amount of uplink resources to be granted to the UE 115-*a*.

As described herein, some examples of a random access procedure may be contention-based or contention-free. When performing a contention-based random access procedure, the UE 115-*a* may select a preamble sequence from a set of sequences. That is, as long as other UEs (not shown) are not performing a random access attempt using the same sequence at a same temporal instance, no collisions will occur and the random access attempt may be detected by the base station 105-*a*. If the UE 115-*a* is performing a contention-free random access attempt, for example, for a handover to a new cell, the preamble sequence to use may be explicitly signaled (e.g., in control information) by the base station 105-*a*. To avoid collisions or interference, the base station 105-*a* may select a contention-free preamble sequence from sequences not associated with the contention-based random access attempt.

Upon receiving the msg1, the base station 105-*a* may respond appropriately with the msg2. For example, the base station 105-*a* may transmit the msg2 to the UE 115-*a* on a downlink shared channel (DL-SCH) or a physical downlink control channel (PDCCH). In some examples, the msg2 may have a same or a different configuration (format) compared to the msg1. The msg2 may carry information for the UE 115-*a*, where the information is determined by the base station 105-*a* based in part on information carried in the msg1. For example, the information in the msg2 may include an index of a preamble sequence detected and for which the response is valid, a timing advance determined based in part on the preamble sequence detected, a scheduling grant indicating time and frequency resources for the UE 115-*a* to use for transmission of a next random access message transmission by the UE 115-*a*, or a network identifier (e.g., an RNTI) for further communication with the UE 115-*a*, or the like.

In some examples, upon reception of the timing advance in the msg2, the UE 115-*a* may activate an uplink alignment timer (e.g., timeAlignmentTimer). The UE 115-*a* may extend a value of the uplink alignment timer to account for a propagation delay period between the base station 105-*a* and the UE 115-*a*. A contention resolution may be considered successful for a system information request, after receiving a contention resolution identifier MAC-CE. The UE 115-*a* may deactivate the uplink alignment timer without waiting to transmit HARQ feedback, if configured.

Once the UE 115-*a* successfully receives the msg2, the UE 115-*a* may obtain uplink synchronization with the base station 105-*a*. In some examples, before data transmission from the UE 115-*a*, a unique identifier within the cell (e.g., C-RNTI) may be assigned to the UE 115-*a*. In some examples, depending on an RRC state (e.g., an RRC connected state, an RRC ideal state) of the UE 115-*a* there may be a need for additional message (e.g., a connection request message) exchange for setting up the connection between the base station 105-*a* and the UE 115-*a*. The UE 115-*a* may transmit any necessary messages, for example, the msg3 to the base station 105-*a* using UL-SCH resources (or physical uplink shared channel (PUSCH) resources) assigned in the msg2. The msg2 may include a UE identifier for contention resolution. If the UE 115-*a* is in an RRC connected state, for example, the UE identifier may be a C-RNTI. Otherwise, the UE identifier may be specific to the UE 115-*a*.

The base station 105-*a* may receive the msg3 and may respond properly, for example, by transmitting the msg4, which may be a contention resolution message. When multiple UEs (including UE 115-*a*) are performing simultaneously random access attempts using a same preamble sequence, these UEs may result in listening for a same response message (e.g., the msg4). Each UE (including UE 115-*a*) may receive the msg4 and compare an identifier (e.g., network identifier) in the msg4 to the identifier specified in the msg3. When the identifiers match, the corresponding UE (e.g., UE 115-*a*) may declare the random access procedure successful. UEs that do not identify a match between the identifiers are considered to have failed the random access procedure and may repeat the random access procedure with the base station 105-*a*. As a result of the connection procedure, the base station 105-*a* and the UE 115-*a* may establish a connection (e.g., the communication link 205).

In some examples, the base station 105-*a* and the UE 115-*a* may be configured to support early contention resolution for the random access procedure to reduce latencies associated with the contention-based part of the random access procedure. For example, the base station 105-*a* may perform an early contention resolution operation after reception of the msg3 from the UE 115-*a* during the random access procedure. Example of a transmission timeline is described in more detail with reference to FIG. 3.

Figure 3:
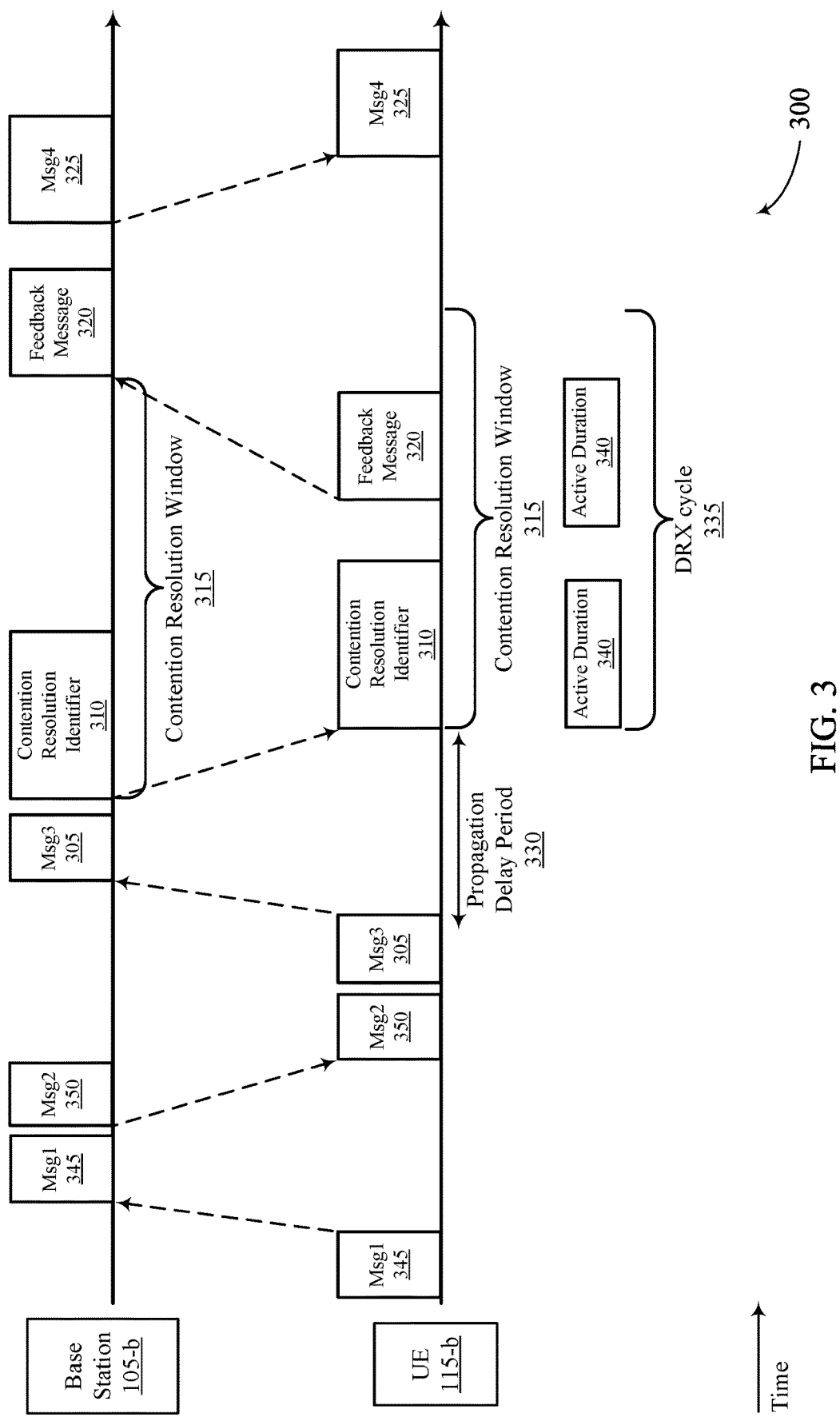
FIGS. 3 and 4 illustrate examples of transmission timelines in accordance with one or more aspects of the present disclosure.

FIG. 3 illustrates an example of a transmission timeline 300 in accordance with one or more aspects of the present disclosure. The transmission timeline 300 may implement aspects of the wireless communications systems 100 and 200 described with reference to FIGS. 1 and 2, respectively. For example, the transmission timeline 300 may be based on a configuration by a base station 105-*b*, and implemented by a UE 115-*b*, which may be examples of the corresponding devices described with reference to FIGS. 1 and 2. The transmission timeline 300 may illustrate a portion of a random access procedure. For example, the transmission timeline 300 may be applicable to implementations or instances when a base station 105-*b* and a UE 115-*b* are performing early contention resolution for a random access procedure (e.g., a four-step random access procedure), which may be contention-based.

As part of the random access procedure, the UE 115-*b* may transmit a msg1 345 to the base station 105-*b*. The msg1 345 may include a random access preamble or a sequence that may carry information, such as a UE identifier for the UE 115-*b*. In response to the msg1 345, the base station 105-*b* may transmit a msg2 350 to the base station 105-*b*. The msg2 350 may carry information for the UE 115-*b*, where the information is determined by the base station 105-*b* based in part on information carried in the msg1 345. For example, the information in the msg2 350 may include an index of a preamble sequence detected and for which the response is valid, a timing advance determined based in part on the preamble sequence detected, a scheduling grant indicating time and frequency resources for the UE 115-*b* to use for transmission of a next random access message transmission by the UE 115-*b* (e.g., a msg3), or a network identifier (e.g., an RNTI) for further communication with the UE 115-*b*, or the like.

In an example of a four-step random access procedure, the UE 115-*b* may transmit a msg3 305 to the base station 105-*b*. In the example of FIG. 3, the base station 105-*b* and the UE 115-*b* may support early contention resolution for the random access procedure. For example, the base station 105-*a* may perform an early contention resolution operation after reception of the msg3 305 from the UE 115-*b* during the random access procedure. In other words, the base station 105-*b* may perform the early contention resolution operation (i.e., attempt to resolve a contention) while pending transmission of a msg4 325 to the UE 115-*b*. As part of the early contention resolution operation, the base station 105-*b* may transmit a contention resolution identifier 310 in a contention resolution MAC-CE during a contention resolution window 315, without transmission of the msg4 325. The contention resolution window 315 may correspond to a system bandwidth, which may be associated with time resources (e.g., a symbol, a minislot, a slot, a subframe, a frame, etc.) as well as frequency resources (e.g., subcarriers, carriers, etc.).

The UE 115-*b* may use the contention resolution identifier 310 in the contention resolution MAC-CE to declare the random access procedure successful or unsuccessful. For example, the UE 115-*b* may receive the contention resolution identifier and compare it to an identifier specific to the UE 115-*b* (e.g., a cell-specific radio network temporary identifier (C-RNTI). When the identifiers match, the UE 115-*b* may declare the random access procedure successful. Otherwise, if there is no match between the identifiers, the UE 115-*b* may determine that the contention resolution failed, and may repeat the random access procedure with the base station 105-*b*. In some examples, the UE 115-*b* may transmit a feedback message 320 (e.g., a HARQ message) to the base station 105-*b* indicating whether the contention resolution is a success (e.g., via an acknowledgment) or a failure (e.g., via a negative acknowledgment). In some examples, if the contention resolution is a success, the base station 105-*b* may transmit an RRC configuration in the msg4 325 on a PDSCH.

The UE 115-*b* may, in some examples, monitor the contention resolution window 315, for the contention resolution identifier 310, according to one or multiple DRX cycles. For example, the contention resolution window 315 may correspond to a DRX cycle 335, and the UE 115-*b* may monitor the contention resolution window 315, during one or more active durations 340 of the DRX cycle 335, for the contention resolution MAC-CE carrying the contention resolution identifier 310. In some examples, the UE 115-*b* may reduce power consumption (e.g., operate in a partial low power state) by refraining from monitoring the contention resolution window 315 during an inactive duration of the DRX cycle 335. In some examples, the one or more active durations 340 may be contiguous or non-contiguous. Similarly, one or more inactive durations of the DRX cycle 335 may be contiguous or non-contiguous.

In some examples, the contention resolution window 315 may be related to a contention resolution timer, and the UE 115-*b* may active or deactivate the contention resolution timer based in part on a propagation delay period 330. In the example of non-terrestrial communications, such as when the base station 105-*b* is a satellite or a high-altitude platform station, or the like, the UE 115-*b* may be configured with a value for the contention resolution timer to cover a propagation delay period 330 between the base station 105-*b* and the UE 115-*b*. The propagation delay period 330 may be due to a propagation distance from the base station 105-*b* (e.g., satellite) to the UE 115-*b* on the ground, and vice-versa. As such, the UE 115-*b* may active or deactivate the contention resolution timer based in part on a propagation delay period 330, and perform a contention resolution operation according to the activation or deactivation of the contention resolution timer. In some examples, the UE 115-*b* may activate the contention resolution timer based in part on transmitting the msg3 305, and deactivate the contention resolution timer after lapsing (e.g., the value expiring).

The base station 105-*b* may transmit, and the UE 115-*b* may receive, a configuration for the contention resolution timer and set, based on the configuration, a value for the contention resolution timer. The value for the contention resolution timer may be based on one or more of a maximum propagation delay between the UE 115-*b* and the base station 105-*b*, a duration of a transmission time interval (TTI) associated with a transmission of the contention resolution identifier, or a gap between a downlink data channel (e.g., PDSCH) reception and an uplink control channel (e.g., PUCCH) transmission, or a combination thereof. In some examples, the value for the contention resolution timer may be a factor of the above one or more. That is, the value for the contention resolution timer may be 2× the maximum propagation delay between the UE 115-*b* and the base station 105-*b* plus the duration of the TTI associated with the transmission of the contention resolution identifier plus the gap between the downlink data channel (e.g., PDSCH) reception and the uplink control channel (e.g., PUCCH) transmission.

By supporting an adaptative contention resolution timer, the base station 105-*b* and the UE 115-*b* may provide a higher reliability to the random access procedures (e.g., mitigate or reduce missing random access messages due to high propagation delay, or the like). Additionally, the base station 105-*b* and the UE 115-*b* may experience improvements to power consumption and, in some examples, may promote enhanced efficiency for high reliability and low latency operations in 5G systems, among other benefits by supporting the adaptative contention resolution timer.

Returning to FIG. 2, in some examples, a temporary C-RNTI and C-RNTI may be the same, more than one UE 115 may receive a same PDSCH. The RRC message (e.g., RRC setup message) can be extended to include a contention resolution identifier. To reduce overhead, the base station 105-*a* and the UE 115-*a* may be configured to support a reduced contention resolution identifier in the RRC message. Alternatively, the contention resolution identifier may be a default contention resolution identifier. In some examples, if the UE 115-*a* receives the RRC configuration in the msg4 without contention resolution, the UE 115-*a* may provide an indication in a random access message 5 (msg5) (e.g., an RRC setup complete message) that contention has not been resolved. The base station 105-*a* may confirm or verify an RRC reconfiguration for the UE 115-*a* in a subsequent contention resolution operation (e.g., of a subsequent random access procedure attempt). In some other examples, the UE 115-*a* may ignore the msg5 as no contention resolution identifier has been received. In some examples, the UE 115-*a* may be configured to disable HARQ feedback for the random access procedure. Example of a transmission timeline related to disabled HARQ feedback is described in more detail with reference to FIG. 4.

Figure 4:
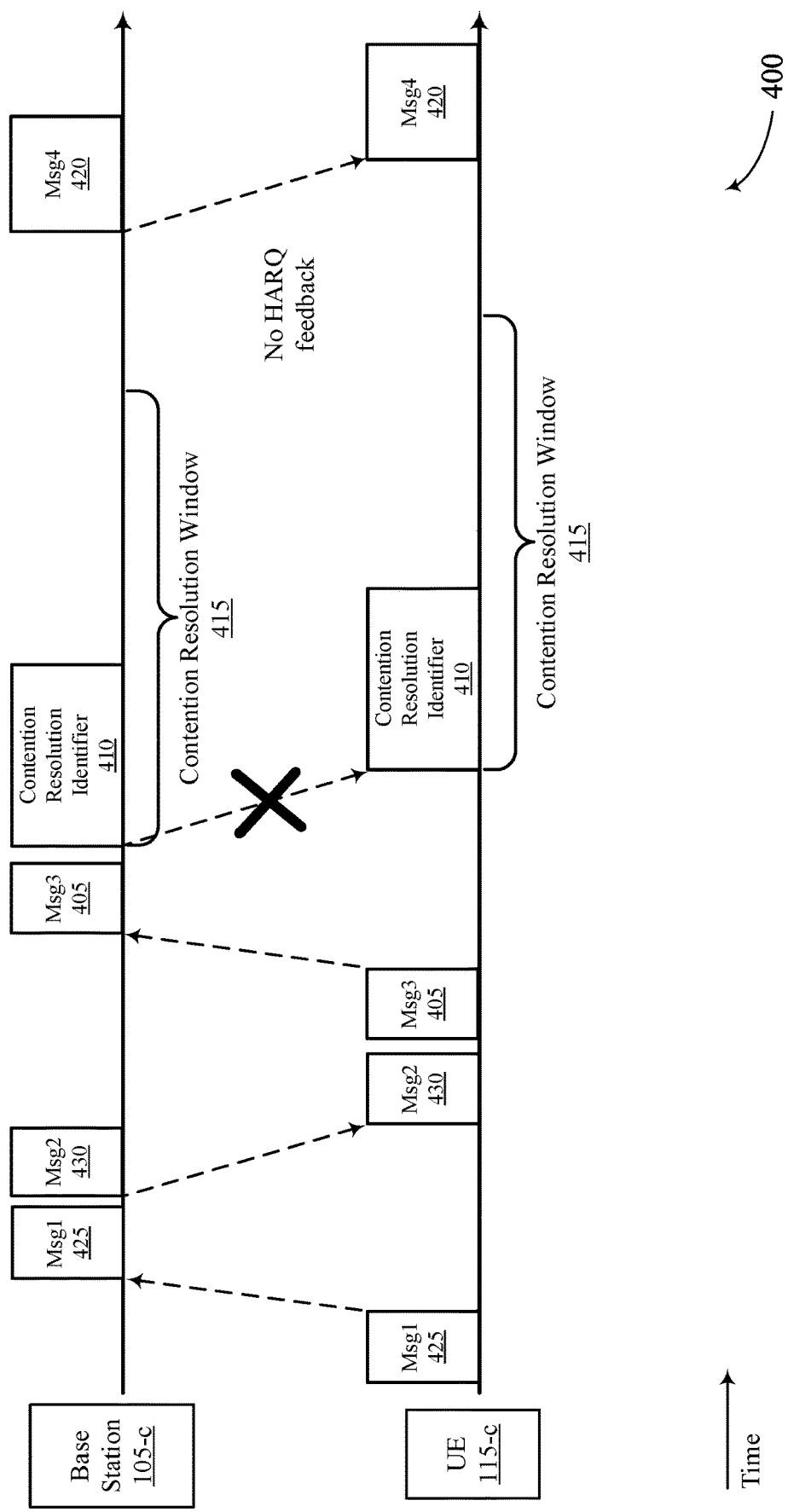

FIG. 4 illustrates an example of a transmission timeline 400 in accordance with one or more aspects of the present disclosure. The transmission timeline 400 may implement aspects of the wireless communications systems 100 and 200 described with reference to FIGS. 1 and 2, respectively. For example, the transmission timeline 400 may be based on a configuration by a base station 105-*c*, and implemented by a UE 115-*c*, which may be examples of the corresponding devices described with reference to FIGS. 1 and 2. The transmission timeline 400 may illustrate a portion of a random access procedure. For example, the transmission timeline 400 may be applicable to implementations or instances when a base station 105-*c* and a UE 115-*c* are configured to support early contention resolution for a random access procedure, which may be contention-based.

As part of the random access procedure, the UE 115-*c* may transmit a msg1 425 to the base station 105-*c*. The msg1 425 may include a random access preamble or a sequence that may carry information, such as a UE identifier for the UE 115-*c*. In response to the msg1 425, the base station 105-*c* may transmit a msg2 430 to the base station 105-*c*. The msg2 430 may carry information for the UE 115-*c*, where the information is determined by the base station 105-*c* based in part on information carried in the msg1 425. For example, the information in the msg2 430 may include an index of a preamble sequence detected and for which the response is valid, a timing advance determined based in part on the preamble sequence detected, a scheduling grant indicating time and frequency resources for the UE 115-*c* to use for transmission of a next random access message transmission by the UE 115-*c* (e.g., a msg3), or a network identifier (e.g., an RNTI) for further communication with the UE 115-*c*, or the like.

In an example of a four-step random access procedure, the UE 115-*c* may transmit a msg3 405 to the base station 105-*c*. In the example of FIG. 4, the base station 105-*c* and the UE 115-*c* may support early contention resolution for the random access procedure. For example, the base station 105-*c* may perform an early contention resolution operation after reception of the msg3 405 from the UE 115-*c* during the random access procedure. In other words, the base station 105-*c* may perform the early contention resolution operation (i.e., attempt to resolve a contention) while pending transmission of a msg4 420 to the UE 115-*c*. As part of the early contention resolution operation, the base station 105-*c* may transmit a contention resolution identifier 410 in a contention resolution MAC-CE, during a contention resolution window 415, without transmission of the msg4 420. The contention resolution window 415 may correspond to a system bandwidth, which may be associated with time resources (e.g., a symbol, a minislot, a slot, a subframe, a frame, etc.) as well as frequency resources (e.g., subcarriers, carriers, etc.).

The UE 115-*c* may use the contention resolution identifier 410 in the contention resolution MAC-CE to declare the random access procedure successful or unsuccessful. For example, the UE 115-*c* may receive the contention resolution identifier and compare it to an identifier specific to the UE 115-*c* (e.g., a cell-specific radio network temporary identifier (C-RNTI). When the identifiers match, the UE 115-*c* may declare the random access procedure successful. Otherwise, if there is no match between the identifiers, the UE 115-*c* considers having failed the contention resolution and may repeat the random access procedure with the base station 105-*c*.

In the example of FIG. 4, however, the UE 115-*c* may not transmit any feedback messages (e.g., HARQ messages) to the base station 105-c to indicate whether the contention resolution is a success (e.g., via an acknowledgment) or a failure (e.g., via a negative acknowledgment). In some cases, if the base station 105-c incorrectly assumes that the UE 115-c received the contention resolution identifier 410, while the UE 115-c actually did not receive the contention resolution identifier 410, the base station 105-c may transmit an RRC configuration in the msg4 420 on a PDSCH after expiration of the contention resolution window 415. Thus, the base station 105-c may be unaware of whether the UE 115-c received the contention resolution MAC-CE (including the contention resolution identifier 410) and whether it determined that the random access procedure was a success or a failure.

Returning to FIG. 2, to mitigate the problem described in FIG. 4, the base station 105-a and the UE 115-a may be configured to support flexible HARQ feedback to provide efficient contention resolution operations for contention-based random access procedures. For example, the base station 105-a and the UE 115-a may be configured to support reduced latencies associated with contention resolution operations when HARQ feedback is disabled or enabled. The UE 115-a may transmit, to the base station 105-a, the msg3 associated with the random access procedure. In this example, HARQ feedback is disabled for the random access procedure.

The UE 115-a may monitor a contention resolution window associated with the random access procedure for a first downlink data channel transmission (e.g., a PDSCH transmission) associated with the msg4. The first downlink data channel transmission (e.g., the PDSCH transmission) may carry a contention resolution MAC-CE. The UE 115-a may transmit acknowledgment information (e.g., HARQ feedback) for the first downlink data channel transmission (e.g., the PDSCH transmission) carrying the contention resolution MAC-CE based on an indication to enable the HARQ feedback (e.g., acknowledgment or negative acknowledgment). Thus, the UE 115-a may be configured to exclusively provide HARQ feedback for a first PDSCH received for the msg4 (i.e., PDSCH carrying the contention resolution MAC-CE) even when HARQ feedback is initially disabled.

In some examples, the UE 115-a may identify the indication to enable the HARQ feedback in UE context information. In some other examples, the indication indicating whether or not to provide the HARQ feedback may be indicated in the msg3 (e.g., in downlink RRC message). In some examples, the UE 115-a may identify a default configuration to enable the HARQ feedback. In other examples, the indication may be configured or broadcast by the base station 105-a. Additionally, or alternatively, the indication may be provided in downlink communications carrying the contention resolution MAC-CE. For example, the UE 115-a may receive the indication in the contention resolution MAC-CE. The indication may be a single bit or multi-bit indication, which may be a reserved bit or bits in a MAC-CE field of the contention resolution MAC-CE. In some examples, the UE 115-a may receive a DCI message scheduling the first downlink data channel transmission (e.g., the first PDSCH transmission) carrying the contention resolution MAC-CE. The DCI message may include the indication to enable the HARQ feedback. In other words, a DCI scheduling a PDSCH carrying a contention resolution MAC-CE can indicate whether to enable the HARQ feedback for the random access procedure.

The UE 115-a may receive, from the base station 105-a, a resource allocation associated with one or more uplink control channel resources to transmit the HARQ feedback.

In some examples, the UE 115-a may determine resources (e.g., uplink control channel resources) associated with an uplink control channel (e.g., PUCCH) based on an indication in the contention resolution MAC-CE. The indication may be a logical channel identifier. The resources may also be adjacent to an ending resource of the contention resolution window. That is, the resource for the HARQ feedback can be preconfigured at the end of the contention resolution window. The resources may include time resources (e.g., a symbol, a minislot, a slot, a subframe, a frame, etc.).

In some other examples, the UE 115-a may receive a DCI message scheduling the resources associated with the uplink control channel. That is, PUCCH acknowledgment resources can be provided by a DCI message. As such, the UE 115-a may determine the scheduled resources based on one or more resource indices in the DCI message. The one or more resource indices may correspond to the scheduled resources. In other words, multiple predefined PUCCH acknowledgment resources can be defined and an index indicating the PUCCH acknowledgment resources to be used can be indicated by the DCI message.

The UE 115-a may, in some examples, determine a failure to receive the first downlink data channel transmission (e.g., the first PDSCH) carrying the contention resolution MAC-CE. In this case, the UE 115-a may transmit a negative acknowledgment to the base station 105-a. For example, the UE 115-a may have received a PDCCH (a PDSCH and feedback scheduling) but fails to receive a PDSCH carrying a MAC-CE, thereby triggering a negative acknowledgment. In some examples, the UE 115-a may transmit the negative acknowledgment after an expiry of the contention resolution timer. For example, if the UE 115-a receives nothing in the contention resolution window, then the UE 115-a may transmit the negative acknowledgment before declaring a failure for the random access procedure. In some examples, the UE 115-a may wait for an expiration of the contention resolution timer (e.g., 2× propagation delay time to receive any PDCCH after sending negative acknowledgment). If nothing is received, the UE 115-a can re-try to transmit the msg1 at a next occasion (e.g., a subsequent contention resolution window) skipping any backoffs.

In some examples, the HARQ feedback may be disabled, and the UE 115-a may not support flexible HARQ feedback (e.g., acknowledgment, negative acknowledgment). For example, the UE 115-a may monitor a contention resolution window associated with the random access procedure for a downlink data channel transmission (e.g., a PDSCH transmission) carrying a contention resolution MAC-CE, and refrain from transmitting, based on the disabled HARQ feedback, acknowledgment information (e.g., HARQ feedback) for the downlink data channel transmission carrying the random access response message including the contention resolution MAC-CE. In some other examples, the base station 105-a and the UE 115-a may be configured to not support early contention resolution (i.e., the msg4 includes contention resolution MAC-CE plus downlink common control channel (CCCH) and dedicated control channel (DCCH) SDU.

To mitigate the problem described herein, the base station 105-a and the UE 115-a may be configured to support a number of repetitions associated with the downlink data channel transmission (e.g., PDSCH) carrying the contention resolution MAC-CE. For example, the UE 115-a may be configured to monitor the contention resolution window for a number of repetitions associated with the downlink data channel transmission carrying the contention resolution MAC-CE. In some examples, the UE 115-a may receive a configuration including an indication of the number of repetitions associated with the downlink data channel transmission carrying the contention resolution MAC-CE. In some examples, a single PDCCH may schedule multiple transport blocks including repeated contention resolution MAC-CEs in the msg4.

Figure 5:
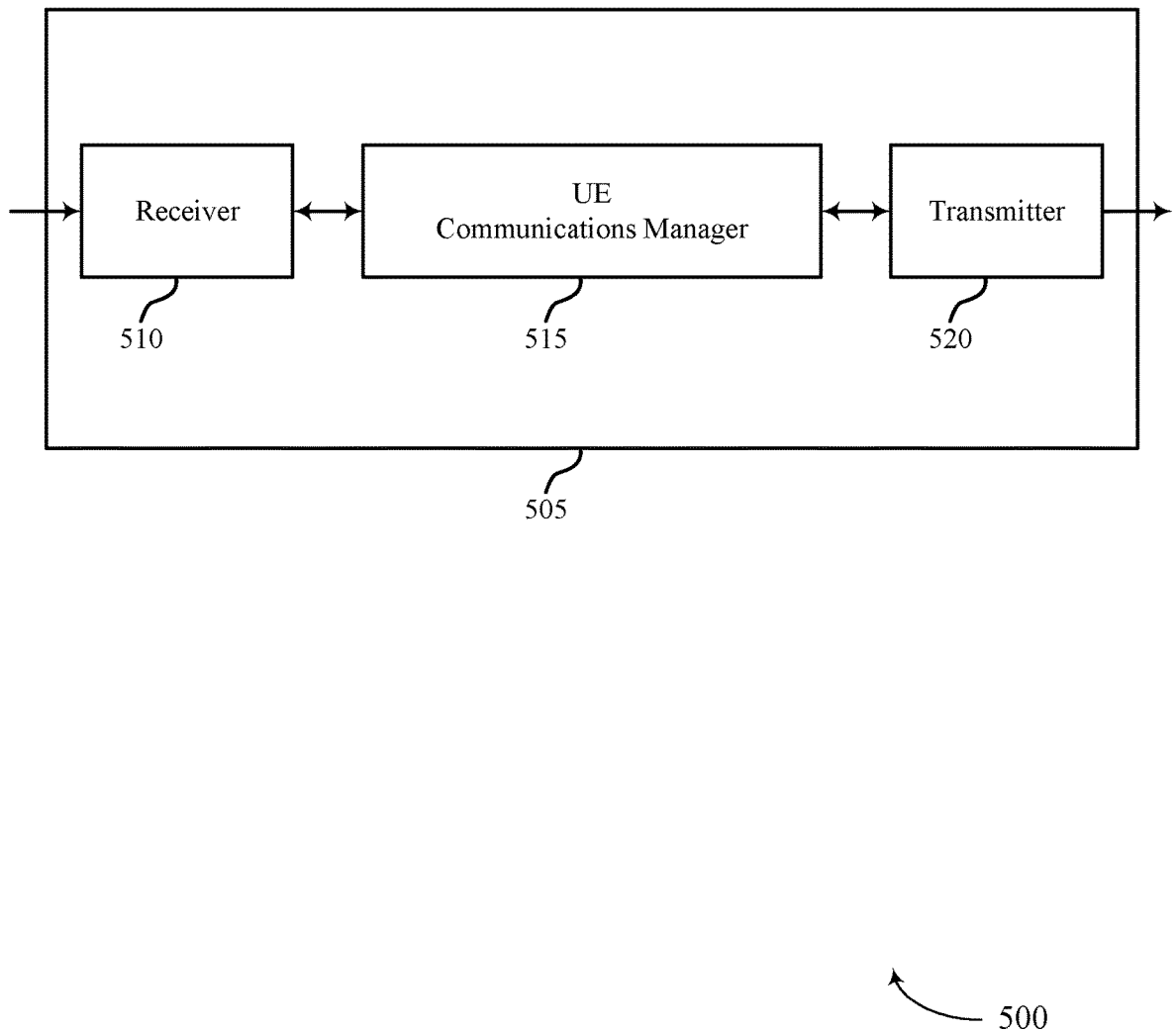
FIGS. 5 and 6 show block diagrams of devices in accordance with one or more aspects of the present disclosure.

FIG. 5 shows a block diagram 500 of a device 505 in accordance with one or more aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to contention resolution in new radio non-terrestrial networks, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may determine that HARQ feedback is disabled, transmit, to a base station, a random access message associated with a random access procedure based on determining that the HARQ feedback is disabled, initiate a contention resolution window associated with the random access procedure for a downlink data channel transmission of a set of downlink data channel transmissions associated with the random access procedure, and receive, during the contention resolution window, the downlink data channel transmission, the downlink data channel transmission carrying a contention resolution MAC-CE.

The UE communications manager 515 may also determine that HARQ feedback is disabled for a random access procedure, transmit, to a base station, a random access message associated with the random access procedure, based on determining that the HARQ feedback is disabled for the random access procedure, and refrain from transmitting, based on the disabled HARQ feedback, acknowledgment information for a downlink data channel transmission carrying a random access response message including a contention resolution MAC-CE.

The UE communications manager 515 may also transmit, to a base station, a random access message associated with a random access procedure, where a HARQ feedback is disabled for the random access procedure, monitor a contention resolution window associated with the random access procedure for a first downlink data channel transmission of a set of downlink data channel transmissions associated with the random access procedure, the first downlink data channel transmission carrying a contention resolution MAC-CE, and transmit acknowledgment information for the first downlink data channel transmission carrying the contention resolution MAC-CE based on an indication to enable the HARQ feedback.

The UE communications manager 515 may also transmit, to a base station, a random access message associated with a random access procedure, where a HARQ feedback is disabled for the random access procedure, monitor a contention resolution window associated with the random access procedure for a downlink data channel transmission carrying a contention resolution MAC-CE, and refrain from transmitting, based on the disabled HARQ feedback, acknowledgment information for the downlink data channel transmission carrying the random access response message including the contention resolution MAC-CE.

The UE communications manager 515 may also transmit, to a base station, a random access message associated with a random access procedure, determine that HARQ feedback is disabled for the random access procedure, and refrain from transmitting, based on the disabled HARQ feedback, acknowledgment information for a downlink data channel transmission carrying a random access response message including one or more of a contention resolution MAC-CE or an SDU associated with a downlink common control channel, or both.

The UE communications manager 515 may also transmit, to a base station, a random access message associated with a random access procedure, receive a random access response message associated with the random access procedure, the random access response message including a timing advance, determine that HARQ feedback is disabled for the random access procedure, and control an uplink alignment timer based on the timing advance or the disabled HARQ feedback, or both.

The UE communications manager 515 may also transmit, to a base station, a random access message associated with a random access procedure, receive a configuration for a contention resolution timer, set, based on the configuration, a value for the contention resolution timer, monitor a contention resolution window associated with the random access procedure for a first downlink data channel transmission of a set of downlink data channel transmissions associated with the random access procedure based on setting the value for the contention resolution timer, the first downlink data channel transmission carrying a contention resolution MAC-CE, and transmit acknowledgment information for the first downlink data channel transmission carrying the contention resolution MAC-CE.

The UE communications manager 515 may also transmit, to a base station, a random access message associated with a random access procedure, monitor a contention resolution window associated with the random access procedure for a first downlink data channel transmission of a set of downlink data channel transmissions associated with the random access procedure, the first downlink data channel transmission carrying a contention resolution MAC-CE, and transmit acknowledgment information for the first downlink data channel transmission carrying the contention resolution MAC-CE. The UE communications manager 515 may be an example of aspects of the UE communications manager 810 described herein.

The UE communications manager 515 may be an example of means for performing various aspects of managing contention resolution as described herein. The UE communications manager 515, or its sub-components, may be implemented in hardware (e.g., in UE communications management circuitry). The circuitry may comprise of a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the UE communications manager 515, or its sub-components, may be implemented in code (e.g., as communications management software or firmware) executed by a processor, or any combination thereof. If implemented in code executed by a processor, the functions of the UE communications manager 515, or its sub-components may be executed by a general-purpose processor, a DSP, an ASIC, an FPGA or other programmable logic device.

In some examples, the UE communications manager 515 may be configured to perform various operations (e.g., receiving, determining, monitoring, initiating, transmitting) using or otherwise in cooperation with the receiver 510, the transmitter 520, or both.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the UE communications manager 515 in accordance with examples as described herein, the device 505 (e.g., a processor controlling or otherwise coupled to the receiver 510, the UE communications manager 515, the transmitter 520, or a combination thereof) may reduce processing resources and power consumption associated with random access procedures. For example, by supporting early contention resolution operations, the device 505 may promote enhanced efficiency for high reliability and low latency random access operations, among other benefits.

Figure 6:
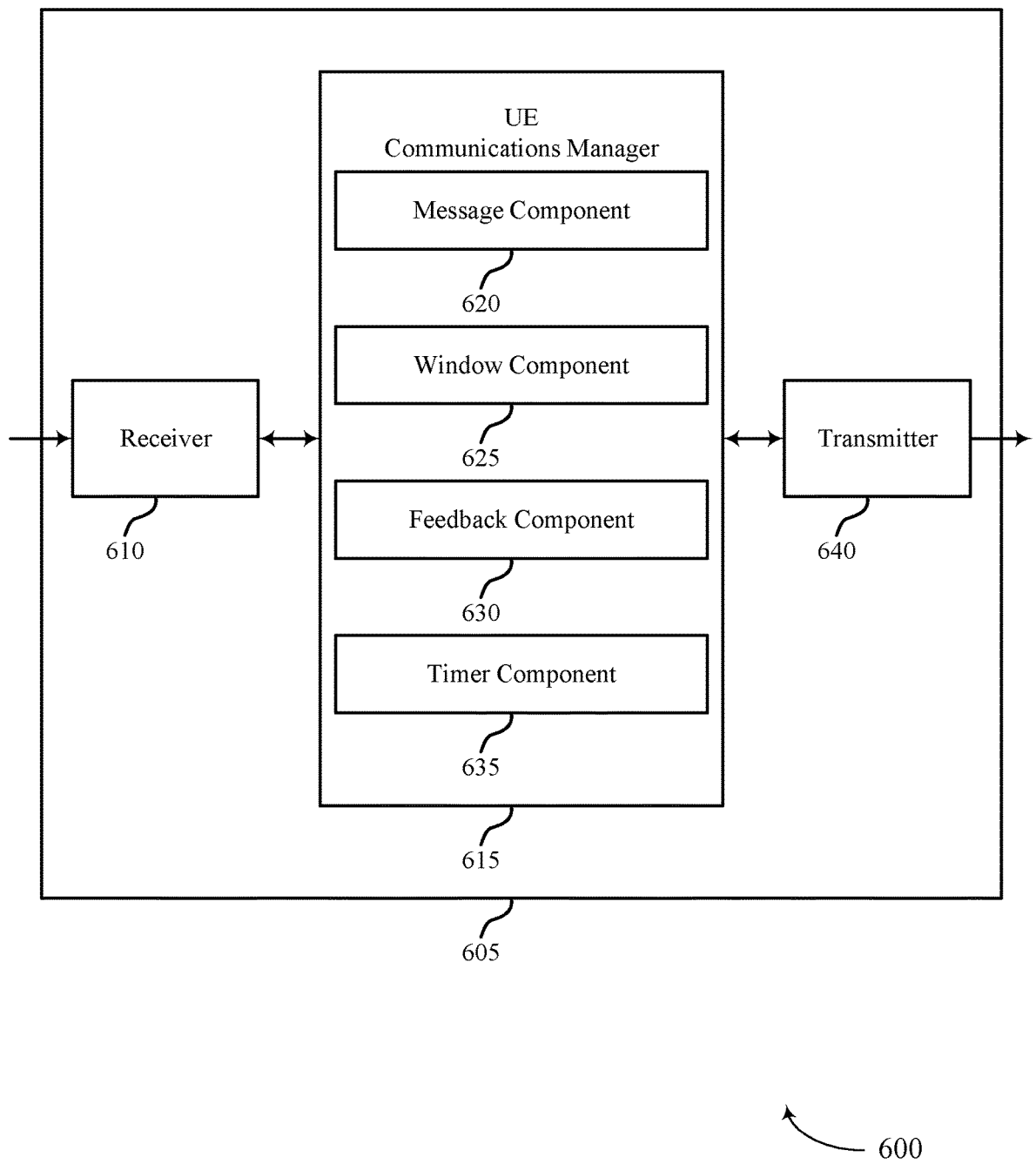

FIG. 6 shows a block diagram 600 of a device 605 in accordance with one or more aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to contention resolution in new radio non-terrestrial networks, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a message component 620, a window component 625, a feedback component 630, and a timer component 635. The UE communications manager 615 may be an example of aspects of the UE communications manager 810 described herein.

The message component 620 may determine that HARQ feedback is disabled and may transmit, to a base station, a random access message associated with a random access procedure based on determining that the HARQ feedback is disabled. The window component 625 may initiate a contention resolution window associated with the random access procedure for a downlink data channel transmission of a set of downlink data channel transmissions associated with the random access procedure, and may receive, during the contention resolution window, the downlink data channel transmission, the downlink data channel transmission carrying a contention resolution MAC-CE.

The message component 620 may determine that HARQ feedback is disabled for a random access procedure and may transmit, to a base station, a random access message associated with the random access procedure, based on determining that the HARQ feedback is disabled for the random access procedure. The feedback component 630 may refrain from transmitting, based on the disabled HARQ feedback, acknowledgment information for a downlink data channel transmission carrying a random access response message including a contention resolution MAC-CE.

The message component 620 may transmit, to a base station, a random access message associated with a random access procedure. The timer component 635 may receive a configuration for a contention resolution timer and may set, based on the configuration, a value for the contention resolution timer. The window component 625 may monitor a contention resolution window associated with the random access procedure for a first downlink data channel transmission of a set of downlink data channel transmissions associated with the random access procedure based on setting the value for the contention resolution timer, the first downlink data channel transmission carrying a contention resolution MAC-CE. The feedback component 630 may transmit acknowledgment information for the first downlink data channel transmission carrying the contention resolution MAC-CE.

The message component 620 may transmit, to a base station, a random access message associated with a random access procedure, where a HARQ feedback is disabled for the random access procedure. The window component 625 may monitor a contention resolution window associated with the random access procedure for a first downlink data channel transmission of a set of downlink data channel transmissions associated with the random access procedure, the first downlink data channel transmission carrying a contention resolution MAC-CE. The feedback component 630 may transmit acknowledgment information for the first downlink data channel transmission carrying the contention resolution MAC-CE based on an indication to enable the HARQ feedback.

The message component 620 may transmit, to a base station, a random access message associated with a random access procedure, where a HARQ feedback is disabled for the random access procedure. The window component 625 may monitor a contention resolution window associated with the random access procedure for a downlink data channel transmission carrying a contention resolution MAC-CE. The feedback component 630 may refrain from transmitting, based on the disabled HARQ feedback, acknowledgment information for the downlink data channel transmission carrying the random access response message including the contention resolution MAC-CE.

The message component 620 may transmit, to a base station, a random access message associated with a random access procedure. The window component 625 may determine that HARQ feedback is disabled for the random access procedure. The feedback component 630 may refrain from transmitting, based on the disabled HARQ feedback, acknowledgment information for a downlink data channel transmission carrying a random access response message including one or more of a contention resolution MAC-CE or an SDU associated with a downlink common control channel, or both.

The message component 620 may transmit, to a base station, a random access message associated with a random access procedure and receive a random access response message associated with the random access procedure, the random access response message including a timing advance. The feedback component 630 may determine that HARQ feedback is disabled for the random access procedure. The timer component 635 may control an uplink alignment timer based on the timing advance or the disabled HARQ feedback, or both.

The message component 620 may transmit, to a base station, a random access message associated with a random access procedure. The window component 625 may monitor a contention resolution window associated with the random access procedure for a first downlink data channel transmission of a set of downlink data channel transmissions associated with the random access procedure, the first downlink data channel transmission carrying a contention resolution MAC-CE. The feedback component 630 may transmit acknowledgment information exclusively (e.g., only) for the first downlink data channel transmission carrying the contention resolution MAC-CE.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
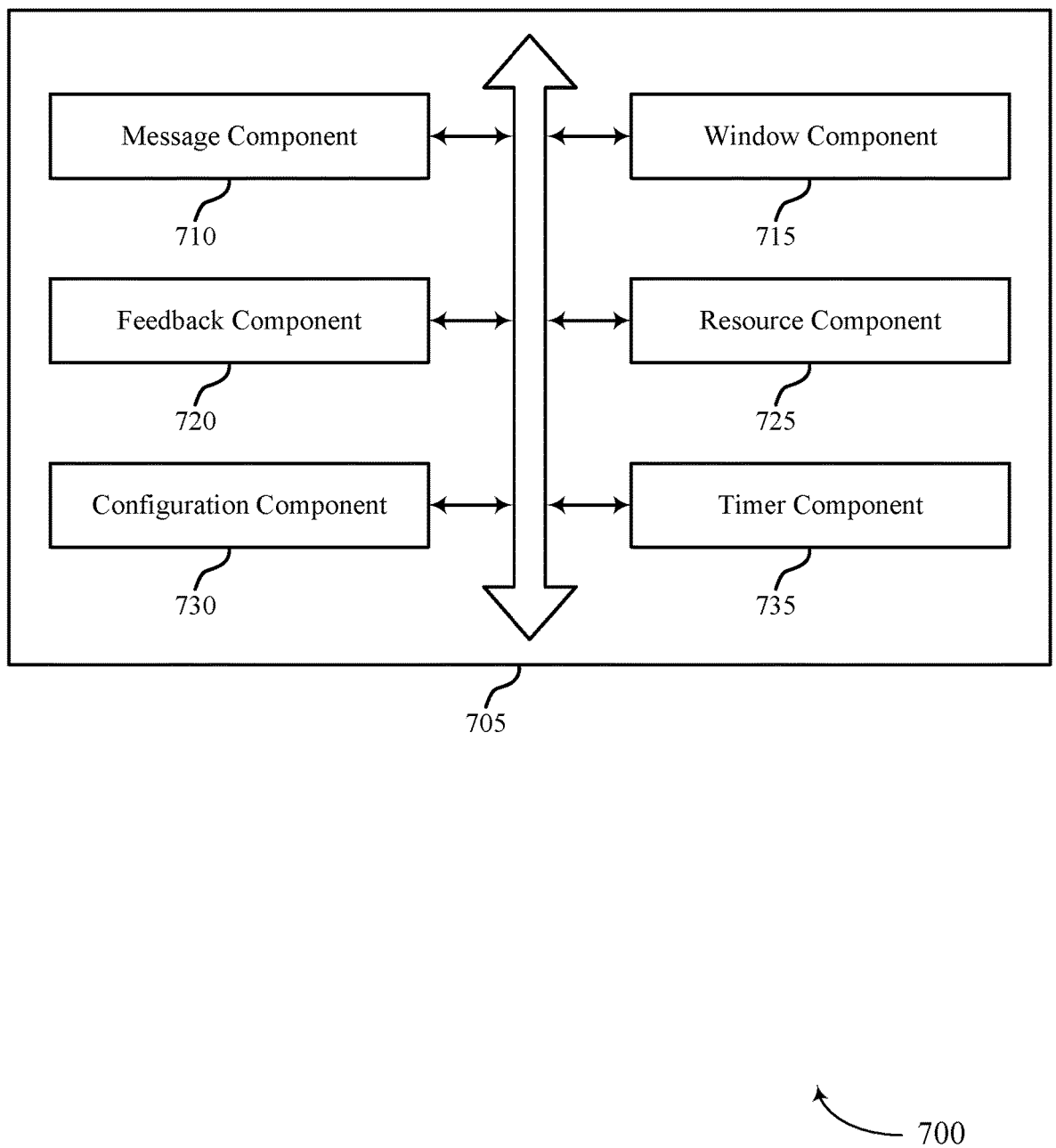
FIG. 7 shows a block diagram of a UE communications manager in accordance with one or more aspects of the present disclosure.

FIG. 7 shows a block diagram 700 of a UE communications manager 705 in accordance with one or more aspects of the present disclosure. The UE communications manager 705 may be an example of aspects of a UE communications manager 515, a UE communications manager 615, or a UE communications manager 810 described herein. The UE communications manager 705 may include a message component 710, a window component 715, a feedback component 720, a resource component 725, a configuration component 730, and a timer component 735. Each of these modules may communicate, directly or indirectly, with one another (e.g., via one or more buses).

The message component 710 may determine that HARQ feedback is disabled and may transmit, to a base station, a random access message associated with a random access procedure based on determining that the HARQ feedback is disabled. The window component 715 may initiate a contention resolution window associated with the random access procedure for a downlink data channel transmission of a set of downlink data channel transmissions associated with the random access procedure, and may receive, during the contention resolution window, the downlink data channel transmission, the downlink data channel transmission carrying a contention resolution MAC-CE.

The message component 710 may determine that HARQ feedback is disabled for a random access procedure and may transmit, to a base station, a random access message associated with the random access procedure based on determining that the HARQ feedback is disabled for the random access procedure. The feedback component 720 may refrain from transmitting, based on the disabled HARQ feedback, acknowledgment information for a downlink data channel transmission carrying a random access response message including a contention resolution MAC-CE.

The message component 710 may transmit, to a base station, a random access message associated with a random access procedure. The timer component 735 may receive a configuration for a contention resolution timer and may set, based on the configuration, a value for the contention resolution timer. The window component 715 may monitor a contention resolution window associated with the random access procedure for a first downlink data channel transmission of a set of downlink data channel transmissions associated with the random access procedure based on setting the value for the contention resolution timer, the first downlink data channel transmission carrying a contention resolution MAC-CE. The feedback component 720 may transmit acknowledgment information for the first downlink data channel transmission carrying the contention resolution MAC-CE.

The message component 710 may transmit, to a base station, a random access message associated with a random access procedure, where a HARQ feedback is disabled for the random access procedure. In some examples, the message component 710 may transmit, to a base station, a random access message associated with a random access procedure, where a HARQ feedback is disabled for the random access procedure. In some examples, the message component 710 may transmit, to a base station, a random access message associated with a random access procedure. In some examples, the message component 710 may transmit, to a base station, a random access message associated with a random access procedure.

In some examples, the message component 710 may receive a random access response message associated with the random access procedure, the random access response message including a timing advance. In some examples, the message component 710 may transmit, to a base station, a random access message associated with a random access procedure. In some examples, the message component 710 may transmit in the random access message a request to enable the HARQ feedback for the first downlink data channel transmission carrying the contention resolution MAC-CE.

In some examples, the message component 710 may receive a DCI message scheduling the first downlink data channel transmission carrying the contention resolution MAC-CE, where the DCI message includes the indication to enable the HARQ feedback. In some examples, the message component 710 may transmit an RRC message indicating a failure for a contention resolution associated with the random access procedure. In some examples, the message component 710 may receive a downlink control channel carrying a DCI message scheduling one or multiple transport blocks associated with the number of repetitions associated with the downlink data channel transmission carrying the contention resolution MAC-CE. In some cases, the random access message includes a msg3. In some cases, the base station is a non-terrestrial base station including a satellite or a high altitude platform station in a non-terrestrial network. In some cases, the contention resolution MAC-CE includes a contention resolution identifier. In some cases, a length of the contention resolution identifier in the contention resolution MAC-CE is lesser than or equal to a default length of a default contention resolution identifier.

The window component 715 may monitor a contention resolution window associated with the random access procedure for a first downlink data channel transmission of a set of downlink data channel transmissions associated with the random access procedure, the first downlink data channel transmission carrying a contention resolution MAC-CE. In some examples, the window component 715 may monitor a contention resolution window associated with the random access procedure for a downlink data channel transmission carrying a contention resolution MAC-CE. In some examples, the window component 715 may determine that HARQ feedback is disabled for the random access procedure.

In some examples, the window component 715 may monitor a contention resolution window associated with the random access procedure for a first downlink data channel transmission of a set of downlink data channel transmissions associated with the random access procedure, the first downlink data channel transmission carrying a contention resolution MAC-CE. In some examples, the window component 715 may monitor the contention resolution window during one or more active durations associated with the one or more DRX cycles. In some examples, the window component 715 may monitor the contention resolution window for a number of repetitions associated with the downlink data channel transmission carrying the contention resolution MAC-CE. In some examples, the window component 715 may monitor a contention resolution window associated with the random access procedure for the downlink data channel transmission carrying the random access response message including one or more of the contention resolution MAC-CE or the SDU associated with the downlink common control channel, or both.

In some examples, the window component 715 may monitor the contention resolution window during one or more active durations associated with the one or more DRX cycles. In some examples, the window component 715 may monitor the contention resolution window during one or more active durations associated with the one or more DRX cycles. In some cases, the contention resolution window includes one or more DRX cycles.

The feedback component 720 may transmit acknowledgment information exclusively (e.g., only) for the first downlink data channel transmission carrying the contention resolution MAC-CE based on an indication to enable the HARQ feedback. In some examples, the feedback component 720 may refrain from transmitting, based on the disabled HARQ feedback, acknowledgment information for the downlink data channel transmission carrying the random access response message including the contention resolution MAC-CE. In some examples, the feedback component 720 may refrain from transmitting, based on the disabled HARQ feedback, acknowledgment information for a downlink data channel transmission carrying a random access response message including one or more of a contention resolution MAC-CE or an SDU associated with a downlink common control channel, or both. In some examples, the feedback component 720 may determine that HARQ feedback is disabled for the random access procedure. In some examples, the feedback component 720 may transmit acknowledgment information for the first downlink data channel transmission carrying the contention resolution MAC-CE.

In some examples, the feedback component 720 may identify the indication to enable the HARQ feedback based on UE context information, a network configuration to enable the HARQ feedback, a default configuration to enable to HARQ feedback, or a combination thereof. In some examples, the feedback component 720 may enable the HARQ feedback based on the identifying. In some examples, the feedback component 720 may receive the indication in the contention resolution MAC-CE. In some examples, the feedback component 720 may enable the HARQ feedback based on the indication in the contention resolution MAC-CE.

In some examples, the feedback component 720 may determine a failure to receive the first downlink data channel transmission carrying the contention resolution MAC-CE, where the HARQ feedback is enabled for the random access procedure, and the acknowledgment information includes a negative acknowledgment. In some examples, the feedback component 720 may transmit the acknowledgment information based on the contention resolution window lapsing, where the HARQ feedback is enabled for the random access procedure, and the acknowledgment information including a negative acknowledgment. In some examples, the feedback component 720 may determine to transmit the acknowledgment information for the first downlink data channel transmission carrying the contention resolution MAC-CE, where transmitting the acknowledgment information for the first downlink data channel transmission carrying the contention resolution MAC-CE is based on the determining. In some examples, the feedback component 720 may transmit the acknowledgment information based on the contention resolution window lapsing, the acknowledgment information including a negative acknowledgment. In some cases, the indication includes a bit indication. In some cases, the bit indication includes a reserved bit in a MAC subheader of the contention resolution MAC-CE. In some cases, the acknowledgment information includes a positive acknowledgment or a negative acknowledgment.

The timer component 735 may control an uplink alignment timer based on the timing advance or the disabled HARQ feedback, or both. In some examples, the timer component 735 may set an uplink alignment timer based on a configuration. In some examples, the timer component 735 may activate the uplink alignment timer based on receiving the random access response message including the timing advance. In some examples, the timer component 735 may deactivate the uplink alignment timer based on receiving a contention resolution MAC-CE and before transmitting acknowledgment information for a downlink data channel transmission carrying the contention resolution MAC-CE, or both. In some cases, a value for the uplink alignment timer is based on one or more of a maximum propagation delay between the UE and the base station, a duration of a transmission time interval, or a gap between a downlink data channel reception and an uplink control channel transmission, or a combination thereof.

The resource component 725 may determine the scheduled resources based on one or more resource indices in the DCI message, the one or more resource indices corresponding to the scheduled resources. In some cases, the resource component 725 may determine resources associated with an uplink control channel based on a second indication in the contention resolution MAC-CE, where transmitting the acknowledgment information includes: transmitting the acknowledgment information on the uplink control channel using the determined resources. In some cases, the second indication includes a new the MAC-CE providing uplink control channel resource. In some cases, a logical channel identifier of the MAC-CE is same as or different from the contention resolution MAC-CE. In some cases, the resources are adjacent to an ending of the contention resolution window. In some cases, receiving a DCI message scheduling resources associated with an uplink control channel, where transmitting the acknowledgment information includes transmitting the acknowledgment information on the uplink control channel using the scheduled resources.

The configuration component 730 may receive a configuration for a contention resolution timer. In some examples, the configuration component 730 may set, based on the configuration, a value for the contention resolution timer. In some examples, the configuration component 730 may receive a configuration including an indication of the number of repetitions associated with the downlink data channel transmission carrying the contention resolution MAC-CE. In some examples, the configuration component 730 may receive a configuration for a contention resolution timer. In some examples, the configuration component 730 may set, based on the configuration, a value for the contention resolution timer. In some examples, the configuration component 730 may initiate a contention resolution timer associated with the contention resolution window, where monitoring the contention resolution window is based on the contention resolution timer. In some examples, the configuration component 730 may monitor the contention resolution window during one or more active durations associated with the one or more DRX cycles. In some examples, the configuration component 730 may receive a configuration for a contention resolution timer.

In some examples, the configuration component 730 may set, based on the configuration, a value for the contention resolution timer. In some examples, the configuration component 730 may initiate a contention resolution timer associated with a contention resolution window, where monitoring the contention resolution window is based on the contention resolution timer. In some examples, the configuration component 730 may receive a configuration for a contention resolution timer. In some examples, the configuration component 730 may set, based on the configuration, a value for the contention resolution timer.

In some cases, the value for the contention resolution timer is based on one or more of a maximum propagation delay between the UE and the base station, a duration of a transmission time interval associated with a transmission of a contention resolution identifier, or a gap between a downlink data channel reception and an uplink control channel transmission, or a combination thereof. In some cases, the value for the contention resolution timer is based on one or more of a maximum propagation delay between the UE and the base station, a duration of a transmission time interval associated with a transmission of a contention resolution identifier, or a gap between a downlink data channel reception and an uplink control channel transmission, or a combination thereof. In some cases, the contention resolution window includes one or more DRX cycles. In some cases, the value for the contention resolution timer is based on one or more of a maximum propagation delay between the UE and the base station, a duration of a transmission time interval associated with a transmission of a contention resolution identifier, or a gap between a downlink data channel reception and an uplink control channel transmission, or a combination thereof.

Figure 8:
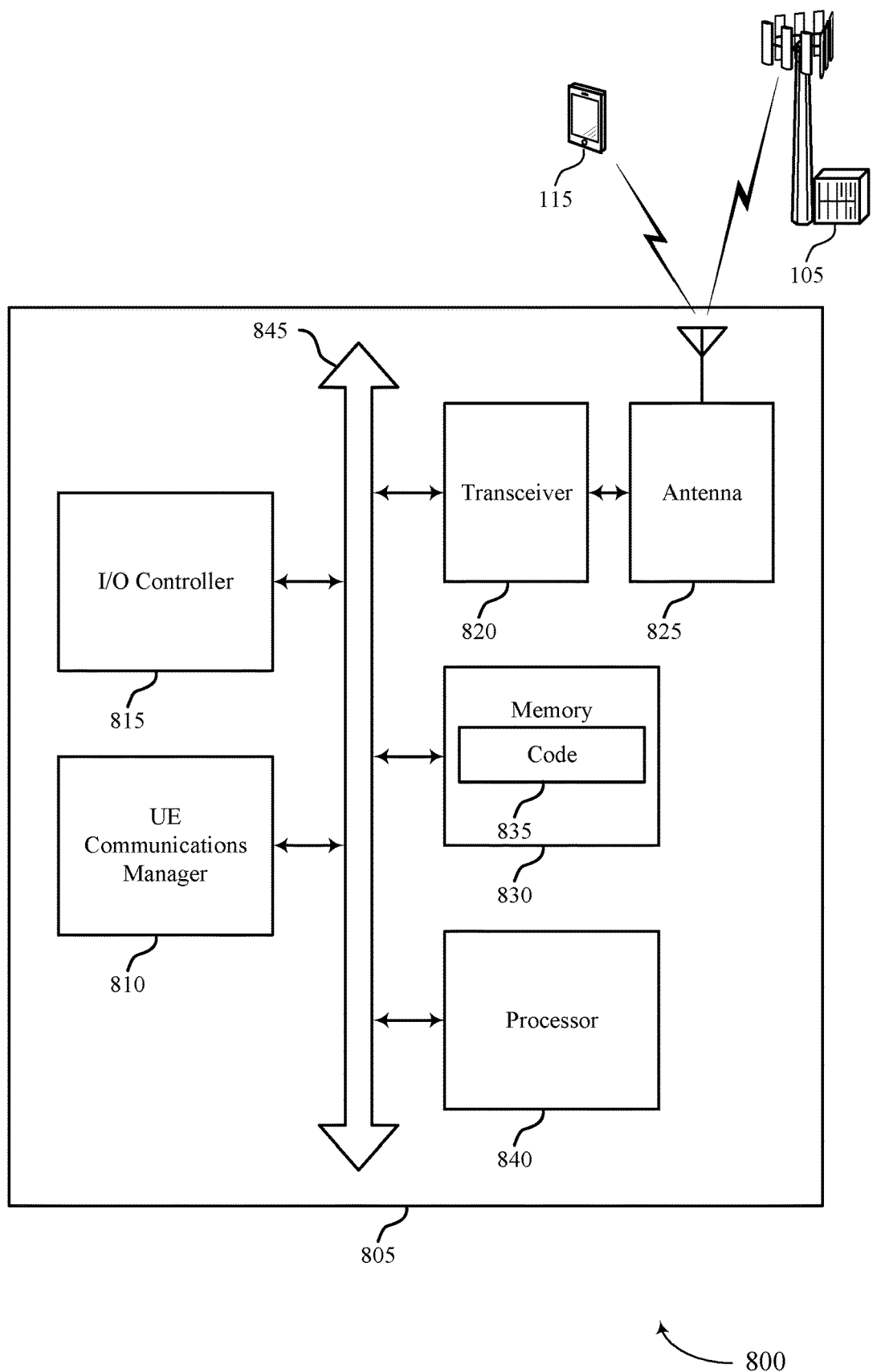
FIG. 8 shows a diagram of a system including a device in accordance with one or more aspects of the present disclosure.

FIG. 8 shows a diagram of a system 800 including a device 805 in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may determine that HARQ feedback is disabled, transmit, to a base station, a random access message associated with a random access procedure based on determining that the HARQ feedback is disabled, initiate a contention resolution window associated with the random access procedure for a downlink data channel transmission of a set of downlink data channel transmissions associated with the random access procedure, and receive, during the contention resolution window, the downlink data channel transmission, the downlink data channel transmission carrying a contention resolution MAC-CE.

The UE communications manager 810 may also determine that HARQ feedback is disabled for a random access procedure, transmit, to a base station, a random access message associated with the random access procedure, based on determining that the HARQ feedback is disabled for the random access procedure, and refrain from transmitting, based on the disabled HARQ feedback, acknowledgment information for a downlink data channel transmission carrying a random access response message including a contention resolution MAC-CE.

The UE communications manager 810 may also transmit, to a base station, a random access message associated with a random access procedure, receive a configuration for a contention resolution timer, set, based on the configuration, a value for the contention resolution timer, monitor a contention resolution window associated with the random access procedure for a first downlink data channel transmission of a set of downlink data channel transmissions associated with the random access procedure based on setting the value for the contention resolution timer, the first downlink data channel transmission carrying a contention resolution MAC-CE, and transmit acknowledgment information for the first downlink data channel transmission carrying the contention resolution MAC-CE.

The UE communications manager 810 may also transmit, to a base station, a random access message associated with a random access procedure, where a HARQ feedback is disabled for the random access procedure, monitor a contention resolution window associated with the random access procedure for a first downlink data channel transmission of a set of downlink data channel transmissions associated with the random access procedure, the first downlink data channel transmission carrying a contention resolution MAC-CE, and transmit acknowledgment information for the first downlink data channel transmission carrying the contention resolution MAC-CE based on an indication to enable the HARQ feedback.

The UE communications manager 810 may also transmit, to a base station, a random access message associated with a random access procedure, where a HARQ feedback is disabled for the random access procedure, monitor a contention resolution window associated with the random access procedure for a downlink data channel transmission carrying a contention resolution MAC-CE, and refrain from transmitting, based on the disabled HARQ feedback, acknowledgment information for the downlink data channel transmission carrying the random access response message including the contention resolution MAC-CE.

The UE communications manager 810 may also transmit, to a base station, a random access message associated with a random access procedure, determine that HARQ feedback is disabled for the random access procedure, and refrain from transmitting, based on the disabled HARQ feedback, acknowledgment information for a downlink data channel transmission carrying a random access response message including one or more of a contention resolution MAC-CE or an SDU associated with a downlink common control channel, or both.

The UE communications manager 810 may also transmit, to a base station, a random access message associated with a random access procedure, receive a random access response message associated with the random access procedure, the random access response message including a timing advance, determine that HARQ feedback is disabled for the random access procedure, and control an uplink alignment timer based on the timing advance or the disabled HARQ feedback, or both.

The UE communications manager 810 may also transmit, to a base station, a random access message associated with a random access procedure, monitor a contention resolution window associated with the random access procedure for a first downlink data channel transmission of a set of downlink data channel transmissions associated with the random access procedure, the first downlink data channel transmission carrying a contention resolution MAC-CE, and transmit acknowledgment information for the first downlink data channel transmission carrying the contention resolution MAC-CE.

By including or configuring the UE communications manager 810 in accordance with examples as described herein, the device 805 may provide improvements to random access procedures. For example, by supporting early contention resolution operations, the device 805 may promote improvements to efficiency and resource usage of random access procedures and, in some examples, may promote spectral efficiency, reduce latency, reduce power consumption, improve coordination between the UE and a core network, and increase battery life, among other benefits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting contention resolution in new radio non-terrestrial networks).

Figure 9:
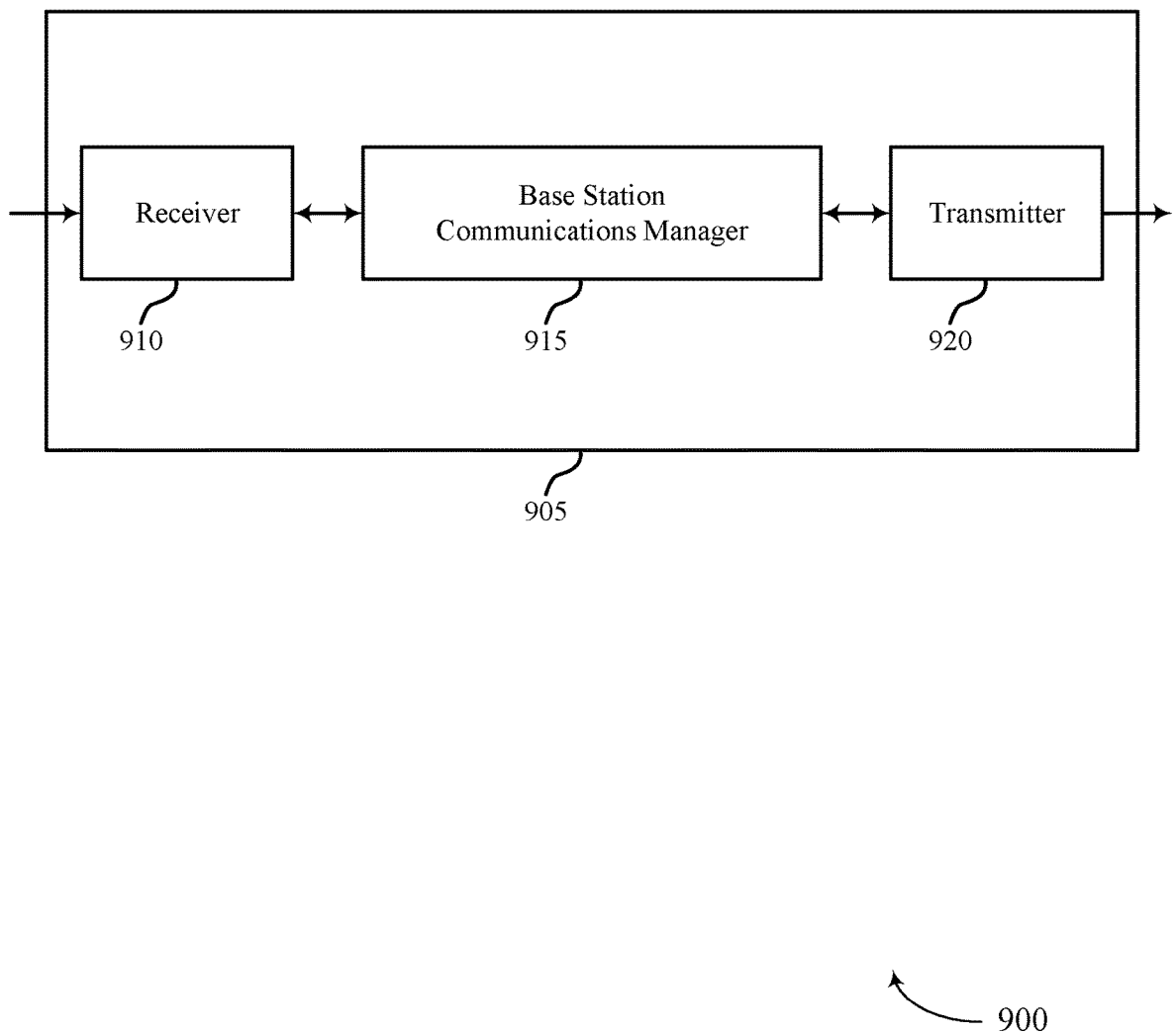
FIGS. 9 and 10 show block diagrams of devices in accordance with one or more aspects of the present disclosure.

FIG. 9 shows a block diagram 900 of a device 905 in accordance with one or more aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to contention resolution in new radio non-terrestrial networks, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may receive, from a UE, a random access message associated with a random access procedure, where a HARQ feedback is disabled for the random access procedure, and where a contention resolution window is associated with the random access procedure for a downlink data channel transmission of a set of downlink data channel transmissions associated with the random access procedure, and transmit, during the contention resolution window, the downlink data channel transmission, the downlink data channel transmission carrying a contention resolution MAC-CE.

The base station communications manager 915 may receive, from a UE, a random access message associated with a random access procedure, transmit a configuration for a contention resolution timer, transmit, during a contention resolution window associated with the random access procedure, a first downlink data channel transmission of a set of downlink data channel transmissions associated with the random access procedure based on transmitting the configuration for the contention resolution timer, the first downlink data channel transmission carrying a contention resolution MAC-CE, and receive acknowledgment information for the first downlink data channel transmission carrying the contention resolution MAC-CE.

The base station communications manager 915 may also receive, from a UE, a random access message associated with a random access procedure, where a HARQ feedback is disabled for the random access procedure, determine a contention resolution window associated with the random access procedure for a first downlink data channel transmission of a set of downlink data channel transmissions associated with the random access procedure, the first downlink data channel transmission carrying a contention resolution MAC-CE, and receive acknowledgment information for the first downlink data channel transmission carrying the contention resolution MAC-CE based on transmitting, to the UE, an indication to enable the HARQ feedback.

The base station communications manager 915 may also receive, from a UE, a random access message associated with a random access procedure, where a HARQ feedback is disabled for the random access procedure, determine a contention resolution window associated with the random access procedure for a downlink data channel transmission carrying a contention resolution MAC-CE, and refrain from receiving, based on the disabled HARQ feedback, acknowledgment information for the downlink data channel transmission carrying the random access response message including the contention resolution MAC-CE. The base station communications manager 915 may be an example of aspects of the base station communications manager 1210 described herein.

By including or configuring the base station communications manager 915 in accordance with examples as described herein, the device 905 (e.g., a processor controlling or otherwise coupled to the receiver 910, the base station communications manager 915, the transmitter 920, or a combination thereof) may reduce processing resources and power consumption associated with random access procedures. For example, by supporting early contention resolution operations, the device 905 may promote enhanced efficiency for high reliability and low latency random access operations, among other benefits.

The base station communications manager 915 may be an example of means for performing various aspects of managing contention resolution as described herein. The base station communications manager 915, or its sub-components, may be implemented in hardware (e.g., in base station communications management circuitry). The circuitry may comprise of a general-purpose processor, a DSP, an ASIC, an FPGA or other programmable logic device, discrete gate or transistor logic, discrete hardware components, or any combination thereof designed to perform the functions described in the present disclosure.

In another implementation, the base station communications manager 915, or its sub-components, may be implemented in code (e.g., as communications management software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device. In some examples, the base station communications manager 915 may be configured to perform various operations (e.g., receiving, determining, refraining, transmitting) using or otherwise in cooperation with the receiver 910, the transmitter 920, or both.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
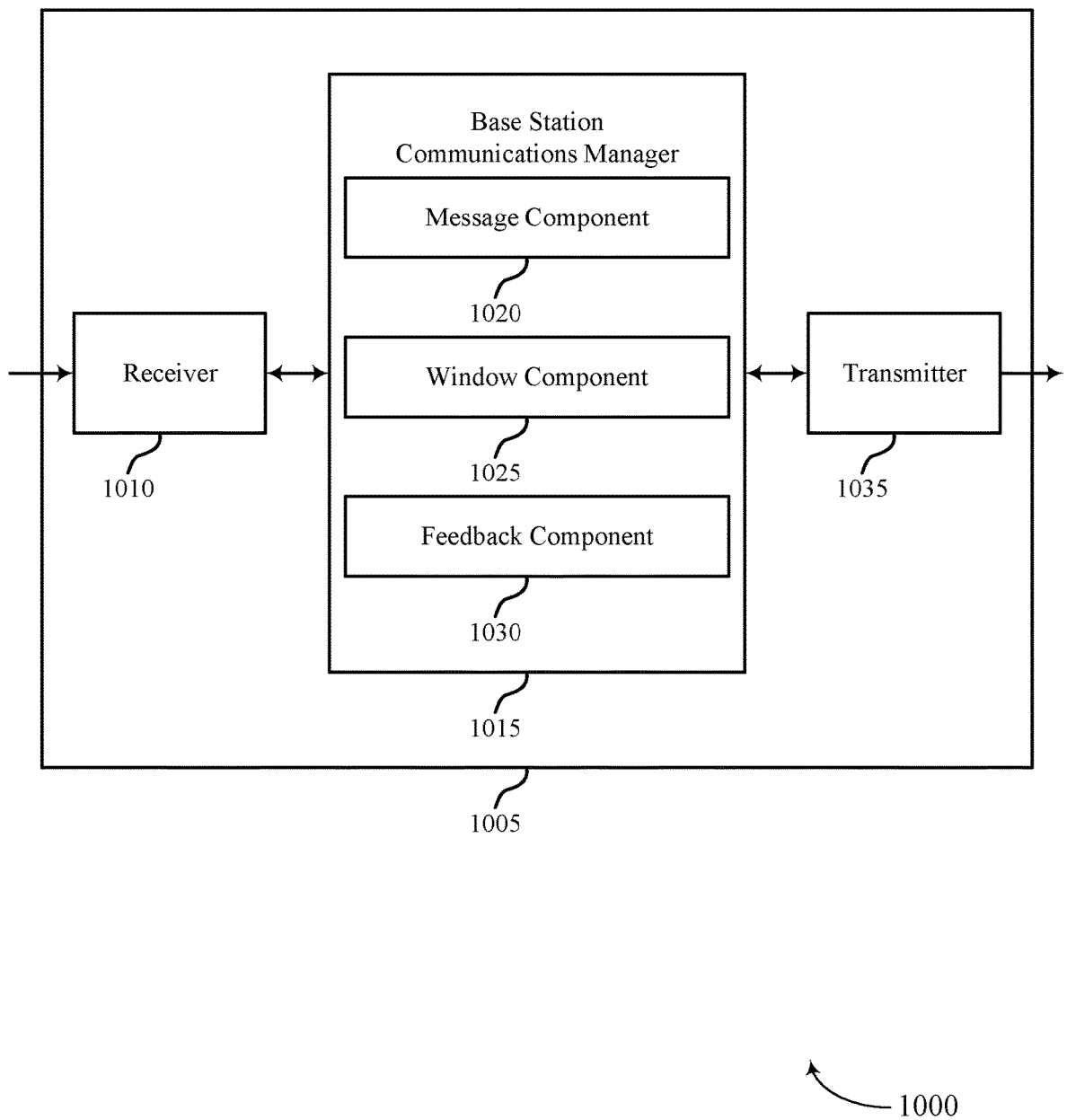

FIG. 10 shows a block diagram 1000 of a device 1005 in accordance with one or more aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to contention resolution in new radio non-terrestrial networks, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a message component 1020, a window component 1025, and a feedback component 1030. The base station communications manager 1015 may be an example of aspects of the base station communications manager 1210 described herein.

The message component 1020 may receive, from a UE, a random access message associated with a random access procedure, where a HARQ feedback is disabled for the random access procedure, and where a contention resolution window is associated with the random access procedure for a downlink data channel transmission of a set of downlink data channel transmissions associated with the random access procedure. The window component 1025 may transmit, during the contention resolution window, the downlink data channel transmission, the downlink data channel transmission carrying a contention resolution MAC-CE.

The message component 1020 may receive, from a UE, a random access message associated with a random access procedure and may transmit a configuration for a contention resolution timer. The window component 1025 may transmit, during a contention resolution window associated with the random access procedure, a first downlink data channel transmission of a set of downlink data channel transmissions associated with the random access procedure based on transmitting the configuration for the contention resolution timer, the first downlink data channel transmission carrying a contention resolution MAC-CE. The feedback component 1030 may receive acknowledgment information for the first downlink data channel transmission carrying the contention resolution MAC-CE.

The message component 1020 may receive, from a UE, a random access message associated with a random access procedure, where a HARQ feedback is disabled for the random access procedure. The window component 1025 may determine a contention resolution window associated with the random access procedure for a first downlink data channel transmission of a set of downlink data channel transmissions associated with the random access procedure, the first downlink data channel transmission carrying a contention resolution MAC-CE. The feedback component 1030 may receive acknowledgment information for the first downlink data channel transmission carrying the contention resolution MAC-CE based on transmitting, to the UE, an indication to enable the HARQ feedback.

The message component 1020 may receive, from a UE, a random access message associated with a random access procedure, where a HARQ feedback is disabled for the random access procedure. The window component 1025 may determine a contention resolution window associated with the random access procedure for a downlink data channel transmission carrying a contention resolution MAC-CE. The feedback component 1030 may refrain from receiving, based on the disabled HARQ feedback, acknowledgment information for the downlink data channel transmission carrying the random access response message including the contention resolution MAC-CE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
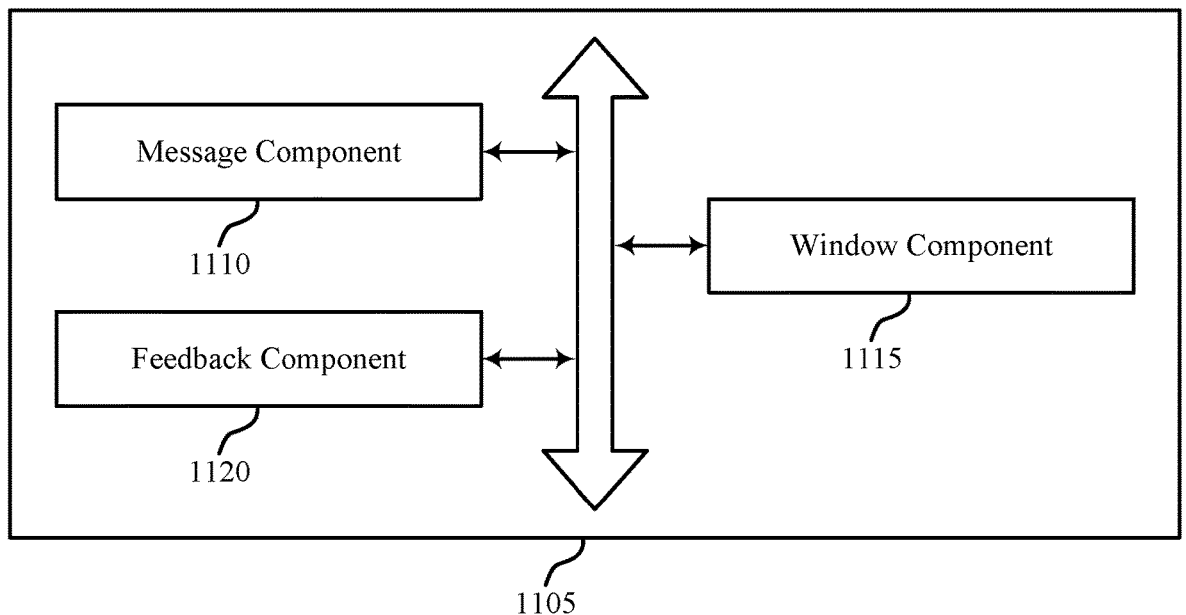
FIG. 11 shows a block diagram of a base station communications manager in accordance with one or more aspects of the present disclosure.

FIG. 11 shows a block diagram 1100 of a base station communications manager 1105 in accordance with one or more aspects of the present disclosure. The base station communications manager 1105 may be an example of aspects of a base station communications manager 915, a base station communications manager 1015, or a base station communications manager 1210 described herein. The base station communications manager 1105 may include a message component 1110, a window component 1115, and a feedback component 1120. Each of these modules may communicate, directly or indirectly, with one another (e.g., via one or more buses).

The message component 1110 may receive, from a UE, a random access message associated with a random access procedure, where a HARQ feedback is disabled for the random access procedure, and where a contention resolution window is associated with the random access procedure for a downlink data channel transmission of a set of downlink data channel transmissions associated with the random access procedure. The window component 1115 may transmit, during the contention resolution window, the downlink data channel transmission, the downlink data channel transmission carrying a contention resolution MAC-CE.

The message component 1110 may receive, from a UE, a random access message associated with a random access procedure and may transmit a configuration for a contention resolution timer. The window component 1115 may transmit, during a contention resolution window associated with the random access procedure, a first downlink data channel transmission of a set of downlink data channel transmissions associated with the random access procedure based on transmitting the configuration for the contention resolution timer, the first downlink data channel transmission carrying a contention resolution MAC-CE. The feedback component 1120 may receive acknowledgment information for the first downlink data channel transmission carrying the contention resolution MAC-CE.

The message component 1110 may receive, from a UE, a random access message associated with a random access procedure, where a HARQ feedback is disabled for the random access procedure. In some examples, the message component 1110 may receive, from a UE, a random access message associated with a random access procedure, where a HARQ feedback is disabled for the random access procedure. In some examples, the message component 1110 may include the indication in UE context information. In some examples, the message component 1110 may receive in the random access message a request to enable the HARQ feedback for the first downlink data channel transmission carrying the contention resolution MAC-CE.

In some examples, the message component 1110 may transmit the indication in the contention resolution MAC-CE. In some examples, the message component 1110 may transmit DCI message scheduling the first downlink data channel transmission carrying the contention resolution MAC-CE, where the DCI message includes the indication to enable the HARQ feedback. In some examples, the message component 1110 may receive an RRC message indicating a failure for a contention resolution associated with the random access procedure. In some examples, the message component 1110 may transmit a configuration including an indication of a number of repetitions associated with the downlink data channel transmission carrying the contention resolution MAC-CE. In some examples, the message component 1110 may transmit a downlink control channel carrying a DCI message scheduling one or multiple transport blocks associated with the number of repetitions associated with the downlink data channel transmission carrying the contention resolution MAC-CE.

In some cases, the indication includes a bit indication. In some cases, the bit indication includes a reserved bit in a MAC-CE of the contention resolution MAC-CE. In some cases, the base station is a non-terrestrial base station including a satellite or a high altitude platform station in a non-terrestrial network. In some cases, the contention resolution MAC-CE includes a contention resolution identifier. In some cases, the random access message includes a msg3.

The window component 1115 may determine a contention resolution window associated with the random access procedure for a first downlink data channel transmission of a set of downlink data channel transmissions associated with the random access procedure, the first downlink data channel transmission carrying a contention resolution MAC-CE. In some examples, the window component 1115 may determine a contention resolution window associated with the random access procedure for a downlink data channel transmission carrying a contention resolution MAC-CE. In some cases, the contention resolution window includes one or more DRX cycles. In some cases, the contention resolution window includes one or more DRX cycles.

The feedback component 1120 may receive acknowledgment information for the first downlink data channel transmission carrying the contention resolution MAC-CE based on transmitting, to the UE, an indication to enable the HARQ feedback. In some examples, the feedback component 1120 may refrain from receiving, based on the disabled HARQ feedback, acknowledgment information for the downlink data channel transmission carrying the random access response message including the contention resolution MAC-CE. In some examples, the feedback component 1120 may receive the acknowledgment information based on the contention resolution window lapsing, the acknowledgment information including a negative acknowledgment. In some cases, the random access message includes a msg3. In some cases, the feedback component 1120 may transmit a DCI message scheduling resources associated with an uplink control channel, where receiving the acknowledgment information includes receiving the acknowledgment information on the uplink control channel using the scheduled resources. In some cases, the acknowledgment information includes a positive acknowledgment or a negative acknowledgment.

Figure 12:
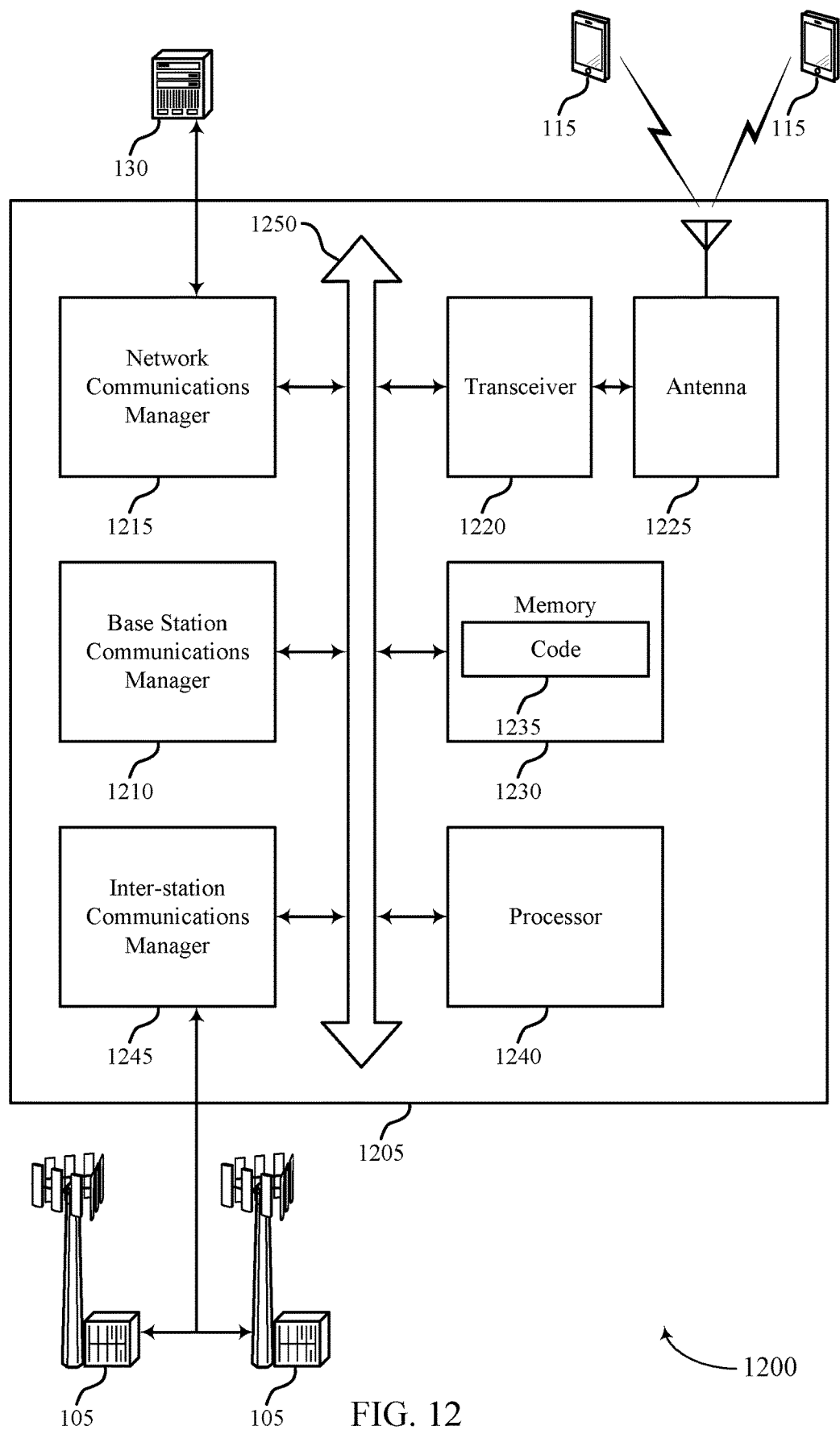
FIG. 12 shows a diagram of a system including a device in accordance with one or more aspects of the present disclosure.

FIG. 12 shows a diagram of a system 1200 including a device 1205 in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may receive, from a UE, a random access message associated with a random access procedure, where a HARQ feedback is disabled for the random access procedure, and where a contention resolution window is associated with the random access procedure for a downlink data channel transmission of a set of downlink data channel transmissions associated with the random access procedure, and transmit, during the contention resolution window, the downlink data channel transmission, the downlink data channel transmission carrying a contention resolution MAC-CE.

The base station communications manager 1210 may receive, from a UE, a random access message associated with a random access procedure, transmit a configuration for a contention resolution timer, transmit, during a contention resolution window associated with the random access procedure, a first downlink data channel transmission of a set of downlink data channel transmissions associated with the random access procedure based on transmitting the configuration for the contention resolution timer, the first downlink data channel transmission carrying a contention resolution MAC-CE, and receive acknowledgment information for the first downlink data channel transmission carrying the contention resolution MAC-CE.

The base station communications manager 1210 may also receive, from a UE, a random access message associated with a random access procedure, where a HARQ feedback is disabled for the random access procedure, determine a contention resolution window associated with the random access procedure for a first downlink data channel transmission of a set of downlink data channel transmissions associated with the random access procedure, the first downlink data channel transmission carrying a contention resolution MAC-CE, and receive acknowledgment information for the first downlink data channel transmission carrying the contention resolution MAC-CE based on transmitting, to the UE, an indication to enable the HARQ feedback.

The base station communications manager 1210 may also receive, from a UE, a random access message associated with a random access procedure, where a HARQ feedback is disabled for the random access procedure, determine a contention resolution window associated with the random access procedure for a downlink data channel transmission carrying a contention resolution MAC-CE, and refrain from receiving, based on the disabled HARQ feedback, acknowledgment information for the downlink data channel transmission carrying the random access response message including the contention resolution MAC-CE.

By including or configuring the base station communications manager 1210 in accordance with examples as described herein, the device 1205 may provide improvements to random access procedures. For example, by supporting early contention resolution operations, the device 1205 may promote improvements to efficiency and resource usage of random access operations and, in some examples, may promote spectral efficiency, reduce latency, reduce power consumption, and improve coordination between the UE and the device 1205, among other benefits.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases, the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a basic I/O system (BIOS) which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting contention resolution in new radio non-terrestrial networks).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
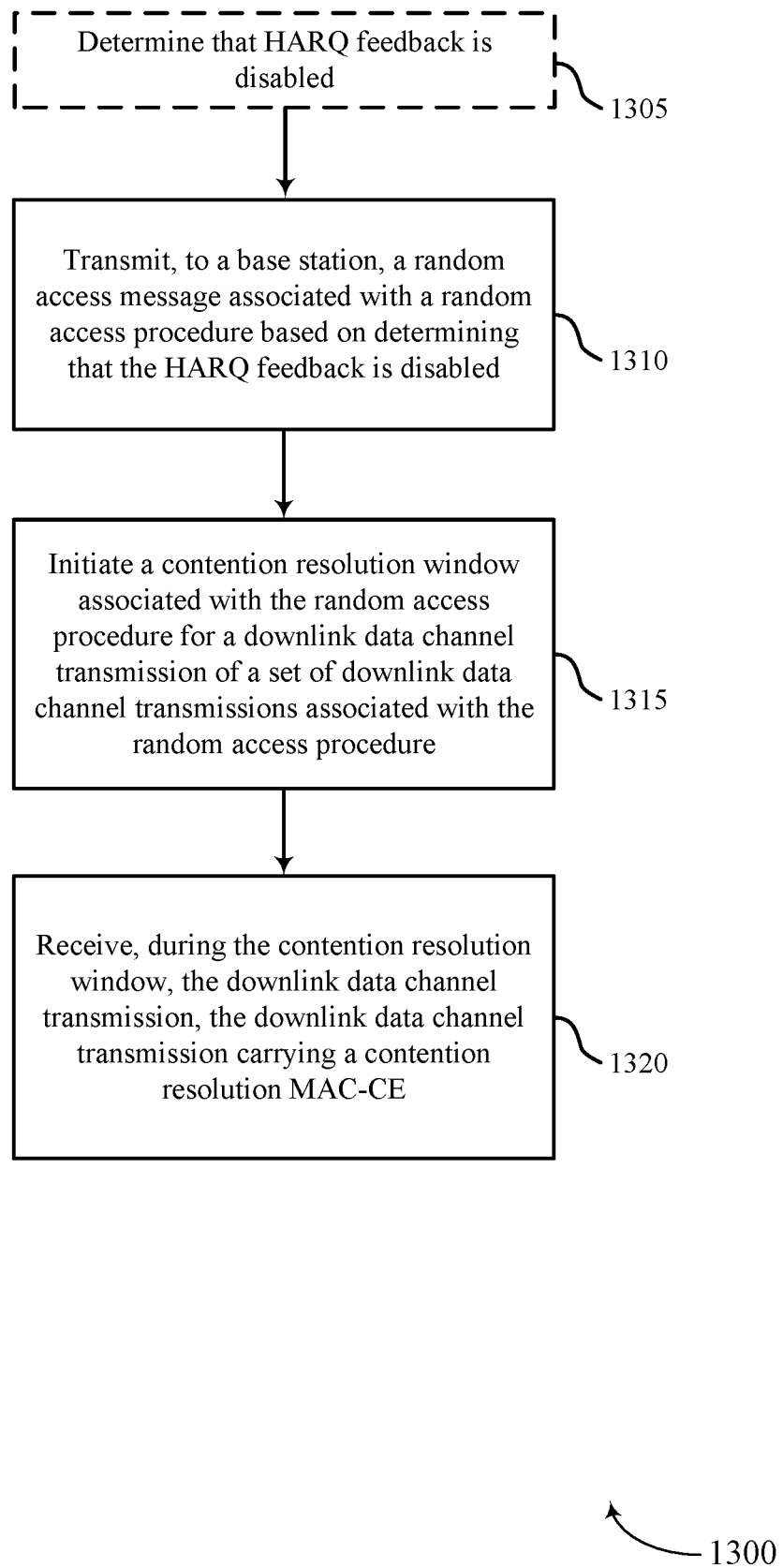
FIGS. 13 through 24 show flowcharts illustrating methods in accordance with one or more aspects of the present disclosure.

FIG. 13 shows a flowchart illustrating a method 1300 in accordance with one or more aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may optionally determine that HARQ feedback is disabled. The operations of 1305 may be performed according to the methods described herein. In some examples, aspects of the operations of 1305 may be performed by a message component as described with reference to FIGS. 5 through 8.

At 1310, the UE may transmit, to a base station, a random access message associated with a random access procedure based on determining that the HARQ feedback is disabled. The operations of 1310 may be performed according to the methods described herein. In some examples, aspects of the operations of 1310 may be performed by a message component as described with reference to FIGS. 5 through 8.

At 1315, the UE may initiate a contention resolution window associated with the random access procedure for a downlink data channel transmission of a set of downlink data channel transmissions associated with the random access procedure. The operations of 1315 may be performed according to the methods described herein. In some examples, aspects of the operations of 1315 may be performed by a window component as described with reference to FIGS. 5 through 8.

At 1320, the UE may receive, during the contention resolution window, the downlink data channel transmission, the downlink data channel transmission carrying a contention resolution MAC-CE. The operations of 1320 may be performed according to the methods described herein. In some examples, aspects of the operations of 1320 may be performed by a window component as described with reference to FIGS. 5 through 8.

Figure 14:
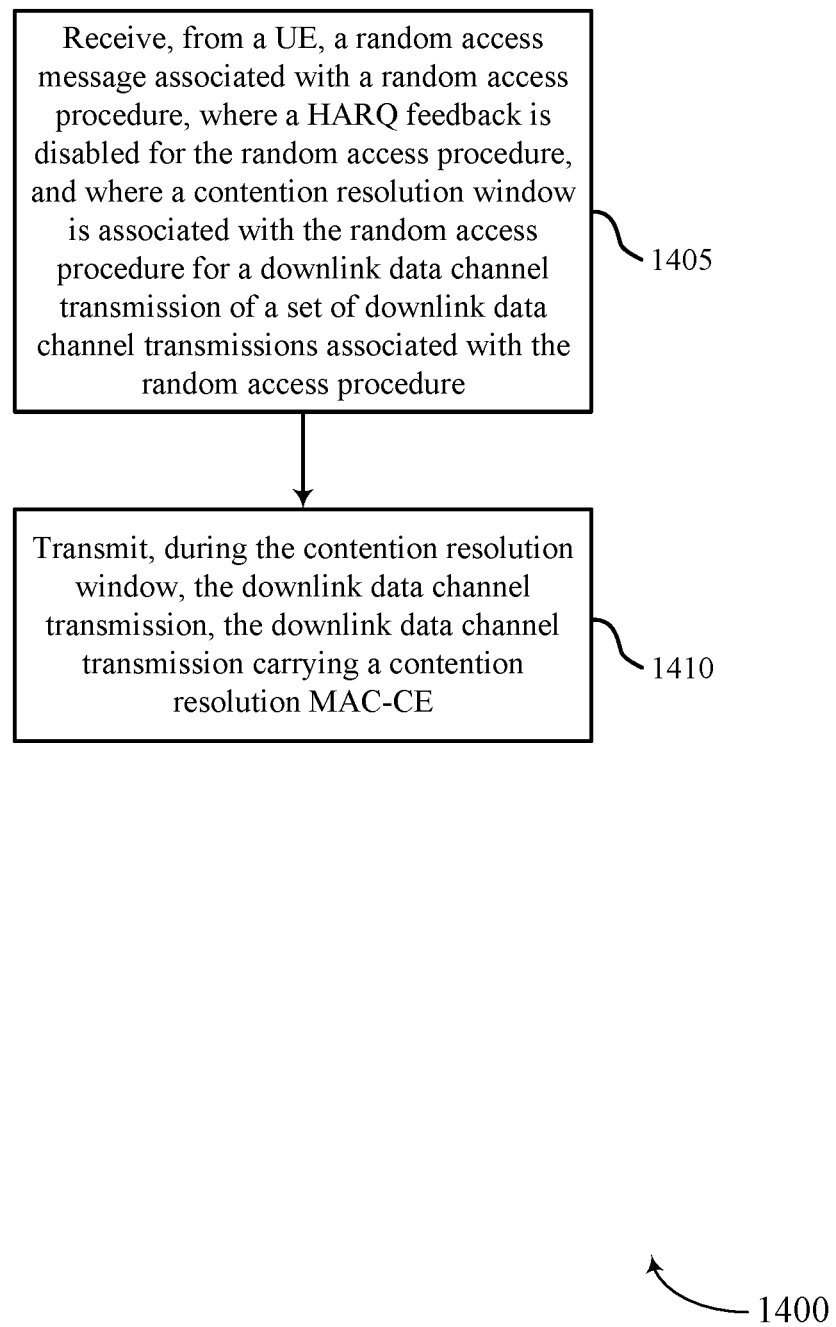

FIG. 14 shows a flowchart illustrating a method 1400 in accordance with one or more aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may receive, from a UE, a random access message associated with a random access procedure, where a HARQ feedback is disabled for the random access procedure, and where a contention resolution window is associated with the random access procedure for a downlink data channel transmission of a set of downlink data channel transmissions associated with the random access procedure. The operations of 1405 may be performed according to the methods described herein. In some examples, aspects of the operations of 1405 may be performed by a message component as described with reference to FIGS. 9 through 12.

At 1410, the base station may transmit, during the contention resolution window, the downlink data channel transmission, the downlink data channel transmission carrying a contention resolution MAC-CE. The operations of 1410 may be performed according to the methods described herein. In some examples, aspects of the operations of 1410 may be performed by a window component as described with reference to FIGS. 9 through 12.

Figure 15:
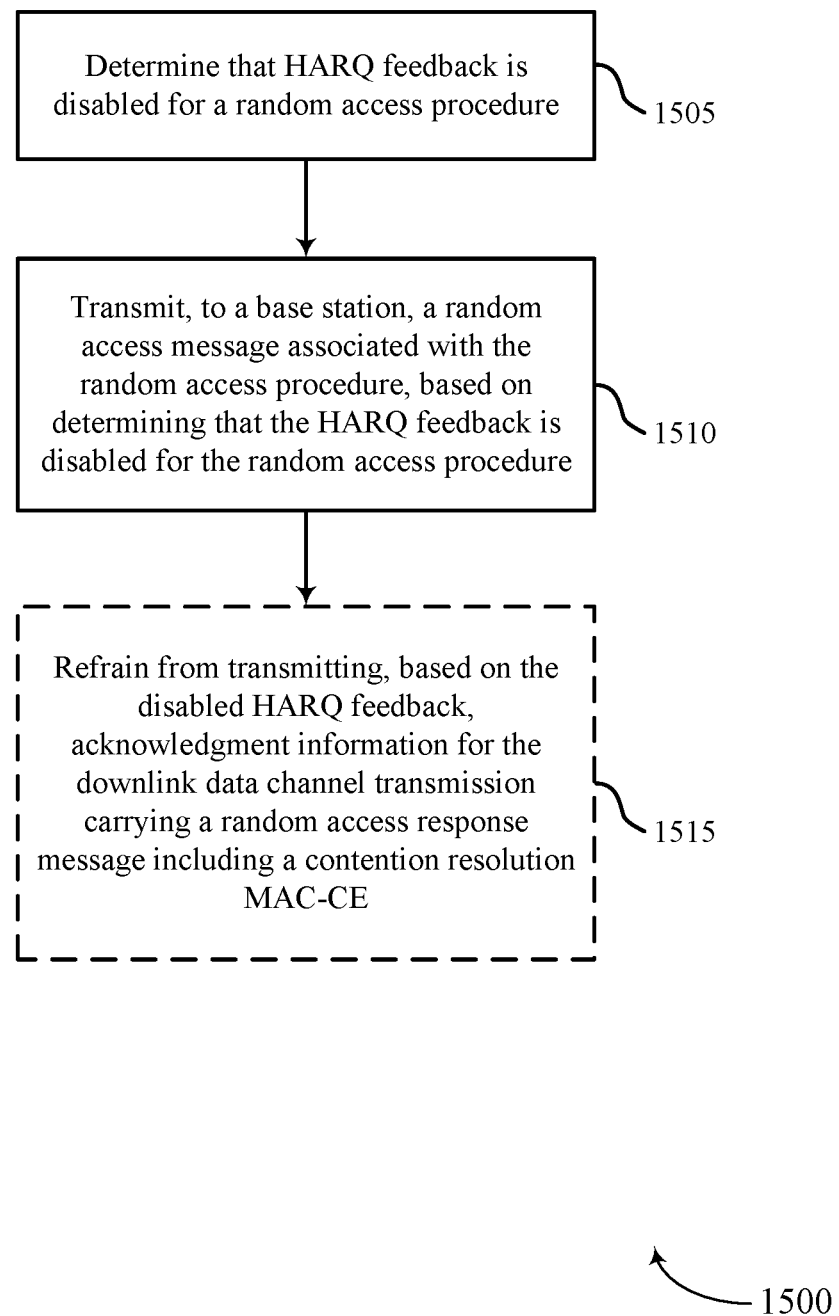

FIG. 15 shows a flowchart illustrating a method 1500 in accordance with one or more aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may determine that HARQ feedback is disabled for a random access procedure. The operations of 1505 may be performed according to the methods described herein. In some examples, aspects of the operations of 1505 may be performed by a message component as described with reference to FIGS. 5 through 8.

At 1510, the UE may transmit, to a base station, a random access message associated with the random access procedure, based on determining that the HARQ feedback is disabled for the random access procedure. The operations of 1510 may be performed according to the methods described herein. In some examples, aspects of the operations of 1510 may be performed by a message component as described with reference to FIGS. 5 through 8.

At 1515, the UE may refrain from transmitting, based on the disabled HARQ feedback, acknowledgment information for the downlink data channel transmission carrying a random access response message including a contention resolution MAC-CE. The operations of 1515 may be performed according to the methods described herein. In some examples, aspects of the operations of 1515 may be performed by a feedback component as described with reference to FIGS. 5 through 8.

Figure 16:
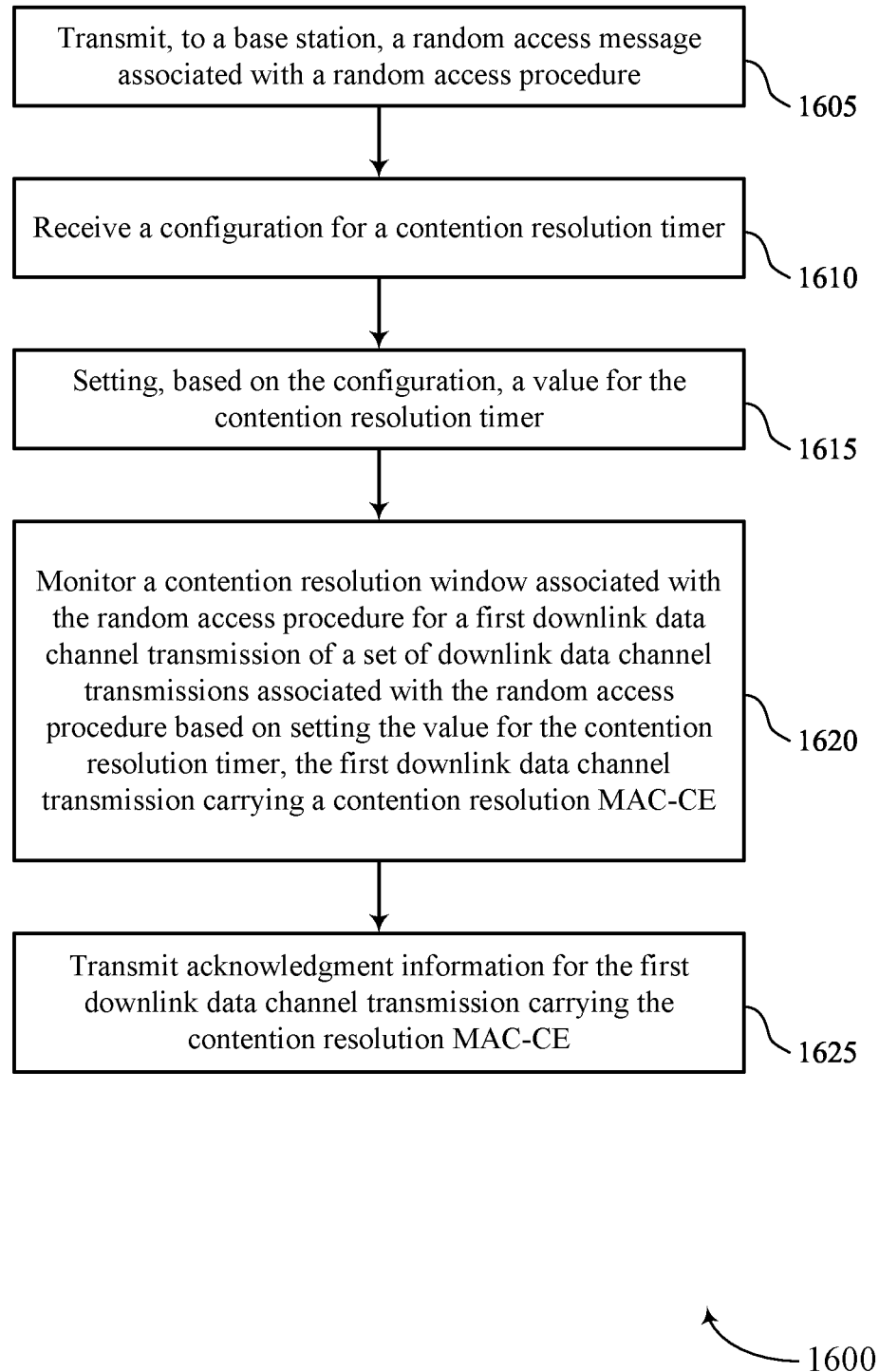

FIG. 16 shows a flowchart illustrating a method 1600 in accordance with one or more aspects of the present disclosure. The operations of the method 1600 may be implemented by a UE or its components as described herein. For example, the operations of the method 1600 may be performed by a UE communications manager as described with reference to FIGS. 5 through 8. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a random access message associated with a random access procedure. The operations of 1605 may be performed in accordance with examples as disclosed herein. In some examples, aspects of the operations of 1605 may be performed by a message component as described with reference to FIGS. 5 through 8.

At 1610, the method may include receiving a configuration for a contention resolution timer. The operations of 1610 may be performed in accordance with examples as disclosed herein. In some examples, aspects of the operations of 1610 may be performed by a timer component as described with reference to FIGS. 5 through 8.

At 1615, the method may include setting, based on the configuration, a value for the contention resolution timer. The operations of 1615 may be performed in accordance with examples as disclosed herein. In some examples, aspects of the operations of 1615 may be performed by a timer component as described with reference to FIGS. 5 through 8.

At 1620, the method may include monitoring a contention resolution window associated with the random access procedure for a first downlink data channel transmission of a set of multiple downlink data channel transmissions associated with the random access procedure based on setting the value for the contention resolution timer, the first downlink data channel transmission carrying a contention resolution MAC-CE. The operations of 1620 may be performed in accordance with examples as disclosed herein. In some examples, aspects of the operations of 1620 may be performed by a window component as described with reference to FIGS. 5 through 8.

At 1625, the method may include transmitting acknowledgment information for the first downlink data channel transmission carrying the contention resolution MAC-CE. The operations of 1625 may be performed in accordance with examples as disclosed herein. In some examples, aspects of the operations of 1625 may be performed by a feedback component as described with reference to FIGS. 5 through 8.

Figure 17:
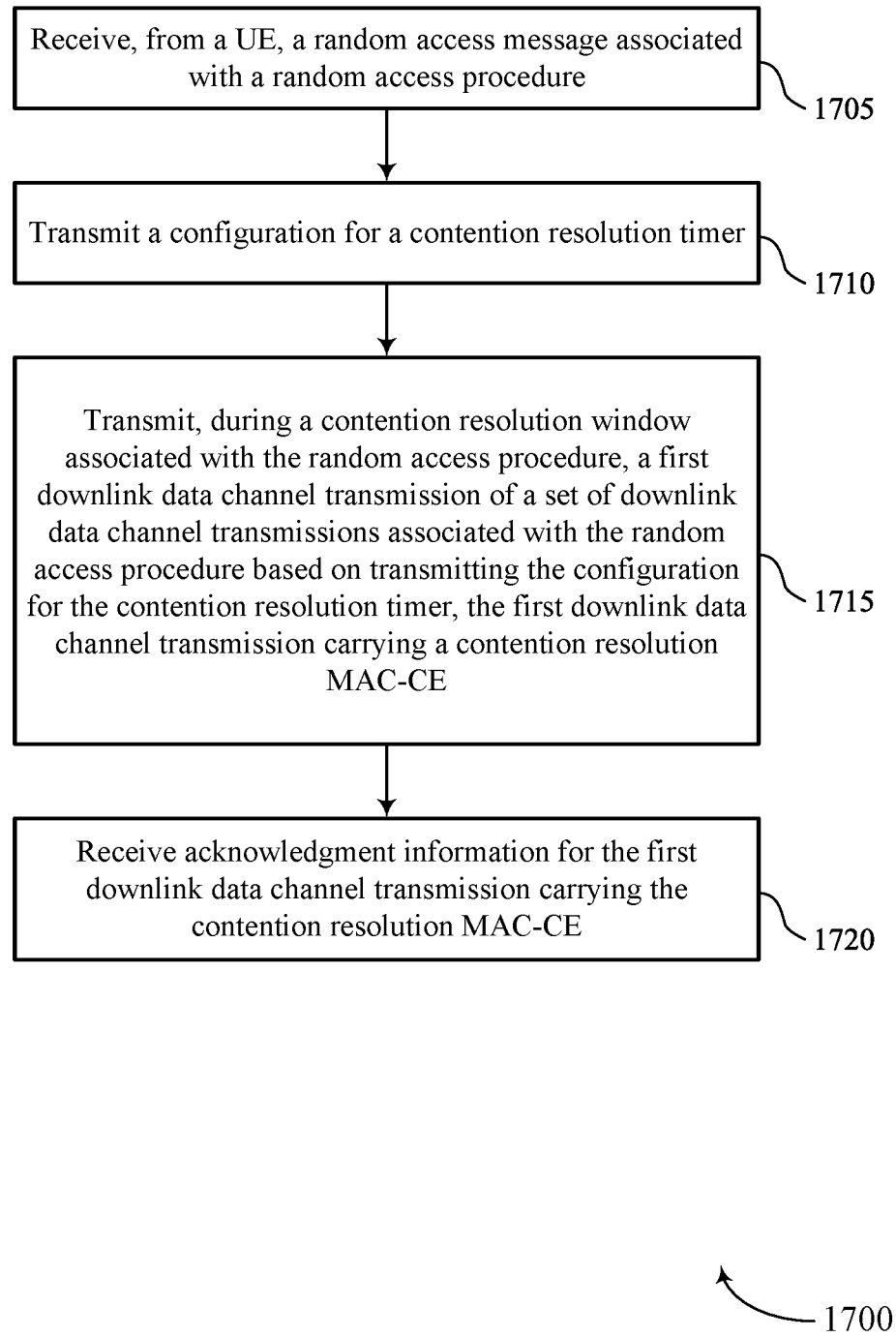

FIG. 17 shows a flowchart illustrating a method 1700 in accordance with one or more aspects of the present disclosure. The operations of the method 1700 may be implemented by a base station 105 or its components as described herein. For example, the operations of the method 1700 may be performed by a base station communications manager as described with reference to FIGS. 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a random access message associated with a random access procedure. The operations of 1705 may be performed in accordance with examples as disclosed herein. In some examples, aspects of the operations of 1705 may be performed by a message component as described with reference to FIGS. 9 through 12.

At 1710, the method may include transmitting a configuration for a contention resolution timer. The operations of 1710 may be performed in accordance with examples as disclosed herein. In some examples, aspects of the operations of 1710 may be performed by a message component as described with reference to FIGS. 9 through 12.

At 1715, the method may include transmitting, during a contention resolution window associated with the random access procedure, a first downlink data channel transmission of a set of multiple downlink data channel transmissions associated with the random access procedure based on transmitting the configuration for the contention resolution timer, the first downlink data channel transmission carrying a contention resolution MAC-CE. The operations of 1715 may be performed in accordance with examples as disclosed herein. In some examples, aspects of the operations of 1715 may be performed by a window component as described with reference to FIGS. 9 through 12.

At 1720, the method may include receiving acknowledgment information for the first downlink data channel transmission carrying the contention resolution MAC-CE. The operations of 1720 may be performed in accordance with examples as disclosed herein. In some examples, aspects of the operations of 1720 may be performed by a feedback component as described with reference to FIGS. 9 through 12.

Figure 18:
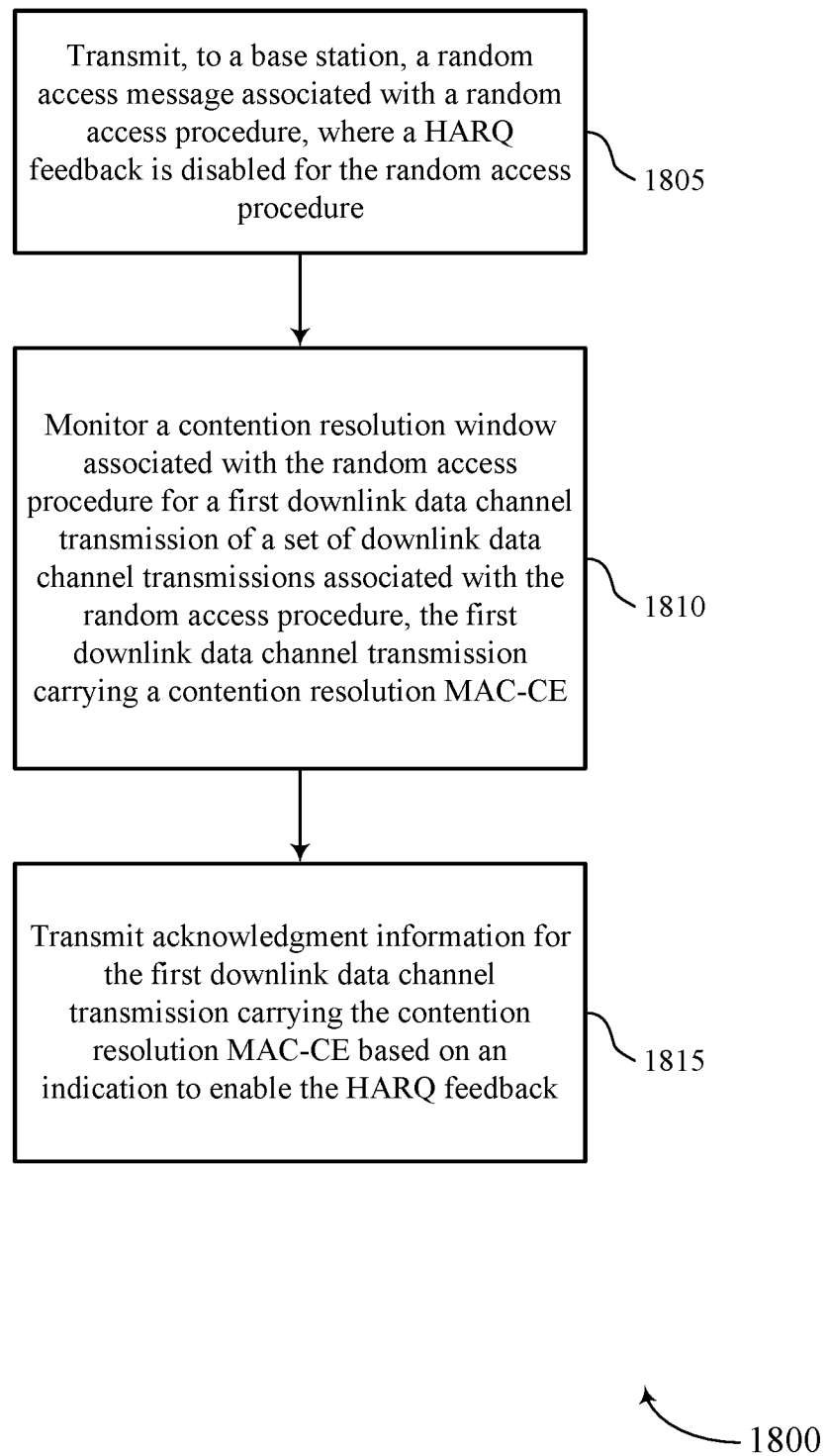

FIG. 18 shows a flowchart illustrating a method 1800 in accordance with one or more aspects of the present disclosure. The operations of method 1800 may be implemented by a UE 115 or its components as described herein. For example, the operations of method 1800 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may transmit, to a base station, a random access message associated with a random access procedure, where a HARQ feedback is disabled for the random access procedure. The operations of 1805 may be performed according to the methods described herein. In some examples, aspects of the operations of 1805 may be performed by a message component as described with reference to FIGS. 5 through 8.

At 1810, the UE may monitor a contention resolution window associated with the random access procedure for a first downlink data channel transmission of a set of downlink data channel transmissions associated with the random access procedure, the first downlink data channel transmission carrying a contention resolution MAC-CE. The operations of 1810 may be performed according to the methods described herein. In some examples, aspects of the operations of 1810 may be performed by a window component as described with reference to FIGS. 5 through 8.

At 1815, the UE may transmit acknowledgment information for the first downlink data channel transmission carrying the contention resolution MAC-CE based on an indication to enable the HARQ feedback. The operations of 1815 may be performed according to the methods described herein. In some examples, aspects of the operations of 1815 may be performed by a feedback component as described with reference to FIGS. 5 through 8.

Figure 19:
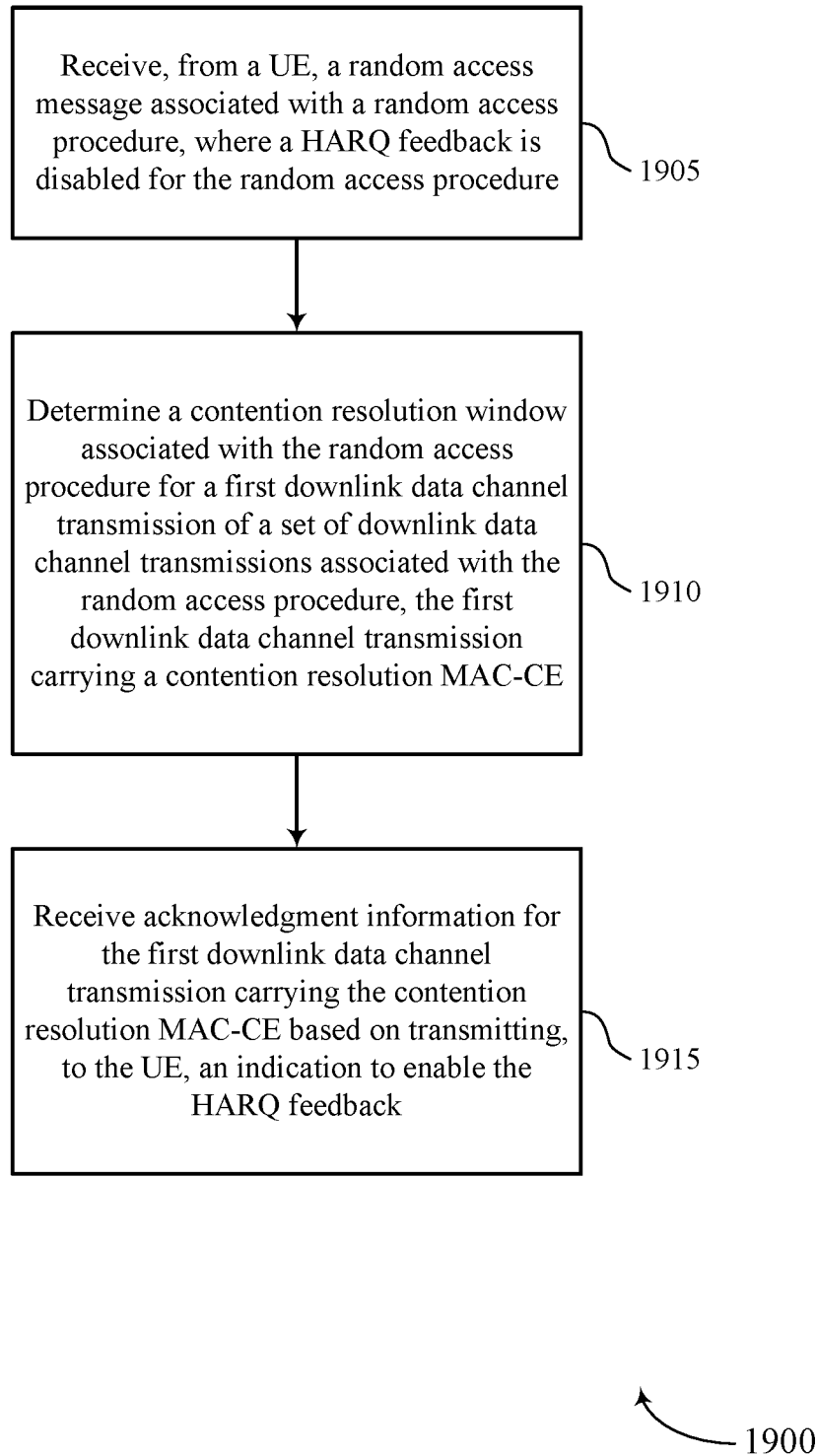

FIG. 19 shows a flowchart illustrating a method 1900 in accordance with one or more aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE, a random access message associated with a random access procedure, where a HARQ feedback is disabled for the random access procedure. The operations of 1905 may be performed according to the methods described herein. In some examples, aspects of the operations of 1905 may be performed by a message component as described with reference to FIGS. 9 through 12.

At 1910, the base station may determine a contention resolution window associated with the random access procedure for a first downlink data channel transmission of a set of downlink data channel transmissions associated with the random access procedure, the first downlink data channel transmission carrying a contention resolution MAC-CE. The operations of 1910 may be performed according to the methods described herein. In some examples, aspects of the operations of 1910 may be performed by a window component as described with reference to FIGS. 9 through 12.

At 1915, the base station may receive acknowledgment information for the first downlink data channel transmission carrying the contention resolution MAC-CE based on transmitting, to the UE, an indication to enable the HARQ feedback. The operations of 1915 may be performed according to the methods described herein. In some examples, aspects of the operations of 1915 may be performed by a feedback component as described with reference to FIGS. 9 through 12.

Figure 20:
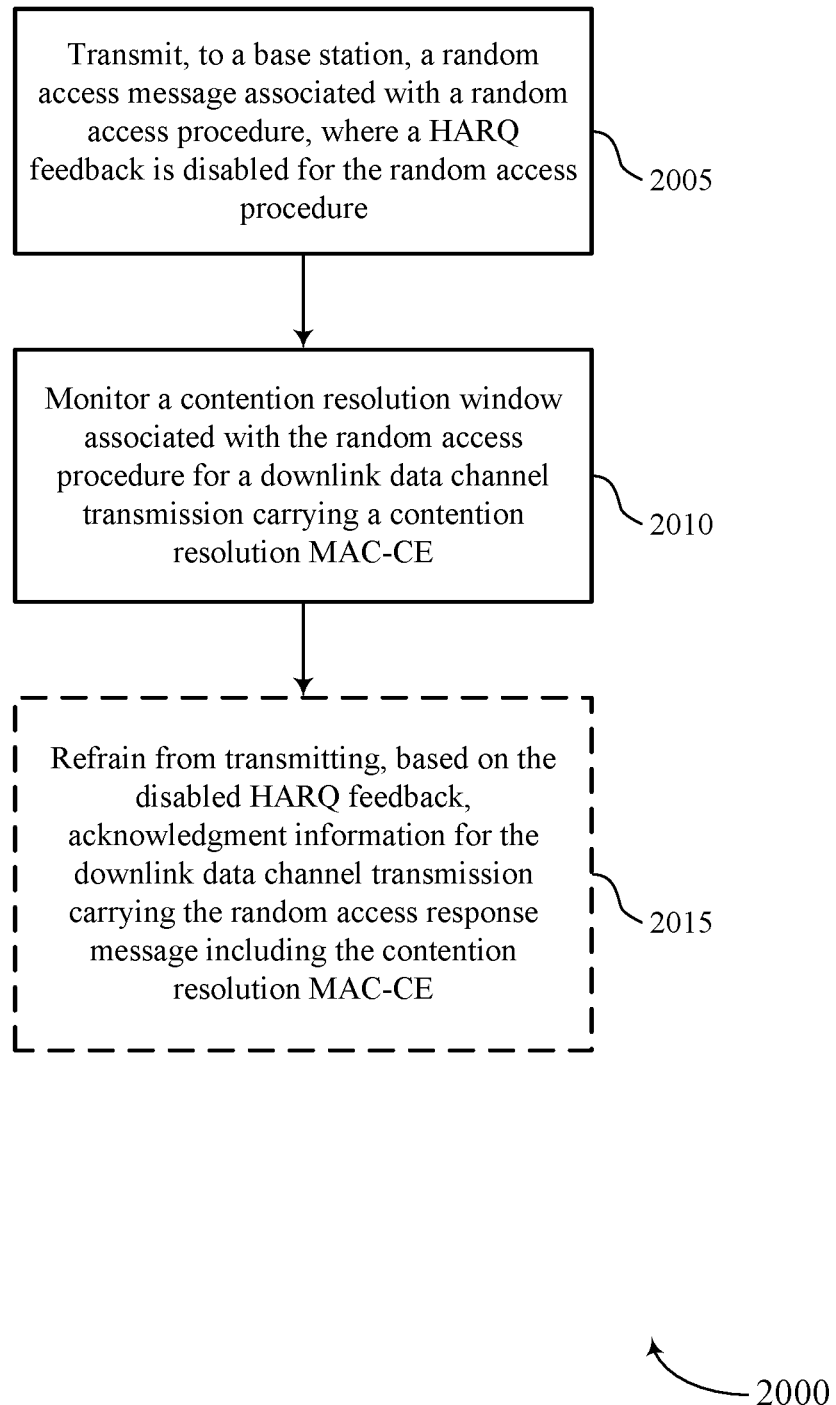

FIG. 20 shows a flowchart illustrating a method 2000 in accordance with one or more aspects of the present disclosure. The operations of method 2000 may be implemented by a UE 115 or its components as described herein. For example, the operations of method 2000 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2005, the UE may transmit, to a base station, a random access message associated with a random access procedure, where a HARQ feedback is disabled for the random access procedure. The operations of 2005 may be performed according to the methods described herein. In some examples, aspects of the operations of 2005 may be performed by a message component as described with reference to FIGS. 5 through 8.

At 2010, the UE may monitor a contention resolution window associated with the random access procedure for a downlink data channel transmission carrying a contention resolution MAC-CE. The operations of 2010 may be performed according to the methods described herein. In some examples, aspects of the operations of 2010 may be performed by a window component as described with reference to FIGS. 5 through 8.

At 2015, the UE may optionally refrain from transmitting, based on the disabled HARQ feedback, acknowledgment information for the downlink data channel transmission carrying the random access response message including the contention resolution MAC-CE. The operations of 2015 may be performed according to the methods described herein. In some examples, aspects of the operations of 2015 may be performed by a feedback component as described with reference to FIGS. 5 through 8.

Figure 21:
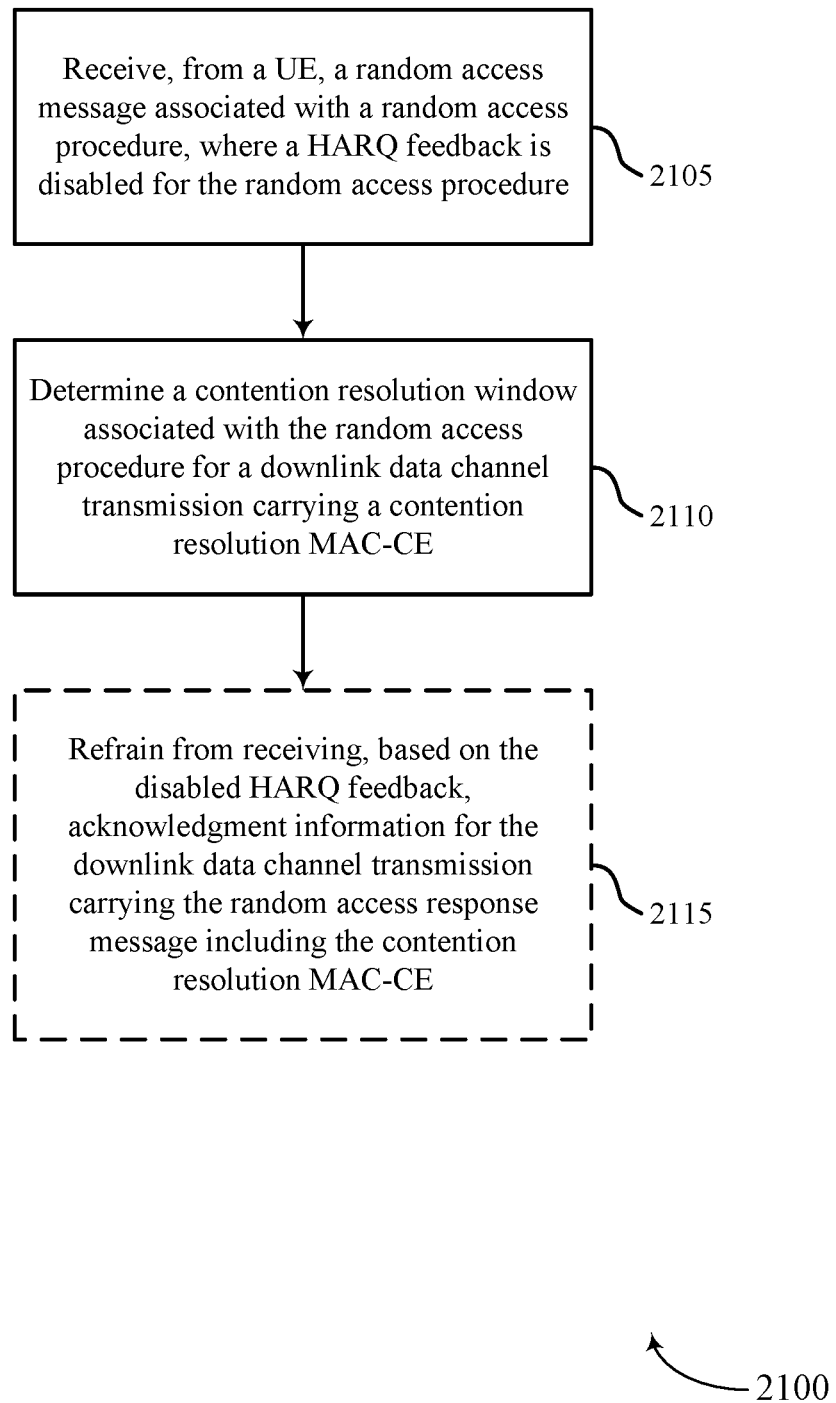

FIG. 21 shows a flowchart illustrating a method 2100 in accordance with one or more aspects of the present disclosure. The operations of method 2100 may be implemented by a base station 105 or its components as described herein. For example, the operations of method 2100 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2105, the base station may receive, from a UE, a random access message associated with a random access procedure, where a HARQ feedback is disabled for the random access procedure. The operations of 2105 may be performed according to the methods described herein. In some examples, aspects of the operations of 2105 may be performed by a message component as described with reference to FIGS. 9 through 12.

At 2110, the base station may determine a contention resolution window associated with the random access procedure for a downlink data channel transmission carrying a contention resolution MAC-CE. The operations of 2110 may be performed according to the methods described herein. In some examples, aspects of the operations of 2110 may be performed by a window component as described with reference to FIGS. 9 through 12.

At 2115, the base station may optionally refrain from receiving, based on the disabled HARQ feedback, acknowledgment information for the downlink data channel transmission carrying the random access response message including the contention resolution MAC-CE. The operations of 2115 may be performed according to the methods described herein. In some examples, aspects of the operations of 2115 may be performed by a feedback component as described with reference to FIGS. 9 through 12.

Figure 22:
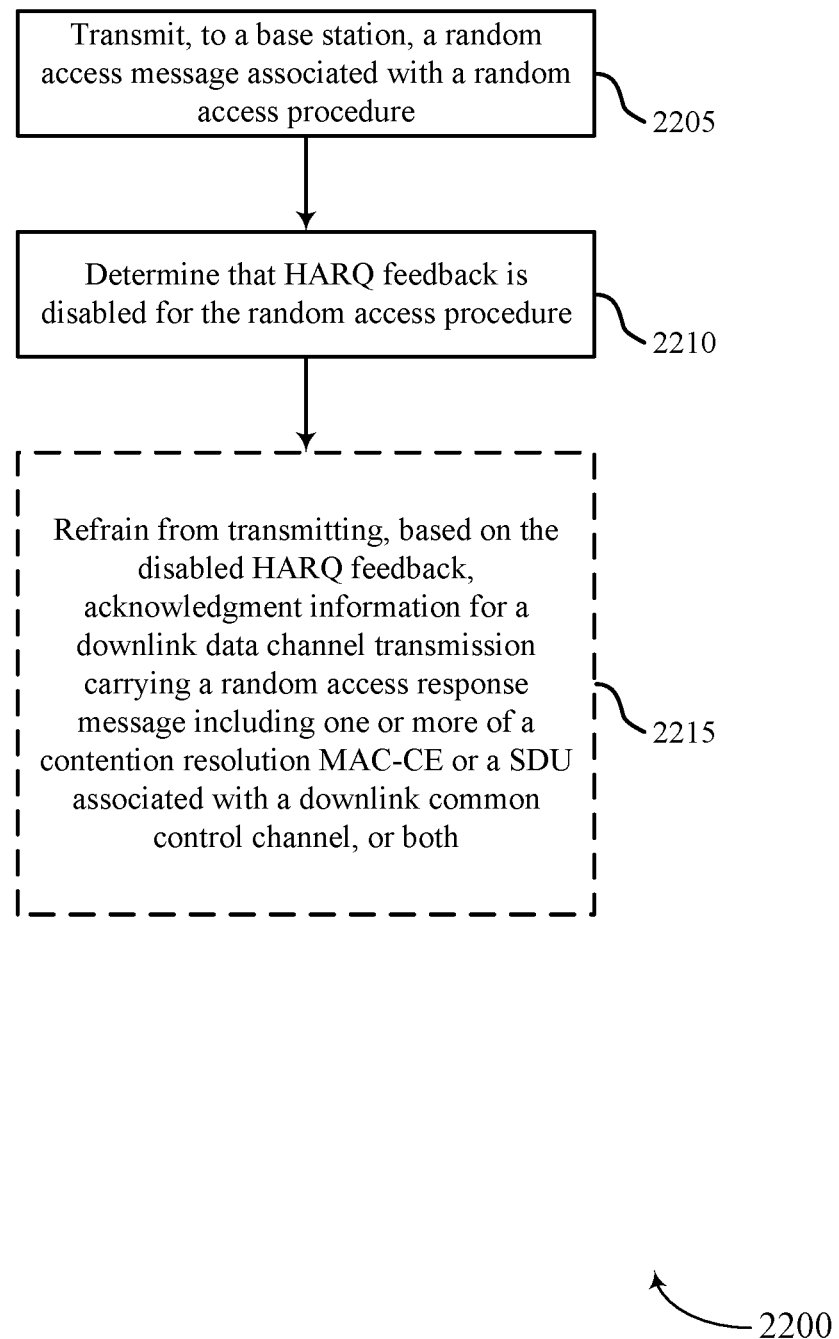

FIG. 22 shows a flowchart illustrating a method 2200 in accordance with one or more aspects of the present disclosure. The operations of method 2200 may be implemented by a UE 115 or its components as described herein. For example, the operations of method 2200 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2205, the UE may transmit, to a base station, a random access message associated with a random access procedure. The operations of 2205 may be performed according to the methods described herein. In some examples, aspects of the operations of 2205 may be performed by a message component as described with reference to FIGS. 5 through 8.

At 2210, the UE may determine that HARQ feedback is disabled for the random access procedure. The operations of 2210 may be performed according to the methods described herein. In some examples, aspects of the operations of 2210 may be performed by a window component as described with reference to FIGS. 5 through 8.

At 2215, the UE may refrain from transmitting, based on the disabled HARQ feedback, acknowledgment information for a downlink data channel transmission carrying a random access response message including one or more of a contention resolution MAC-CE or an SDU associated with a downlink common control channel, or both. The operations of 2215 may be performed according to the methods described herein. In some examples, aspects of the operations of 2215 may be performed by a feedback component as described with reference to FIGS. 5 through 8.

Figure 23:
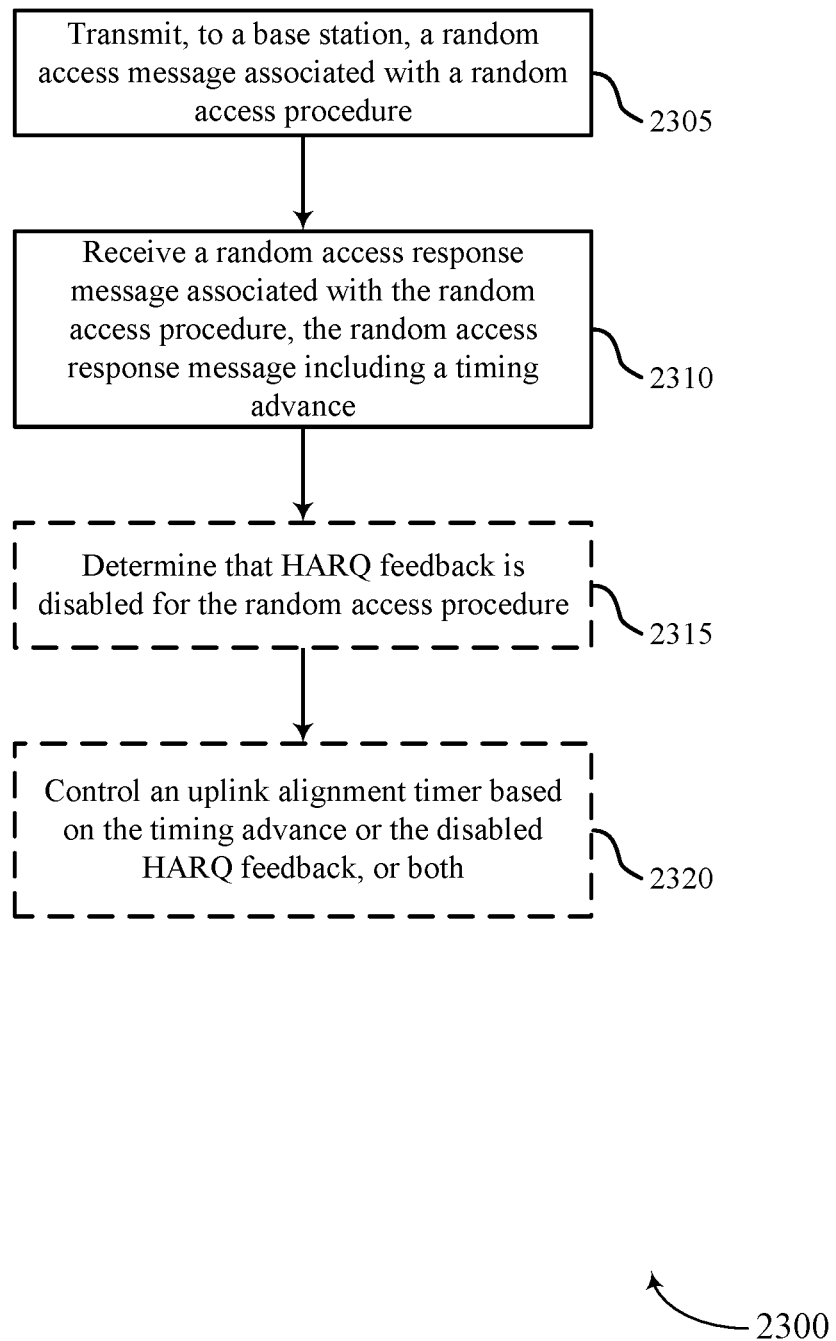

FIG. 23 shows a flowchart illustrating a method 2300 in accordance with one or more aspects of the present disclosure. The operations of method 2300 may be implemented by a UE 115 or its components as described herein. For example, the operations of method 2300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2305, the UE may transmit, to a base station, a random access message associated with a random access procedure. The operations of 2305 may be performed according to the methods described herein. In some examples, aspects of the operations of 2305 may be performed by a message component as described with reference to FIGS. 5 through 8.

At 2310, the UE may receive a random access response message associated with the random access procedure, the random access response message including a timing advance. The operations of 2310 may be performed according to the methods described herein. In some examples, aspects of the operations of 2310 may be performed by a message component as described with reference to FIGS. 5 through 8.

At 2315, the UE may optionally determine that HARQ feedback is disabled for the random access procedure. The operations of 2315 may be performed according to the methods described herein. In some examples, aspects of the operations of 2315 may be performed by a feedback component as described with reference to FIGS. 5 through 8.

At 2320, the UE may optionally control an uplink alignment timer based on the timing advance or the disabled HARQ feedback, or both. The operations of 2320 may be performed according to the methods described herein. In some examples, aspects of the operations of 2320 may be performed by a timer component as described with reference to FIGS. 5 through 8.

Figure 24:
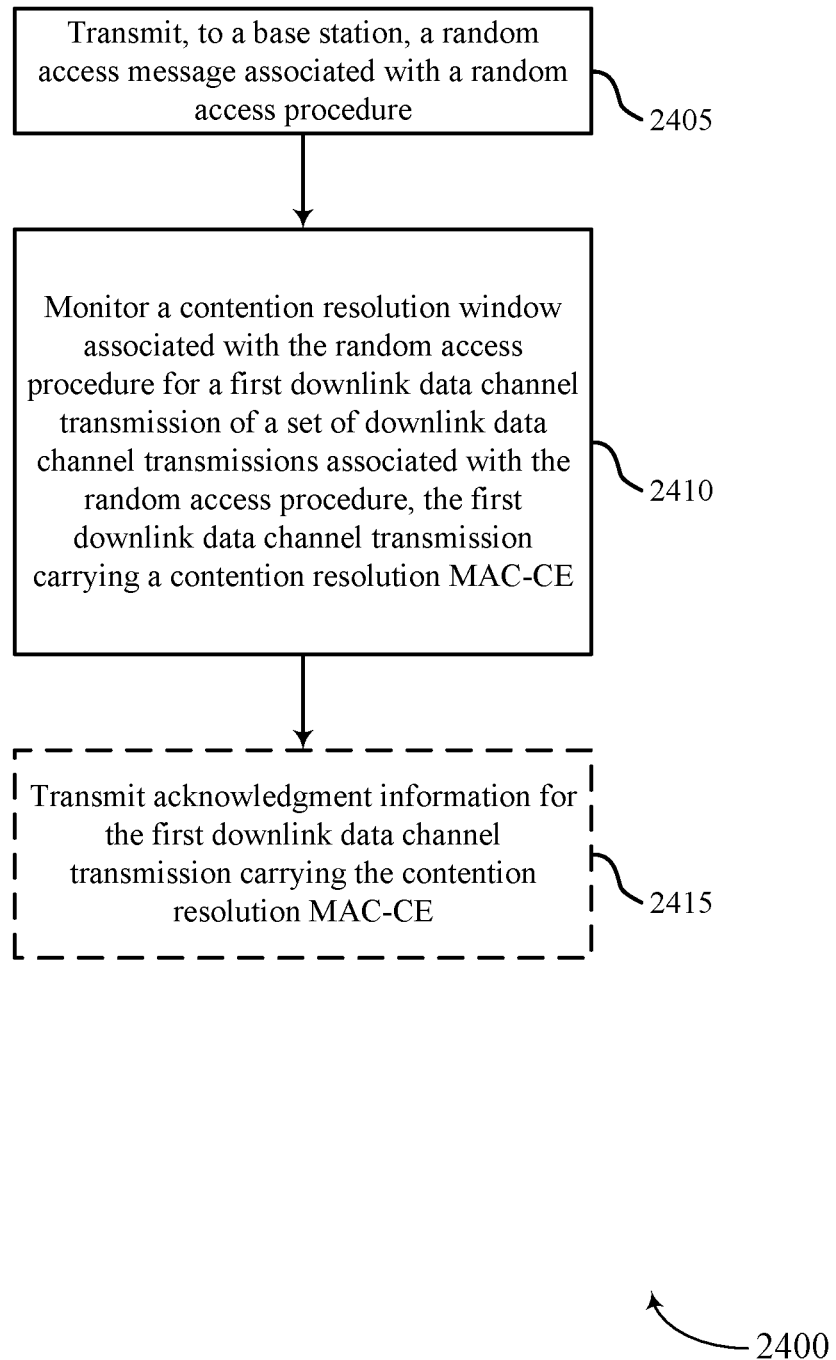

FIG. 24 shows a flowchart illustrating a method 2400 in accordance with one or more aspects of the present disclosure. The operations of method 2400 may be implemented by a UE 115 or its components as described herein. For example, the operations of method 2400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2405, the UE may transmit, to a base station, a random access message associated with a random access procedure. The operations of 2405 may be performed according to the methods described herein. In some examples, aspects of the operations of 2405 may be performed by a message component as described with reference to FIGS. 5 through 8.

At 2410, the UE may monitor a contention resolution window associated with the random access procedure for a first downlink data channel transmission of a set of downlink data channel transmissions associated with the random access procedure, the first downlink data channel transmission carrying a contention resolution MAC-CE. The operations of 2410 may be performed according to the methods described herein. In some examples, aspects of the operations of 2410 may be performed by a window component as described with reference to FIGS. 5 through 8.

At 2415, the UE may optionally transmit acknowledgment information for the first downlink data channel transmission carrying the contention resolution MAC-CE. The operations of 2415 may be performed according to the methods described herein. In some examples, aspects of the operations of 2415 may be performed by a feedback component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining that HARQ feedback is disabled; transmitting, to a base station, a random access message associated with a random access procedure based at least in part on determining that the HARQ feedback is disabled; initiating a contention resolution window associated with the random access procedure for a downlink data channel transmission of a plurality of downlink data channel transmissions associated with the random access procedure; and receiving, during the contention resolution window, the downlink data channel transmission, the downlink data channel transmission carrying a contention resolution MAC-CE.

Aspect 2: The method of aspect 1, wherein the random access message comprises a msg3.

Aspect 3: The method of any of aspects 1 through 2, further comprising: transmitting acknowledgment information for the downlink data channel transmission carrying the contention resolution MAC-CE based at least in part on an indication to enable the HARQ feedback for the random access procedure.

Aspect 4: The method of aspect 3, further comprising: identifying the indication to enable the HARQ feedback based at least in part on UE context information, a network configuration to enable the HARQ feedback, or a default configuration to enable the HARQ feedback; and enabling the HARQ feedback based at least in part on the identifying.

Aspect 5: The method of any of aspects 3 through 4, further comprising: transmitting in the random access message a request to enable the HARQ feedback for the downlink data channel transmission carrying the contention resolution MAC-CE.

Aspect 6: The method of any of aspects 3 or 5, further comprising: receiving the indication in the contention resolution MAC-CE; and enabling the HARQ feedback based at least in part on the indication in the contention resolution MAC-CE.

Aspect 7: The method of any of aspects 3 or 6, further comprising: receiving a DCI message scheduling the downlink data channel transmission carrying the contention resolution MAC-CE, wherein the DCI message comprises the indication to enable the HARQ feedback.

Aspect 8: The method of any of aspects 3 through 7, wherein determining resources associated with an uplink control channel based at least in part on a second indication in the contention resolution MAC-CE, wherein the second indication comprises a new MAC-CE providing uplink control channel resources, and wherein transmitting the acknowledgment information comprises: transmitting the acknowledgment information on the uplink control channel using the determined resources.

Aspect 9: The method of aspect 8, wherein a logical channel identifier of the new MAC-CE is the same as or different from the contention resolution MAC-CE.

Aspect 10: The method of aspect 3, further comprising: determining a failure to receive the downlink data channel transmission carrying the contention resolution MAC-CE, wherein the HARQ feedback is enabled for the random access procedure, and the acknowledgment information comprises a negative acknowledgment.

Aspect 11: The method of any of aspects 3 through 11, wherein transmitting the acknowledgment information comprises: transmitting the acknowledgment information based at least in part on the contention resolution window lapsing, wherein the HARQ feedback is enabled for the random access procedure, and the acknowledgment information comprising a negative acknowledgment.

Aspect 12: The method of any of aspects 1 through 12, further comprising: receiving an RRC message comprising an indication to disable the HARQ feedback for the random access procedure, wherein determining that the HARQ feedback is disabled is based at least in part on receiving the RRC message.

Aspect 13: The method of any of aspects 1 through 13, further comprising: receiving a random access response message associated with the random access procedure, the random access response message including a timing advance; and controlling an uplink alignment timer based at least in part on the timing advance or the disabled HARQ feedback for the random access procedure, or both.

Aspect 14: The method of any of aspects 1 through 13, wherein the base station is a non-terrestrial base station comprising a satellite or a high altitude platform station in a non-terrestrial network.

Aspect 15: A method for wireless communication at a base station, comprising: receiving, from a UE, a random access message associated with a random access procedure, wherein a HARQ feedback is disabled, and wherein a contention resolution window is associated with the random access procedure for a downlink data channel transmission of a plurality of downlink data channel transmissions associated with the random access procedure; and transmitting, during the contention resolution window, the downlink data channel transmission, the downlink data channel transmission carrying a contention resolution MAC-CE.

Aspect 16: The method of aspect 15, further comprising: transmitting, to the UE, an indication to enable the HARQ feedback; and receiving acknowledgment information for the downlink data channel transmission carrying the contention resolution MAC-CE based at least in part on transmitting the indication to enable the HARQ feedback.

Aspect 17: The method of aspect 16, further comprising: transmitting the indication in the contention resolution MAC-CE.

Aspect 18: A method for wireless communication at a UE, comprising: determining that HARQ feedback is disabled for a random access procedure; transmitting, to a base station, a random access message associated with the random access procedure based at least in part on determining that the HARQ feedback is disabled for the random access procedure; and refraining from transmitting, based at least in part on the disabled HARQ feedback, acknowledgment information for a downlink data channel transmission carrying a random access response message including a contention resolution MAC-CE.

Aspect 19: The method of aspect 18, wherein the random access message comprises a msg3.

Aspect 20: The method of any of aspects 18 through 19, further comprising: monitoring a contention resolution window associated with the random access procedure for a number of repetitions associated with the downlink data channel transmission carrying the contention resolution MAC-CE.

Aspect 21: The method of aspect 20, further comprising: receiving a configuration comprising an indication of the number of repetitions associated with the downlink data channel transmission carrying the contention resolution MAC-CE.

Aspect 22: The method of any of aspects 20 through 21, further comprising: receiving a downlink control channel carrying a DCI message scheduling one or multiple transport blocks associated with the number of repetitions associated with the downlink data channel transmission carrying the contention resolution MAC-CE.

Aspect 23: The method of any of aspects 20 through 22, further comprising: initiating a contention resolution timer associated with the contention resolution window, wherein monitoring the contention resolution window is based at least in part on the contention resolution timer.

Aspect 24: The method of any of aspects 18 through 23, wherein the random access response message further comprises an SDU associated with a downlink common control channel.

Aspect 25: A method for wireless communication at a UE, comprising: transmitting, to a base station, a random access message associated with a random access procedure; receiving a configuration for a contention resolution timer; setting, based at least in part on the configuration, a value for the contention resolution timer; monitoring a contention resolution window associated with the random access procedure for a first downlink data channel transmission of a plurality of downlink data channel transmissions associated with the random access procedure based at least in part on setting the value for the contention resolution timer, the first downlink data channel transmission carrying a contention resolution MAC-CE; and transmitting acknowledgment information for the first downlink data channel transmission carrying the contention resolution MAC-CE.

Aspect 26: The method of aspect 25, further comprising: receiving a DCI message scheduling a second downlink data channel transmission of the plurality of downlink data channel transmissions that carries a second contention resolution MAC-CE, wherein the DCI message comprises an indication to disable HARQ feedback for the second downlink data channel transmission.

Aspect 27: The method of any of aspects 25 through 26, wherein the value for the contention resolution timer is based at least in part on one or more of a maximum propagation delay between the UE and the base station, a duration of a transmission time interval associated with a transmission of a contention resolution identifier, or a gap between a downlink data channel reception and an uplink control channel transmission, or a combination thereof.

Aspect 28: The method of any of aspects 25 through 27, wherein transmitting the acknowledgment information comprises: transmitting the acknowledgment information based at least in part on the contention resolution window lapsing, the acknowledgment information comprising a negative acknowledgment.

Aspect 29: A method for wireless communication at a base station, comprising: receiving, from a UE, a random access message associated with a random access procedure;

transmitting a configuration for a contention resolution timer; transmitting, during a contention resolution window associated with the random access procedure, a first downlink data channel transmission of a plurality of downlink data channel transmissions associated with the random access procedure based at least in part on transmitting the configuration for the contention resolution timer, the first downlink data channel transmission carrying a contention resolution MAC-CE; and receiving acknowledgment information for the first downlink data channel transmission carrying the contention resolution MAC-CE.

Aspect 30: The method of aspect 29, further comprising: transmitting a DCI message scheduling a second downlink data channel transmission of the plurality of downlink data channel transmissions that carries a second contention resolution MAC-CE, wherein the DCI message comprises an indication to disable HARQ feedback for the second downlink data channel transmission.

Aspect 31: A method for wireless communication at a UE, comprising: transmitting, to a base station, a random access message associated with a random access procedure, wherein a HARQ feedback is disabled for the random access procedure; monitoring a contention resolution window associated with the random access procedure for a first downlink data channel transmission of a plurality of downlink data channel transmissions associated with the random access procedure, the first downlink data channel transmission carrying a contention resolution MAC-CE; and transmitting acknowledgment information for the first downlink data channel transmission carrying the contention resolution MAC-CE based at least in part on an indication to enable the HARQ feedback.

Aspect 32: The method of aspect 31, wherein the random access message comprises a msg3.

Aspect 33: The method of aspects 31 or 32, further comprising: identifying the indication to enable the HARQ feedback in UE context information; and enabling the HARQ feedback based at least in part on the identifying.

Aspect 34: The method of any of aspects 31 to 33, further comprising: transmitting in the random access message a request to enable the HARQ feedback for the first downlink data channel transmission carrying the contention resolution MAC-CE.

Aspect 35: The method of any of aspects 31 to 34, further comprising: receiving the indication in the contention resolution MAC-CE; and enabling the HARQ feedback based at least in part on the indication in the contention resolution MAC-CE.

Aspect 36: The method of aspect 35, wherein the indication comprises a bit indication.

Aspect 37: The method of aspect 36, wherein the bit indication comprises a reserved bit in a MAC subheader of the contention resolution MAC-CE.

Aspect 38: The method of any of aspects 31 to 37, further comprising: receiving a DCI message scheduling the first downlink data channel transmission carrying the contention resolution MAC-CE, wherein the DCI message comprises the indication to enable the HARQ feedback.

Aspect 39: The method of any of aspects 31 to 38, wherein determining resources associated with an uplink control channel based at least in part on a second indication in the contention resolution MAC-CE, wherein transmitting the acknowledgment information comprises: transmitting the acknowledgment information on the uplink control channel using the determined resources.

Aspect 40: The method of aspect 39, wherein the second indication comprises a new the MAC-CE providing uplink control channel resource.

Aspect 41: The method of aspect 40, wherein a logical channel identifier of the MAC-CE is same as or different from the contention resolution MAC-CE.

Aspect 42: The method of aspect 39, wherein the resources are adjacent to an ending of the contention resolution window.

Aspect 43: The method of any of aspects 31 to 42, wherein receiving a DCI message scheduling resources associated with an uplink control channel, wherein transmitting the acknowledgment information comprises: transmitting the acknowledgment information on the uplink control channel using the scheduled resources.

Aspect 44: The method of aspect 43, further comprising: determining the scheduled resources based at least in part on one or more resource indices in the DCI message, the one or more resource indices corresponding to the scheduled resources.

Aspect 45: The method of any of aspects 31 to 44, further comprising: determining a failure to receive the first downlink data channel transmission carrying the contention resolution MAC-CE, wherein the HARQ feedback is enabled for the random access procedure, and the acknowledgment information comprises a negative acknowledgment.

Aspect 46: The method of any of aspects 31, wherein transmitting the acknowledgment information comprises: transmitting the acknowledgment information based at least in part on the contention resolution window lapsing, wherein the HARQ feedback is enabled for the random access procedure, and the acknowledgment information comprising a negative acknowledgment.

Aspect 47: The method of any of aspects 31 to 46, further comprising: receiving a configuration for a contention resolution timer; and setting, based at least in part on the configuration, a value for the contention resolution timer.

Aspect 48: The method of aspect 47, wherein the value for the contention resolution timer is based at least in part on one or more of a maximum propagation delay between the UE and the base station, a duration of a transmission time interval associated with a transmission of a contention resolution identifier, or a gap between a downlink data channel reception and an uplink control channel transmission, or a combination thereof.

Aspect 49: The method of any of aspects 31 to 48, wherein the contention resolution window comprises one or more DRX cycles.

Aspect 50: The method of aspect 49, wherein monitoring the contention resolution window comprises: monitoring the contention resolution window during one or more active durations associated with the one or more DRX cycles.

Aspect 51: The method of any of aspects 31 to 50, wherein the base station is a non-terrestrial base station comprising a satellite or a high altitude platform station in a non-terrestrial network.

Aspect 52: The method of any of aspects 31 to 51, wherein the acknowledgment information comprises a positive acknowledgment or a negative acknowledgment.

Aspect 53: The method of any of aspects 31 to 52, wherein the contention resolution MAC-CE comprises a contention resolution identifier.

Aspect 54: The method of aspect 53, wherein a length of the contention resolution identifier in the contention resolution MAC-CE is lesser than or equal to a default length of a default contention resolution identifier.

Aspect 55: The method of any of aspects 31 to 54, further comprising: transmitting an RRC message indicating a failure for a contention resolution associated with the random access procedure.

Aspect 56: A method for wireless communication at a base station, comprising: receiving, from a UE, a random access message associated with a random access procedure, wherein a HARQ feedback is disabled for the random access procedure; determining a contention resolution window associated with the random access procedure for a first downlink data channel transmission of a plurality of downlink data channel transmissions associated with the random access procedure, the first downlink data channel transmission carrying a contention resolution MAC-CE; and receiving acknowledgment information for the first downlink data channel transmission carrying the contention resolution MAC-CE based at least in part on transmitting, to the UE, an indication to enable the HARQ feedback.

Aspect 57: The method of aspect 56, wherein the random access message comprises a msg3.

Aspect 58: The method of aspect 56 or 57, further comprising: including the indication in UE context information.

Aspect 59: The method of any of aspects 56 to 58, further comprising: receiving in the random access message a request to enable the HARQ feedback for the first downlink data channel transmission carrying the contention resolution MAC-CE.

Aspect 60: The method of any of aspects 56 to 59, further comprising: transmitting the indication in the contention resolution MAC-CE.

Aspect 61: The method of aspect 60, wherein the indication comprises a bit indication.

Aspect 62: The method of aspect 61, wherein the bit indication comprises a reserved bit in a MAC-CE of the contention resolution MAC-CE.

Aspect 63: The method of any of aspects 56 to 62, further comprising: transmitting DCI message scheduling the first downlink data channel transmission carrying the contention resolution MAC-CE, wherein the DCI message comprises the indication to enable the HARQ feedback.

Aspect 64: The method of any of aspects 56 to 63, wherein transmitting a DCI message scheduling resources associated with an uplink control channel, wherein receiving the acknowledgment information comprises: receiving the acknowledgment information on the uplink control channel using the scheduled resources.

Aspect 65: The method of any of aspects 56 to 64, wherein receiving the acknowledgment information comprises: receiving the acknowledgment information based at least in part on the contention resolution window lapsing, the acknowledgment information comprising a negative acknowledgment.

Aspect 66: The method of any of aspects 56 to 65, wherein the contention resolution window comprises one or more DRX cycles.

Aspect 67: The method of any of aspects 56 to 66, wherein the base station is a non-terrestrial base station comprising a satellite or a high altitude platform station in a non-terrestrial network.

Aspect 68: The method of any of aspects 56 to 67, wherein the acknowledgment information comprises a positive acknowledgment or a negative acknowledgment.

Aspect 69: The method of any of aspects 56 to 68, wherein the contention resolution MAC-CE comprises a contention resolution identifier.

Aspect 70: The method of any of aspects 56 to 69, further comprising: receiving an RRC message indicating a failure for a contention resolution associated with the random access procedure.

Aspect 71: A method for wireless communication at a UE, comprising: transmitting, to a base station, a random access message associated with a random access procedure, wherein a HARQ feedback is disabled for the random access procedure; monitoring a contention resolution window associated with the random access procedure for a downlink data channel transmission carrying a contention resolution MAC-CE; and refraining from transmitting, based at least in part on the disabled HARQ feedback, acknowledgment information for the downlink data channel transmission carrying the random access response message including the contention resolution MAC-CE.

Aspect 72: The method of aspect 71, wherein the random access message comprises a msg3.

Aspect 73: The method of aspect 71 or 72, wherein monitoring the contention resolution window associated with the random access procedure comprises: monitoring the contention resolution window for a number of repetitions associated with the downlink data channel transmission carrying the contention resolution MAC-CE.

Aspect 74: The method of aspect 73, further comprising: receiving a configuration comprising an indication of the number of repetitions associated with the downlink data channel transmission carrying the contention resolution MAC-CE.

Aspect 75: The method of aspect 73, further comprising: receiving a downlink control channel carrying a DCI message scheduling one or multiple transport blocks associated with the number of repetitions associated with the downlink data channel transmission carrying the contention resolution MAC-CE.

Aspect 76: The method of aspect 73, further comprising: receiving a configuration for a contention resolution timer; and setting, based at least in part on the configuration, a value for the contention resolution timer.

Aspect 77: The method of aspect 76, wherein the value for the contention resolution timer is based at least in part on one or more of a maximum propagation delay between the UE and the base station, a duration of a transmission time interval associated with a transmission of a contention resolution identifier, or a gap between a downlink data channel reception and an uplink control channel transmission, or a combination thereof.

Aspect 78: The method of aspect 73, further comprising: initiating a contention resolution timer associated with the contention resolution window, wherein monitoring the contention resolution window is based at least in part on the contention resolution timer.

Aspect 79: The method of aspect 73, wherein the contention resolution window comprises one or more DRX cycles.

Aspect 80: The method of aspect 79, wherein monitoring the contention resolution window comprises: monitoring the contention resolution window during one or more active durations associated with the one or more DRX cycles.

Aspect 81: The method of aspect 73, wherein the base station is a non-terrestrial base station comprising a satellite or a high altitude platform station in a non-terrestrial network.

Aspect 82: A method for wireless communication at a base station, comprising: receiving, from a UE, a random access message associated with a random access procedure, wherein a HARQ feedback is disabled for the random access procedure; determining a contention resolution window associated with the random access procedure for a downlink data channel transmission carrying a contention resolution MAC-CE; and refraining from receiving, based at least in part on the disabled HARQ feedback, acknowledgment information for the downlink data channel transmission carrying the random access response message including the contention resolution MAC-CE.

Aspect 83: The method of aspect 82, wherein the random access message comprises a msg3.

Aspect 84: The method of aspect 82 or 83, further comprising: transmitting a configuration comprising an indication of a number of repetitions associated with the downlink data channel transmission carrying the contention resolution MAC-CE.

Aspect 85: The method of any of aspects 82 to 84, further comprising: transmitting a downlink control channel carrying a DCI message scheduling one or multiple transport blocks associated with the number of repetitions associated with the downlink data channel transmission carrying the contention resolution MAC-CE.

Aspect 86: The method of any of aspects 82 to 85, wherein the contention resolution window comprises one or more DRX cycles.

Aspect 87: The method of any of aspects 82 to 86, wherein the base station is a non-terrestrial base station comprising a satellite or a high altitude platform station in a non-terrestrial network.

Aspect 88: A method for wireless communication at a UE, comprising: transmitting, to a base station, a random access message associated with a random access procedure; determining that HARQ feedback is disabled for the random access procedure; and refraining from transmitting, based at least in part on the disabled HARQ feedback, acknowledgment information for a downlink data channel transmission carrying a random access response message including one or more of a contention resolution MAC-CE or a SDU associated with a downlink common control channel, or both.

Aspect 89: The method of aspect 88, wherein the random access message comprises a msg3.

Aspect 90: The method of aspect 88 or 89, further comprising: monitoring a contention resolution window associated with the random access procedure for the downlink data channel transmission carrying the random access response message including one or more of the contention resolution MAC-CE or the SDU associated with the downlink common control channel, or both.

Aspect 91: The method of any of aspects 88 to 90, further comprising: receiving a configuration for a contention resolution timer; and setting, based at least in part on the configuration, a value for the contention resolution timer.

Aspect 92: The method of aspect 91, wherein the value for the contention resolution timer is based at least in part on one or more of a maximum propagation delay between the UE and the base station, a duration of a transmission time interval associated with a transmission of a contention resolution identifier, or a gap between a downlink data channel reception and an uplink control channel transmission, or a combination thereof.

Aspect 93: The method of any of aspects 88 to 92, further comprising: initiating a contention resolution timer associated with a contention resolution window, wherein monitoring the contention resolution window is based at least in part on the contention resolution timer.

Aspect 94: The method of any of aspects 88 to 93, wherein a contention resolution window comprises one or more DRX cycles.

Aspect 95: The method of aspect 94, wherein monitoring the contention resolution window comprises: monitoring the contention resolution window during one or more active durations associated with the one or more DRX cycles.

Aspect 96: The method of any of aspects 88 to 95, wherein the base station is a non-terrestrial base station comprising a satellite or a high altitude platform station in a non-terrestrial network.

Aspect 97: A method for wireless communication at a UE, comprising: transmitting, to a base station, a random access message associated with a random access procedure; receiving a random access response message associated with the random access procedure, the random access response message including a timing advance; determining that HARQ feedback is disabled for the random access procedure; and controlling an uplink alignment timer based at least in part on the timing advance or the disabled HARQ feedback, or both.

Aspect 98: The method of aspect 97, wherein the random access message comprises a msg3.

Aspect 99: The method of aspect 97 to 98, further comprising: setting an uplink alignment timer based at least in part on a configuration.

Aspect 100: The method of aspect 99, further comprising: activating the uplink alignment timer based at least in part on receiving the random access response message including the timing advance.

Aspect 101: The method of aspect 99, further comprising: deactivating the uplink alignment timer based at least in part on receiving a contention resolution MAC-CE and before transmitting acknowledgment information for a downlink data channel transmission carrying the contention resolution MAC-CE, or both.

Aspect 102: The method of aspect 99, wherein a value for the uplink alignment timer is based at least in part on one or more of a maximum propagation delay between the UE and the base station, a duration of a transmission time interval, or a gap between a downlink data channel reception and an uplink control channel transmission, or a combination thereof.

Aspect 103: A method for wireless communication at a UE, comprising: transmitting, to a base station, a random access message associated with a random access procedure; monitoring a contention resolution window associated with the random access procedure for a first downlink data channel transmission of a plurality of downlink data channel transmissions associated with the random access procedure, the first downlink data channel transmission carrying a contention resolution MAC-CE; and transmitting acknowledgment information for the first downlink data channel transmission carrying the contention resolution MAC-CE.

Aspect 104: The method of aspect 103, wherein the random access message comprises a msg3.

Aspect 105: The method of aspect 103 or 104, further comprising: determining to transmit the acknowledgment information for the first downlink data channel transmission carrying the contention resolution MAC-CE, wherein transmitting the acknowledgment information for the first downlink data channel transmission carrying the contention resolution MAC-CE is based at least in part on the determining.

Aspect 106: The method of any of aspects 103 to 105, wherein transmitting the acknowledgment information comprises: transmitting the acknowledgment information based at least in part on the contention resolution window lapsing, the acknowledgment information comprising a negative acknowledgment.

Aspect 107: The method of any of aspects 103 to 106, further comprising: receiving a configuration for a contention resolution timer; and setting, based at least in part on the configuration, a value for the contention resolution timer.

Aspect 108: The method of any of aspects 103 to 107, wherein the contention resolution window comprises one or more DRX cycles.

Aspect 109: The method of aspect 108, wherein monitoring the contention resolution window comprises: monitoring the contention resolution window during one or more active durations associated with the one or more DRX cycles.

Aspect 110: An apparatus for wireless communication at a UE, comprising a processor; memory coupled to the processor; the processor and memory configured to perform a method of any of aspects 1 through 14.

Aspect 111: An apparatus for wireless communication at a UE, comprising at least one means for performing a method of any of aspects 1 through 14.

Aspect 112: A non-transitory computer-readable medium storing code for wireless communication at a UE, the code comprising instructions executable by a processor to perform a method of any of aspects 1 through 14.

Aspect 113: An apparatus for wireless communication at a base station, comprising a processor; memory coupled to the processor; and the processor and memory configured to perform a method of any of aspects 15 through 17.

Aspect 114: An apparatus for wireless communication at a base station, comprising at least one means for performing a method of any of aspects 15 through 17.

Aspect 115: A non-transitory computer-readable medium storing code for wireless communication at a base station, the code comprising instructions executable by a processor to perform a method of any of aspects 15 through 17.

Aspect 116: An apparatus for wireless communication at a UE, comprising a processor; memory coupled to the processor; the processor and memory configured to perform a method of any of aspects 18 through 24.

Aspect 117: An apparatus for wireless communication at a UE, comprising at least one means for performing a method of any of aspects 18 through 24.

Aspect 118: A non-transitory computer-readable medium storing code for wireless communication at a UE, the code comprising instructions executable by a processor to perform a method of any of aspects 18 through 24.

Aspect 119: An apparatus for wireless communication at a UE, comprising a processor; memory coupled to the processor; the processor and memory configured to perform a method of any of aspects 25 through 28.

Aspect 120: An apparatus for wireless communication at a UE, comprising at least one means for performing a method of any of aspects 25 through 28.

Aspect 121: A non-transitory computer-readable medium storing code for wireless communication at a UE, the code comprising instructions executable by a processor to perform a method of any of aspects 25 through 28.

Aspect 122: An apparatus for wireless communication at a base station, comprising a processor; memory coupled with the processor; and instructions stored in the memory and executable by the processor to cause the apparatus to perform a method of any of aspects 29 through 30.

Aspect 123: An apparatus for wireless communication at a base station, comprising at least one means for performing a method of any of aspects 29 through 30.

Aspect 124: A non-transitory computer-readable medium storing code for wireless communication at a base station, the code comprising instructions executable by a processor to perform a method of any of aspects 29 through 30.

Aspect 125: An apparatus for wireless communications comprising a processor; and memory coupled to the processor, the processor and memory configured to perform a method of any of aspects 31-55.

Aspect 126: An apparatus for wireless communications comprising at least one means for performing a method of any of aspects 31-55.

Aspect 127: A non-transitory computer-readable medium storing code for wireless communications, the code comprising instructions executable by a processor to perform a method of any of aspects 31-55.

Aspect 128: An apparatus for wireless communications comprising a processor; and memory coupled to the processor, the processor and memory configured to perform a method of any of aspects 56-70.

Aspect 129: An apparatus for wireless communications comprising at least one means for performing a method of any of aspects 56-70.

Aspect 130: A non-transitory computer-readable medium storing code for wireless communications, the code comprising instructions executable by a processor to perform a method of any of aspects 56-70.

Aspect 131: An apparatus for wireless communications comprising a processor; and memory coupled to the processor, the processor and memory configured to perform a method of any of aspects 71-81.

Aspect 132: An apparatus for wireless communications comprising at least one means for performing a method of any of aspects 71-81.

Aspect 133: A non-transitory computer-readable medium storing code for wireless communications, the code comprising instructions executable by a processor to perform a method of any of aspects 71-81.

Aspect 134: An apparatus for wireless communications comprising a processor; and memory coupled to the processor, the processor and memory configured to perform a method of any of aspects 82-87.

Aspect 135: An apparatus for wireless communications comprising at least one means for performing a method of any of aspects 82-87.

Aspect 136: A non-transitory computer-readable medium storing code for wireless communications, the code comprising instructions executable by a processor to perform a method of any of aspects 82-87.

Aspect 137: An apparatus for wireless communications comprising a processor; and memory coupled to the processor, the processor and memory configured to perform a method of any of aspects 88-96.

Aspect 138: An apparatus for wireless communications comprising at least one means for performing a method of any of aspects 88-96.

Aspect 139: A non-transitory computer-readable medium storing code for wireless communications, the code comprising instructions executable by a processor to perform a method of any of aspects 88-96.

Aspect 140: An apparatus for wireless communications comprising a processor; and memory coupled to the processor, the processor and memory configured to perform a method of any of aspects 97-102.

Aspect 141: An apparatus for wireless communications comprising at least one means for performing a method of any of aspects 97-102.

Aspect 142: A non-transitory computer-readable medium storing code for wireless communications, the code comprising instructions executable by a processor to perform a method of any of aspects 97-102.

Aspect 143: An apparatus for wireless communications comprising a processor; and memory coupled to the processor, the processor and memory configured to perform a method of any of aspects 103-109.

Aspect 144: An apparatus for wireless communications comprising at least one means for performing a method of any of aspects 103-109.

Aspect 145: A non-transitory computer-readable medium storing code for wireless communications, the code comprising instructions executable by a processor to perform a method of any of aspects 103-109.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "improvements" over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting, to a network device, a random access message associated with a random access procedure, wherein a hybrid automatic repeat request (HARQ) feedback is disabled for a first downlink data channel transmission associated with the random access procedure;
   initiating a contention resolution window associated with the random access procedure for the first downlink data channel transmission of a plurality of downlink data channel transmissions associated with the random access procedure;
   receiving, within the contention resolution window, the first downlink data channel transmission, wherein the first downlink data channel transmission includes a contention resolution medium access control-control element (MAC-CE); and
   controlling an uplink alignment timer irrespective of the HARQ feedback.

2. The method of claim 1, wherein the random access message comprises a random access message 3.

3. The method of claim 1, further comprising:
   transmitting acknowledgment information for the first downlink data channel transmission that includes the contention resolution MAC-CE based at least in part on an indication to enable the HARQ feedback for the random access procedure.

4. The method of claim 3, further comprising:
   identifying the indication to enable the HARQ feedback based at least in part on a default configuration to enable the HARQ feedback; and
   enabling the HARQ feedback based at least in part on the indication.

5. The method of claim 3, further comprising:
   transmitting in the random access message a request to enable the HARQ feedback for the first downlink data channel transmission that includes the contention resolution MAC-CE.

6. The method of claim 3, further comprising:
   receiving the indication in the contention resolution MAC-CE; and
   enabling the HARQ feedback based at least in part on the indication in the contention resolution MAC-CE.

7. The method of claim 3, further comprising:
   receiving a downlink control information message that schedules the first downlink data channel transmission that includes the contention resolution MAC-CE,
   wherein the downlink control information message comprises the indication to enable the HARQ feedback for the first downlink data channel transmission that includes the contention resolution MAC-CE associated with the random access procedure.

8. The method of claim 3, further comprising:
   determining resources associated with an uplink control channel based at least in part on a second indication in the contention resolution MAC-CE, wherein the second indication comprises a new MAC-CE that indicates uplink control channel resources, and wherein transmitting the acknowledgment information comprises:
   transmitting the acknowledgment information on the uplink control channel based at least in part on the determined resources.

9. The method of claim 8, wherein a logical channel identifier of the new MAC-CE is the same as or different from the contention resolution MAC-CE.

10. The method of claim 3, further comprising:
    determining a failure to receive the first downlink data channel transmission that includes the contention resolution MAC-CE, wherein the HARQ feedback is enabled for the random access procedure, and the acknowledgment information comprises a negative acknowledgment.

11. The method of claim 3, wherein transmitting the acknowledgment information comprises:
    transmitting the acknowledgment information based at least in part on an expiration of the contention resolution window, wherein the HARQ feedback is enabled for the random access procedure, and the acknowledgment information comprises a negative acknowledgment.

12. The method of claim 1, further comprising:
    receiving a radio resource control message that comprises an indication to disable the HARQ feedback for the random access procedure; and
    determining that the HARQ feedback is disabled based at least in part on the received radio resource control message.

13. The method of claim 1, further comprising:
    receiving a random access response message associated with the random access procedure, wherein the random access response message includes a timing advance (TA); and
    controlling the uplink alignment timer based at least in part on the TA or the disabled HARQ feedback for the random access procedure, or both.

14. The method of claim 1, wherein the network device is a non-terrestrial network device that comprises a satellite or a high altitude platform station in a non-terrestrial network.

15. The method of claim 3, further comprising:
    identifying the indication to enable the HARQ feedback based at least in part on UE context information or a network configuration to enable the HARQ feedback, or both; and
    enabling the HARQ feedback based at least in part on the indication.

16. The method of claim 3, further comprising:
    receiving a radio resource control configuration that includes the indication to enable the HARQ feedback for the random access procedure.

17. A method for wireless communication at a network device, comprising:
    receiving a random access message associated with a random access procedure, wherein a hybrid automatic repeat request (HARQ) feedback is disabled for a first downlink data channel transmission associated with the random access procedure, and wherein a contention resolution window is associated with the random access procedure for the first downlink data channel transmission of a plurality of downlink data channel transmissions associated with the random access procedure; and
    transmitting, within the contention resolution window, the first downlink data channel transmission, wherein the first downlink data channel transmission includes a contention resolution medium access control-control element (MAC-CE), wherein an uplink alignment timer is configured to be activated or deactivated irrespective of the HARQ feedback.

18. The method of claim 17, further comprising:
transmitting an indication to enable the HARQ feedback; and
receiving acknowledgment information for the first downlink data channel transmission that includes the contention resolution MAC-CE based at least in part on the indication to enable the HARQ feedback.

19. The method of claim 18, further comprising:
transmitting the indication in the contention resolution MAC-CE.

20. The method of claim 18, wherein transmitting the indication comprises:
transmitting a downlink control information or a radio resource control configuration that includes the indication to enable the HARQ feedback for the random access procedure.

21. An apparatus for wireless communication at a user equipment (UE), comprising:
one or more memories; and
one or more processors coupled with the one or more memories and configured to cause the UE to:
transmit, to a network device, a random access message associated with a random access procedure, wherein a hybrid automatic repeat request (HARQ) feedback is disabled for a first downlink data channel transmission associated with the random access procedure;
initiate a contention resolution window associated with the random access procedure for the first downlink data channel transmission of a plurality of downlink data channel transmissions associated with the random access procedure;
receive, within the contention resolution window, the first downlink data channel transmission, wherein the first downlink data channel transmission includes a contention resolution medium access control-control element (MAC-CE); and
control an uplink alignment timer irrespective of the HARQ feedback.

22. The apparatus of claim 21, wherein the random access message comprises a random access message 3.

23. The apparatus of claim 21, wherein the one or more processors are configured to cause the UE to:
transmit acknowledgment information for the first downlink data channel transmission that includes the contention resolution MAC-CE based at least in part on an indication to enable the HARQ feedback for the random access procedure.

24. The apparatus of claim 23, wherein the one or more processors are configured to cause the UE to:
identify the indication to enable the HARQ feedback based at least in part on a default configuration to enable the HARQ feedback; and
enable the HARQ feedback based at least in part on the indication.

25. The apparatus of claim 23, wherein the one or more processors are configured to cause the UE to:
identify the indication to enable the HARQ feedback based at least in part on UE context information or a network configuration to enable the HARQ feedback, or both; and
enable the HARQ feedback based at least in part on the indication.

26. The apparatus of claim 23, wherein the one or more processors are configured to cause the UE to:
receive a radio resource control configuration that includes the indication to enable the HARQ feedback for the random access procedure.

27. The apparatus of claim 23, wherein, to receive the indication, the one or more processors are configured to cause the UE to: receive a downlink control information or a radio resource control configuration that includes the indication to enable the HARQ feedback for the random access procedure.

28. An apparatus for wireless communication at a network device, comprising:
one or more memories; and
one or more processors coupled with the one or more memories and configured to cause the network device to:
receive a random access message associated with a random access procedure, wherein a hybrid automatic repeat request (HARQ) feedback is disabled for a first downlink data channel transmission associated with the random access procedure, and wherein a contention resolution window is associated with the random access procedure for the first downlink data channel transmission of a plurality of downlink data channel transmissions associated with the random access procedure; and
transmit, within the contention resolution window, the first downlink data channel transmission, wherein the first downlink data channel transmission includes a contention resolution medium access control-control element (MAC-CE), wherein an uplink alignment timer is configured to be activated or deactivated irrespective of the HARQ feedback.

29. The apparatus of claim 28, wherein the one or more processors are configured to cause the network device to:
transmit an indication to enable the HARQ feedback; and
receive acknowledgment information for the first downlink data channel transmission that includes the contention resolution MAC-CE based at least in part on the indication to enable the HARQ feedback.

30. The apparatus of claim 29, wherein the one or more processors are configured to cause the network device to:
transmit the indication in the contention resolution MAC-CE.

31. A non-transitory computer-readable medium storing code for wireless communication at a user equipment (UE), the code comprising instructions executable by one or more processors to cause the UE to:
transmit, to a network device, a random access message associated with a random access procedure, wherein a hybrid automatic repeat request (HARQ) feedback being is disabled for a first downlink data channel transmission associated with the random access procedure;
initiate a contention resolution window associated with the random access procedure for the first downlink data channel transmission of a plurality of downlink data channel transmissions associated with the random access procedure;
receive, within the contention resolution window, the first downlink data channel transmission, wherein the first downlink data channel transmission includes a contention resolution medium access control-control element (MAC-CE); and
control an uplink alignment timer irrespective of the HARQ feedback.

32. The non-transitory computer-readable medium of claim 31, wherein the random access message comprises a random access message 3.

33. The non-transitory computer-readable medium of claim 31, wherein the instructions are further executable by the one or more processors to cause the UE to:
transmit acknowledgment information for the first downlink data channel transmission that includes the contention resolution MAC-CE based at least in part on an indication to enable the HARQ feedback for the random access procedure.

34. A non-transitory computer-readable medium storing code for wireless communication at a network device, the code comprising instructions executable by one or more processors to cause the network device to:
receive a random access message associated with a random access procedure, wherein a hybrid automatic repeat request (HARQ) feedback is disabled for a first downlink data channel transmission associated with the random access procedure, and wherein a contention resolution window is associated with the random access procedure for the first downlink data channel transmission of a plurality of downlink data channel transmissions associated with the random access procedure; and
transmit, within the contention resolution window, the first downlink data channel transmission, wherein the first downlink data channel transmission includes a contention resolution medium access control-control element (MAC-CE), wherein an uplink alignment timer is configured to be activated or deactivated of the the HARQ feedback.

35. The non-transitory computer-readable medium of claim 34, wherein the instructions are further executable by the one or more processors to cause the network device to:
transmit an indication to enable the HARQ feedback; and
receive acknowledgment information for the first downlink data channel transmission that includes the contention resolution MAC-CE based at least in part on the indication to enable the HARQ feedback.

36. The non-transitory computer-readable medium of claim 35, wherein the instructions are further executable by the one or more processors to cause the network device to:
transmit the indication in the contention resolution MAC-CE.

* * * * *